(12) United States Patent
Yoshibayashi et al.

(10) Patent No.: US 8,158,307 B2
(45) Date of Patent: Apr. 17, 2012

(54) COLOR FILTER AND METHOD OF MANUFACTURING THE SAME, AND SOLID-STATE IMAGE PICKUP ELEMENT

(75) Inventors: Mitsuji Yoshibayashi, Shizuoka-ken (JP); Teruaki Kinumura, Shizuoka-ken (JP); Tomoyuki Kikuchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1008 days.

(21) Appl. No.: 12/031,128

(22) Filed: Feb. 14, 2008

(65) Prior Publication Data

US 2008/0206659 A1    Aug. 28, 2008

(30) Foreign Application Priority Data

Feb. 14, 2007    (JP) ................................ 2007-033576
Jul. 3, 2007    (JP) ................................ 2007-175016
Dec. 28, 2007    (JP) ................................ 2007-340293

(51) Int. Cl.
    *G02B 5/20* (2006.01)
(52) U.S. Cl. ............................... 430/7; 216/24; 257/440
(58) Field of Classification Search .......................... None
    See application file for complete search history.

(56) References Cited

U.S. PATENT DOCUMENTS

| | | | |
|---|---|---|---|
| 4,237,477 A * | 12/1980 | Weimer | 348/282 |
| 5,719,074 A * | 2/1998 | Hawkins et al. | 438/70 |
| 2004/0257541 A1 | 12/2004 | Iisaka | |
| 2005/0031973 A1 | 2/2005 | Kobayashi et al. | |
| 2011/0026153 A1 | 2/2011 | Yoshibayashi | |

FOREIGN PATENT DOCUMENTS

| | | | |
|---|---|---|---|
| DE | 196 41 303 A1 | | 4/1997 |
| JP | 57-004012 A | | 1/1982 |
| JP | 58-188985 A | * | 11/1983 |
| JP | 62-159591 A | | 7/1987 |
| JP | 1-106588 A | * | 8/1989 |
| JP | 01-296201 A | | 11/1989 |
| JP | 2-181704 A | | 7/1990 |
| JP | 2-199403 A | | 8/1990 |
| JP | 5-273411 A | | 10/1993 |
| JP | 07-092694 A | | 4/1995 |
| JP | 7-140654 A | | 6/1995 |

(Continued)

OTHER PUBLICATIONS

Computer-generated translation of JP 2006-351786 (Dec. 2006).*

(Continued)

*Primary Examiner* — John A. McPherson
(74) *Attorney, Agent, or Firm* — Sughrue Mion, PLLC

(57) ABSTRACT

The present invention provides a method of manufacturing a color filter, including: forming a first color pattern in a repeating pattern on a support; forming, on the support, a second color pattern in a repeating pattern in regions where the first color pattern is not formed; removing at least one portion of one of the first color pattern and the second color pattern by dry-etching, the portion being in a region where a third color pattern is to be formed; and forming, on the support, the third color pattern in the region where the portion of one of the first color pattern and the second color pattern has been removed. The present invention also provides a color filter manufactured by the method, and a solid-state image pickup element using the color filter.

14 Claims, 19 Drawing Sheets

FOREIGN PATENT DOCUMENTS

| | | |
|---|---|---|
| JP | 07-152022 A | 6/1995 |
| JP | 09-015420 A | 1/1997 |
| JP | 10-209410 A | 8/1998 |
| JP | 2001-249218 A | 9/2001 |
| JP | 2003-298034 A | 10/2003 |
| JP | 2003-332310 A | 11/2003 |
| JP | 2005-010280 A | 1/2005 |
| JP | 2006-267352 A | 10/2006 |
| JP | 2006-292842 A | 10/2006 |
| JP | 2006-319133 A | 11/2006 |
| JP | 2006-339376 A | 12/2006 |
| JP | 2006-351786 A | 12/2006 |
| JP | 2007-025358 A | 2/2007 |
| JP | 2007-034250 A | 2/2007 |
| JP | 2007-079154 A | 3/2007 |
| JP | 2007-248662 A | 9/2007 |
| JP | 2007-324321 A | 12/2007 |

OTHER PUBLICATIONS

EP Communication, dated Dec. 2, 2009, issued in corresponding EP Application No. 08101622.2, 8 pages.

Notification of Reasons for Rejection, dated Feb. 14, 2012, issued in corresponding JP Application No. 2007-340293, 5 pages in English and Japanese.

* cited by examiner

FIG. 17A
FIG. 17B
FIG. 17C
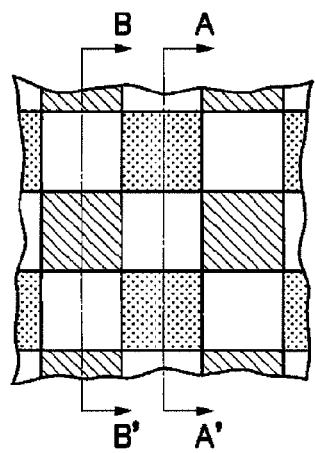
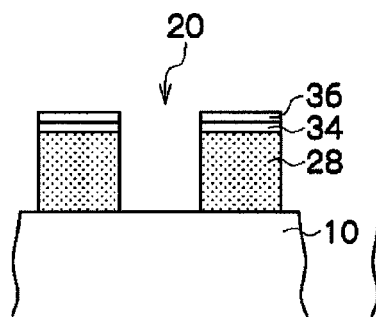
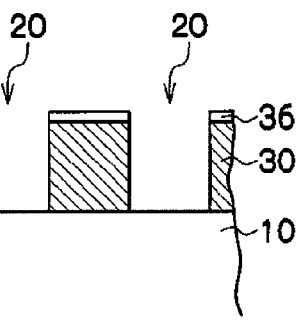
FIG. 18A
FIG. 18B
FIG. 18C
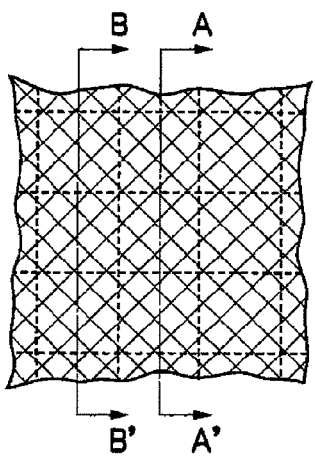
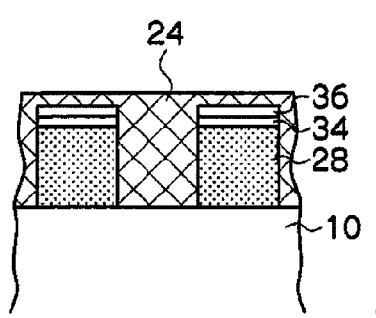
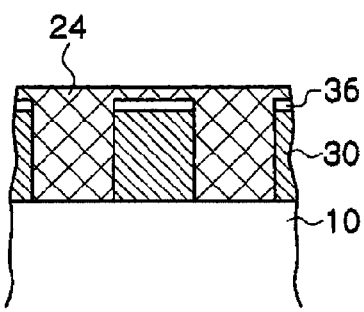

FIG. 29A  FIG. 29B  FIG. 29C
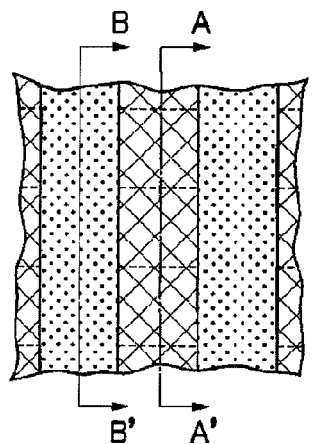
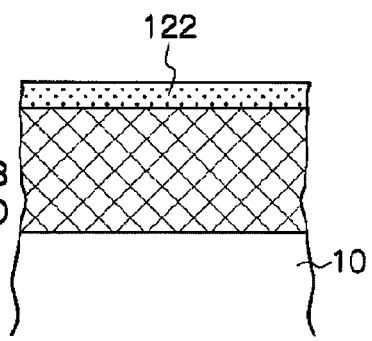
FIG. 30A  FIG. 30B  FIG. 30C
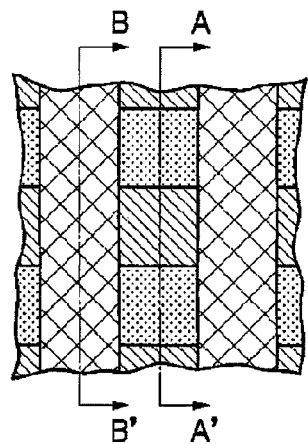
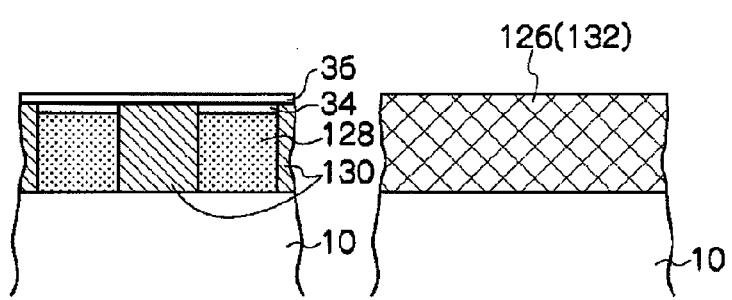

FIG. 32A
FIG. 32B
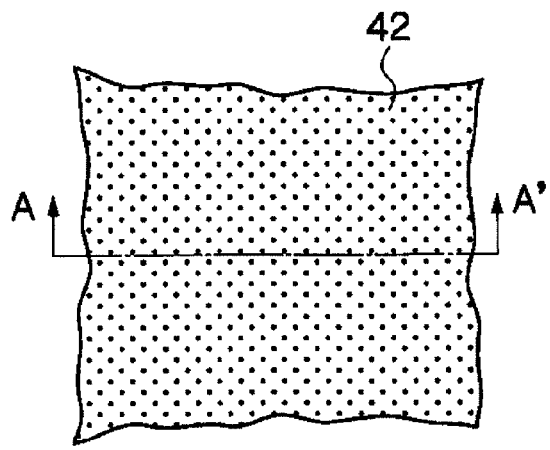
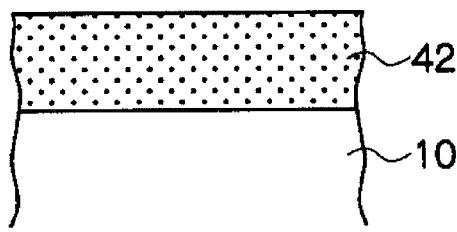
FIG. 33A
FIG. 33B
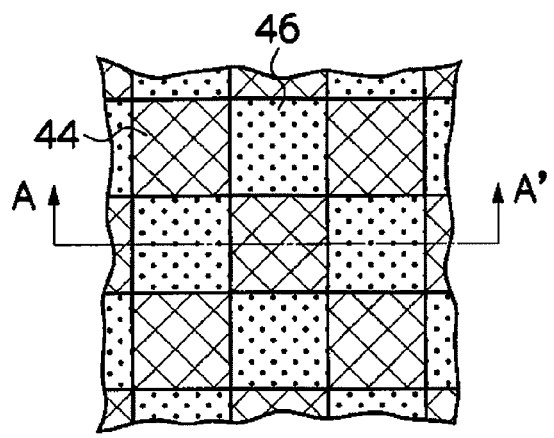
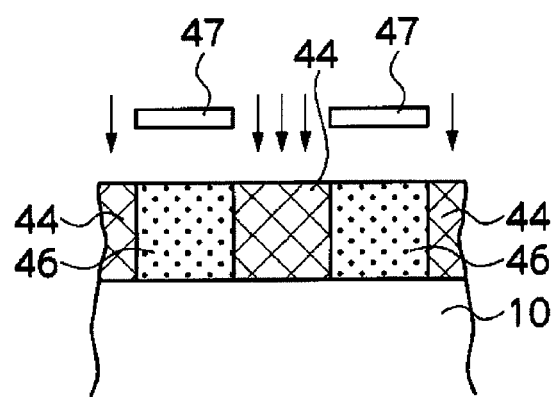

COLOR FILTER AND METHOD OF MANUFACTURING THE SAME, AND SOLID-STATE IMAGE PICKUP ELEMENT

CROSS-REFERENCE TO RELATED APPLICATION

This application claims priority under 35 USC 119 from Japanese Patent Application Nos. 2007-033576, 2007-175016 and 2007-340293, the disclosure of which is incorporated by reference herein.

BACKGROUND OF THE INVENTION

1. Field of Invention

The present invention relates to a color filter and a method of manufacturing the color filter, and a solid-state image pickup element using the color filter.

2. Description of the Related Art

In recent years, as a manufacturing method of a color filter, a photolithography method has been used in consideration of production cost and ease of production.

This photolithography method refers to a method wherein a radiation-sensitive composition such as a colored curable composition or the like is applied on a substrate by a spin coater, a roll coater, or the like, and dried to form a coating film; the coating film is subjected to pattern exposure, development, and baking to form color pixels, and this cycle of operation is repeated for each color, thereby producing a color filter.

The photolithography method gives high positioning accuracy and has been widely used as a method suitable for manufacturing color filters for color displays of large screens and high-precision displays.

A known technique related to the photolithography method uses a negative photosensitive composition, in which is used a combination of an alkali-soluble resin with a photopolymerizable monomer and a photopolymerizable initiator (for example, see Japanese Patent Application Laid-Open (JP-A) Nos. 2-181704, 2-199403, 5-273411, and 7-140654).

Here, a general outline of the method of manufacturing the conventional color filter by the photolithography method is described with reference to FIGS. 32A to 36B.

As shown in FIGS. 32A and 32B, a colored negative curable composition is applied on a support 10 by means of a spin coater or the like to form a first color layer 42. After being prebaked, the first color layer is pattern exposed to light through a photomask 47 (i.e. a first color pixel-forming region 44 in the first color layer is exposed to ultraviolet radiation) as shown in FIGS. 33A and 33B. After that, an unnecessary region 46 in the first color layer is removed by development treatment, followed by post-baking treatment, thereby forming a first color pixel 48 as shown in FIGS. 34A and 34B.

Moreover, a second color pixel 50 as shown in FIGS. 35A and 35B and a third color pixel 52 as shown in FIGS. 36A and 36B are formed by repeating the same process as in the first color pixel formation, whereby a color filter is formed.

In the conventional manufacturing method of a color filter by the photolithography method, as shown in FIG. 36A, a problem occurs such that a region 54 where a color pixel is not formed is generated in the region where the corners of the color pixels gather. Moreover, there is also a problem in that a desired film thickness is not obtained in regard to each of color pixels. Furthermore, the film thickness of a region where color pixels contact mutually are not formed as intended (namely, a problem that a region 56 where the film thicknesses of the color pixels are thin is generated in the vicinity of the boundary of the color pixels as shown in FIG. 36B), and the like.

Although optimization of the mask bias or the like and improvements in the curing efficiency of a colored curable composition when exposed to a light source have been made, there is a limit to these improvements.

Moreover, although a technique is known which embeds the second color pixel or the like by thermal flow (reflow) at the time of thermosetting (for example, JP-A Nos. 2006-267352 and 2006-292842), this technique tends to be influenced by the performance and the process conditions of the colored curable composition to be used after the formation of the second color pixel, and there is, for example, a problem such that the heating distribution of a support will be reflected as it is in the embedding properties.

In addition, in a liquid crystal display device or a solid-state image pickup element, there have been advances in the reduction of pixel size, necessitating the reduction in size of a color filter. In particular, with the recent remarkable miniaturization of solid-state image pickup elements, a high resolving technology allowing resolution of less than 2.0 μm in size is needed, but a limit has almost been reached with respect to the resolution in the conventional photolithography method. For this reason, the issue of photolithography methods is becoming more and more prominent.

A technique using a dye has also been proposed as a technique for further miniaturization of a color filter and realization of a high-definition color filter for a solid-state image pickup.

However, a dye-containing curable composition is generally inferior to a pigment with respect to properties such as light resistance, thin film formation, or ease in change of spectral transmission characteristics. Further, since especially when manufacturing a color filter for use in the solid-state image pickup element, a film thickness of 1.0 μm or less is required, it is necessary to add a large amount of colorants in a curable composition, thereby causing various problems including significant difficulties in pattern formation, such as insufficient adhesion to a substrate, insufficient curability, or leakage of the dye in the exposed area.

Moreover, in contrast to the method of manufacturing the color filter using the photolithography method, a dry etching method has been known for many years as an effective method of forming a thinner film with a highly-fine pattern. The dry etching method has been conventionally utilized as a method of forming a substantially rectangular pattern.

Furthermore, a pattern formation method using a combination of the photolithography method and the dry etching method has also been proposed (see, for example, JP-A No. 2001-249218).

However, although the first color pixel may be formed into a rectangular form by the technique described in JP-A No. 2001-249218, formation of the second and third color pixels is rate-limited by the performance of the conventional photosensitive colored composition, and the problems accompanied with the photolithography method remain.

Therefore, when the photolithography method is used, it is necessary to increase the concentration of a colorant while maintaining the discrimination in dissolution properties between the compositions by exposure or development, and thus the technical hurdles are extremely high.

As described above, in the conventional method of manufacturing a color filter, there is a limit (lower limit) in the pattern size that can be formed.

SUMMARY OF THE INVENTION

The present invention has been made in view of the above circumstances, and provides a method of manufacturing a color filter that addresses limits in pattern formation and enables forming a smaller pattern.

The present invention also provides a color filter having substantially rectangular color pixels.

The present invention also provides a solid-state image pickup element having superior color reproducibility.

The inventors of the present invention have found that when a repeating pattern (e.g. a stripe pattern) is first formed and then made into an isolated pattern to form a color pixel, a color pixel may be formed having a more rectangular cross section than when an isolated pattern is directly formed to form a color pixel.

That is, according to a first aspect of the invention, there is provided (1) a method of manufacturing a color filter comprising:

(a) forming a first color pattern in a repeating pattern on a support;

(b) forming, on the support, a second color pattern in a repeating pattern in regions where the first color pattern is not formed;

(c) removing at least one portion of one of the first color pattern and the second color pattern by dry-etching, the portion being in a region where a third color pattern is to be formed; and (d) forming, on the support, the third color pattern in the region where the portion of one of the first color pattern and the second color pattern has been removed.

According to a second aspect of the invention, in the method of item (1), the first color pattern and the second color pattern each have a stripe shape.

According to a third aspect of the invention, in the method of item (1), the first color pattern is formed by any one of:

(1) a process comprising forming a first color layer on the support, exposing the first color layer to light, and developing a resultant obtained by the exposing; and (2) a process comprising forming the first color layer on the support, forming a resist pattern on the first color layer using a photoresist, and dry-etching the first color layer using the resist pattern as an etching mask.

According to a fourth aspect of the invention, in the method of item (1), the second color pattern is formed by the following process (1) or a process comprising at least one of the following processes (2) and (3):

(1) a process comprising forming a second color layer on the support on which the first color pattern is formed, and exposing the second color layer to light, followed by development;

(2) a process comprising forming the second color layer on the support on which the first color pattern is formed, forming a resist pattern on the second color pattern using a photoresist, and dry-etching the second color layer using the resist pattern as an etching mask; and (3) a process comprising forming the second color layer on the support on which the first color pattern is formed, and performing planarization of at least the second color layer.

According to a fifth aspect of the invention, in the method of item (1), the third color pattern is formed by the following process (1) or a process comprising at least one of the following processes (2) and (3):

(1) a process comprising forming a third color layer on the support on which the first color pattern and the second color pattern are formed, and exposing the third color layer to light, followed by development;

(2) a process comprising forming the third color layer on the support on which the first color pattern and the second color pattern are formed, forming a resist pattern on the third color pattern using a photoresist, and dry-etching the third color layer using the resist pattern as an etching mask; and (3) a process comprising forming the third color layer on the support on which the first color pattern and the second color pattern are formed, and performing planarization of at least the third color layer.

According to a sixth aspect of the invention, in the method according to the fourth aspect of the invention, the planarization comprises at least one of an etch-back treatment that etches all of the exposed surfaces of the color layers and a polishing treatment that polishes all of the exposed surfaces of the color layers.

According to a seventh aspect of the invention, the method of item (1) further comprises:

forming a second stopper layer on the first color pattern and the second color pattern after (b) the formation of the second color pattern and before (c) the removal of the portion of the color patterns, wherein:

the removal of the portion of the color patterns comprises removing at least one portion of at least one of the first color pattern and the second color pattern, in the region where the third color pattern is to be formed, and removing the second stopper layer in the region where the third color pattern is to be formed; and the formation of the third color pattern comprises forming the third color layer on the support on which the first color pattern, the second color pattern, and the second stopper layer are formed, and dry-etching the third color layer until the second stopper layer is exposed.

According to an eighth aspect of the invention, in the method of item (1), the formation of the first color pattern comprises forming the first color layer on the support and forming a first stopper layer on the first color layer; and the formation of the second color pattern comprises forming the second color layer on the support on which the first color pattern is formed and dry-etching the second color layer until the first stopper layer is exposed.

According to a ninth aspect of the invention, in the method of item (1), the first color pattern and the second color pattern are formed in such a manner that surfaces of the first color pattern and the second color pattern that face each other are brought into contact.

According to a tenth aspect of the invention, in the method of item (1), at least one of the formation of the first color pattern, the formation of the second color pattern, or the formation of the third color pattern comprises:

applying an adhesiveness-improving treatment to the support after dry-etching;

forming a color layer on the support to which the adhesiveness-improving treatment has been applied;

exposing the color layer to light; and developing a resultant of the exposing to form a color pattern.

According to an eleventh aspect of the invention, in the method according to the tenth aspect of the invention, the adhesiveness-improving treatment comprises at least one of adding an adhesion auxiliary agent or a fluorination treatment using plasma.

According to a twelfth aspect of the invention, in the method according to the tenth aspect of the invention, the color layer is formed by applying a colored curable composition comprising an organic silane compound in an amount of 0.05 to 1.2% by mass with respect to the total solid content of the colored curable composition.

According to a thirteenth aspect of the invention, in the method of item (1), at least one of the formation of the first color pattern, the formation of the second color pattern, or the formation of the third color pattern comprises:

forming a color layer by applying to the support a colored curable composition comprising an organic silane compound in an amount of 0.3 to 1.2% by mass with respect to the total solid content of the colored curable composition, without applying an adhesiveness-improving treatment to the support after dry-etching;

exposing the color layer to light; and developing a resultant of the exposing to form a color pattern.

According to a fourteenth aspect of the invention, in the method of item (1), the region where a third color pattern is to be formed comprises a checkered pattern region.

According to a fifteenth aspect of the invention, in the method of item (1), the region where a third color pattern is to be formed comprises a stripe pattern that extends in a direction intersecting with the first color pattern and the second color pattern.

According to a sixteenth aspect of the invention, there is provided a color filter, which is produced by the method of manufacturing a color filter of item (1).

According to a seventeenth aspect of the invention, there is provided a solid-state image pickup element, comprising the color filter according to the sixteenth aspect of the invention.

The present invention provides a method of manufacturing a color filter, by which the limit in pattern formation is addressed and a finer pattern can be formed.

The present invention also provides a color filter having substantially rectangular color pixels.

The present invention also provides a solid-state image pickup element having superior color reproducibility.

BRIEF DESCRIPTION OF THE DRAWINGS

FIG. 17A is a plan view of the second exemplary embodiment of the invention, FIG. 17B is a sectional view taken along the line A-A' of FIG. 17A, and FIG. 17C is a sectional view taken along the line B-B' of FIG. 17A;

FIG. 18A is a plan view of the second exemplary embodiment, of the invention FIG. 18B is a sectional view taken along the line A-A' of FIG. 18A, and FIG. 18C is a sectional view taken along the line B-B' of FIG. 18A;

FIG. 29A is a plan view of the fourth exemplary embodiment of the invention, FIG. 29B is a sectional view taken along the line A-A' of FIG. 29A, and FIG. 29C is a sectional view taken along the line B-B' of FIG. 29A;

FIG. 30A is a plan view of the fourth exemplary embodiment of the invention, FIG. 30B is a sectional view taken along the line A-A' of FIG. 30A, and FIG. 30C is a sectional view taken along the line B-B' of FIG. 30A;

FIG. 32A is a plan view illustrating a conventional method of manufacturing a color filter, and FIG. 32B is a sectional view taken along the line A-A' of FIG. 32A;

FIG. 33A is a plan view illustrating a conventional method of manufacturing a color filter, and FIG. 33B is a sectional view taken along the line A-A' of FIG. 33A;

DETAILED DESCRIPTION OF THE INVENTION

Figure 1A:
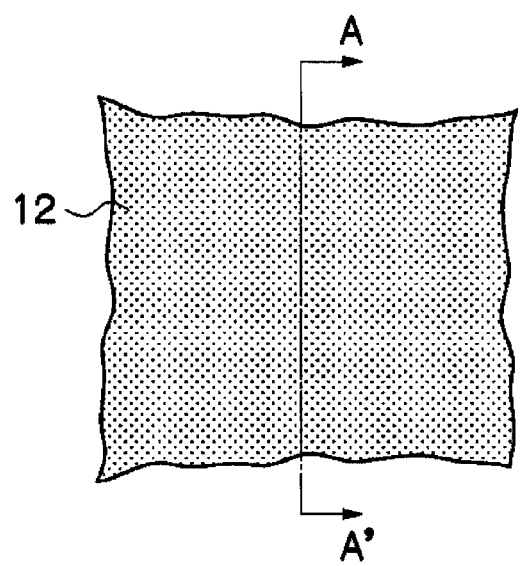
FIG. 1A is a plan view of a first exemplary embodiment and a third exemplary embodiment of the invention.

Color Filter and Method of Manufacturing the Color Filter

The method of manufacturing a color filter according to an exemplary embodiment of the invention includes at least:

(a) forming a first color pattern in a repeating pattern on a support;

(b) forming, on the support, a second color pattern in a repeating pattern in regions where the first color pattern is not formed;

(c) removing at least one portion of one of the first color pattern and the second color pattern by dry-etching, the portion being in a region where a third color pattern is to be formed; and (d) forming, on the support, the third color pattern in the region where the portion of one of the first color pattern and the second color pattern has been removed.

The color filter of the invention is manufactured by this method.

According to an exemplary embodiment of the method of manufacturing a color filter of the invention, a first color pattern and a second color pattern are each formed in a stripe pattern so that the cross section of each of the first color pattern and the second color pattern may become substantially rectangular. Here, the cross section of the pattern means one obtained by cutting a color pattern in a plane which is parallel to the axis in the width direction of the pattern and is perpendicular to a support.

Hereinafter, one of the presumed causes of the effects will be explained.

In general, with respect to the pattern formation by the photolithography method, a repeating pattern, such as a stripe pattern, has a higher edge contrast than that of an isolated pattern, and each pattern may be formed so that the cross section thereof may become substantially rectangular. Moreover, when the pattern is formed into a stripe pattern, the contrast in the longitudinal direction of the pattern is constant, so that undesired phenomena such as formation of rounded corners of the pattern do not occur.

Because of these characteristics, a stripe-shaped first color pattern and a stripe-shaped second color pattern formed by the photolithography method improve the contrast of the pattern edge in a direction perpendicular to the longitudinal direction of the patterns and maintain the rectangular form of the cross section of the patterns, thereby excluding the influence of optical proximity effect in the longitudinal direction of the patterns.

Moreover, the first color pattern and the second color pattern in stripe shapes may also be formed by a dry etching method. In this case, the cross section of the patterns may be more nearly rectangular as compared to that obtained by the photolithography method.

In addition, the method of manufacturing a color filter in accordance with the invention includes removing a portion of at least one of the first color pattern and the second color pattern from a region where a third color pattern is to be formed, by a dry etching method to form a recessed part, and embedding the third color pattern in the recessed part, whereby the influence of optical intensity distribution or pattern distortion may be suppressed.

As mentioned above, pattern formability may be improved by the method of manufacturing a color filter of the invention. Specifically, occurrence of a region where a color pixel is not formed in a region to which the corners of the color pixels are gathered may be suppressed, as well as occurrence of a region where the film thickness is thin in the vicinity of boundaries of the color pixels may also be suppressed. As a result, limits in pattern formation may be addressed, particularly in the formation of color patterns by the photolithography method, enabling the formation of a color filter having finer pixels.

Since the color filter of the invention is manufactured by this method, the color filter has substantially rectangular color pixels.

Moreover, in the method of manufacturing a color filter of the invention, an exemplary embodiment in which all of the color patterns are formed by dry etching and/or polishing (for example, all of the first to third color patterns) is preferable, and pattern formability and limits in pattern formation may be further addressed according to this exemplary embodiment.

When all of the color patterns (for example, all of the first to third color patterns) are formed by dry etching and/or polishing, or when a layer formed of a material with which a thin film is merely formed is formed by dry etching and/or polishing, a thinner color filter is manufactured. Accordingly, properties of the color filter may be improved, problems such as color shading defects may be ameliorated, or a smaller solid-state image pickup element may be manufactured.

The layer formed of a material with which a thin film is merely formed as used herein refers to layers having comparatively large amounts of colorants for exerting their properties, such as a layer which has a low color density per unit volume or a layer which requires plural colorants for realizing desired transmission light spectrum.

For ease of explanation, the color film formed without being divided into plural regions (a solid film) is referred to as a "color layer", and a color film (for example, a film patterned into a stripe pattern, or the like) divided into plural regions in a pattern form is referred to as a "color pattern". Here, the exemplary embodiment made by forming the divided regions into a pattern form (a patterning embodiment) includes an exemplary embodiment obtained by patterning a photosensitive film through pattern exposure and development, as well as an exemplary embodiment obtained by forming a resist pattern on the color film and patterning the color film through etching with use of the resist pattern as an etching mask, and an exemplary embodiment obtained by embedding the color film into a patterned and recessed part made on a support, and removing the portion protruding from the recessed part among the resultant color films, followed by pattern formation, and the like.

In addition, among the color patterns, a color pattern (for example, a color pattern which is patterned into a square or the like) which is an element constituting a color filter array is referred to as a "color pixel".

Hereinafter, processes and specific exemplary embodiments of the method of manufacturing a color filter of the invention will be described, and subsequently description will be given on dry etching, support, color pattern, photoresist, and stopper layer.

Color Pattern Formation

The formation of a first color pattern is performed by forming the first color pattern in a repeating pattern, such as a stripe pattern, on a support.

The method of forming the first color pattern includes preferably, though not particularly limited to, (1) a method in which a color layer is formed on a support and the formed color layer is exposed to light and developed (also referred to as "photolithography method" in the invention), or (2) a method in which a color layer is formed on a substrate, a resist pattern is formed on the formed color layer using a photoresist, and the color layer is dry-etched using the formed resist pattern as an etching mask (also referred to as "dry etching method" in the invention).

The formation of a second color pattern is performed by forming the second color pattern in a repeating pattern, such as a stripe pattern, in the region (for example, the region sandwiched between the first color patterns) where the first color pattern is not formed on the support.

Also, the formation of a third color pattern is performed by forming the third color pattern in the region where at least one of the first color pattern and the second color pattern is removed in the removal process of the color pattern as mentioned later.

In the formation of the second color pattern and the third color pattern, examples of a method of forming the second color pattern and the third color pattern includes preferably (1) the photolithography method, (2) the dry etching method, and (3) a planarization method in which the second color pattern and the third color pattern are formed on a color pattern-formed support and the formed second and third color patterns are subjected to a planarization treatment (also referred to as "planarization method" in the invention).

A specific embodiment of the planarization treatment is preferably an exemplary embodiment which includes forming a color layer by embedding a colored resin composition into a recessed part sandwiched between (or surrounded by) the color patterns on the support, applying the entire exposed surface of the color layer to a treatment such as etching or polishing to remove the excessive portion protruding from the recessed part among the formed color layers.

The planarization treatment is preferably an etch-back process which includes dry-etching the entire exposed surface of the formed second and third color layers, from the viewpoint of simplification of the manufacturing process or manufacture cost.

The planarization treatment is not limited to the etch-back process. Preferable examples of the planarization treatment further include a polishing treatment including polishing the entire exposed surface of the second and third color layers. Specific examples of the polishing treatment include a chemical mechanical polishing (hereinafter referred to as "CMP") process wherein the entire exposed surface of the second and third color layers is chemically and mechanically polished.

In addition, the planarization treatment preferably includes a combination of the etch-back process and the polishing process such as CMP process.

In the formation of the second color pattern and the third color pattern, a combination of the dry-etching method with the planarization method may be used.

For example, after the color patterns have been formed by the dry-etching method, they are further treated by the etch-back process to improve the flatness of the color patterns, as compared to the case where the color pattern is formed only by the dry-etching method.

The first and second color patterns are preferably formed in such a manner that the surfaces of the adjacent color patterns are brought into contacted with each other, from the viewpoints of suppressing the generation of the region in which the color pixel is not formed and attaining the effect of the invention more effectively.

The widths of the first color pattern and the second color pattern are each independently preferably 0.5 µm to 2.0 µm, more preferably 1.0 µm to 1.7 µm, and particularly preferably 1.2 µm to 1.5 µm, in view of additionally addressing the limit in pattern formation. In the cases of the third exemplary embodiment and the fourth exemplary embodiment of the invention as described below, the widths of the first color pattern and the second color pattern are each independently preferably 0.5 µm to 2.0 µm, and more preferably 0.7 µm to 1.4 µm.

The width of the third color pattern is preferably 0.5 µm to 2.0 µm, more preferably 1.0 µm to 1.7 µm, and particularly preferably 1.2 µm to 1.5 µm, in view of additionally addressing the limit in pattern formation. In the cases of the third exemplary embodiment and the fourth exemplary embodiment of the invention as described below, the width of the third color pattern is preferably 0.5 µm to 2.0 µm, and more preferably 0.7 µm to 1.4 µm.

The specific thickness of each of the first to third color patterns is preferably 0.005 µm to 0.9 µm, more preferably 0.05 µm to 0.8 µm, and further more preferably 0.1 µm to 0.7 µm, in view of additionally addressing the limit in pattern formation.

As for a specific embodiment of the formation of the first to third color patterns by the "photolithography method", there is no particular limitation thereto, and the technique of the known photolithography may be suitably optimized and used.

For example, the colored photocurable composition as mentioned below is first applied onto a support directly or with other layer interposed therebetween, and dried (preferably further subjected to prebaking treatment) to form a color layer. The formed color layer is pattern-exposed by a radiation, and the pattern-exposed color layer is developed (preferably further subjected to post-baking treatment) to obtain a color pattern. After the development, post-exposure may be performed.

Preferable examples of the radiation include g-ray, h-ray and i-ray, and among them i-ray is more preferable, in view of effectively obtaining the effect of the invention.

As the developing solution usable in the development, any developing solution may be used so long as it dissolves the uncured portion. Specifically, combinations of various organic solvents or alkali aqueous solutions may be used.

As for a specific exemplary embodiment of the formation of the resist pattern by using a photoresist in the "dry etching method", there is no particular limitation thereto, and the technique of the known photolithography may be suitably optimized and used.

For example, a positive or negative photosensitive resin composition (photoresist) as mentioned later is first applied onto a color layer, and dried (preferably further subjected to prebaking treatment) to form a photoresist layer.

The formed photoresist layer is exposed to a radiation and developed (preferably further subjected to post-baking treatment) to form a resist pattern. Among the radiations for exposing the photoresist layer, g-ray, h-ray and i-ray are preferable, and among them, i-ray is more preferable, from the viewpoint of the purpose of the invention.

As the developing solution usable in the development, any developing solution may be used so long as it does not affect the color layer including a colorant and dissolves the uncured portion (, which corresponds to an exposed portion in case of the photoresist being positive-working, and corresponds to an unexposed portion in case of the photoresist being negative-working). Specifically, combinations of various organic solvents or alkali aqueous solutions may be used.

Among them as mentioned above, in the case where the first to third color patterns are formed by the dry-etching method and the case where the second and third color patterns are formed by the etch-back treatment, a specific exemplary embodiment of the dry-etching is not particularly limited, and the exemplary embodiment of the known dry-etching may be suitably optimized and used. Preferable embodiments of the dry etching will be hereinafter described.

Removal of Color Pattern

The removal of the color pattern in the invention is performed by removing a portion of the first color pattern and/or the second color pattern in a region where a third color pattern is to be formed by dry-etching.

Figure 6A:
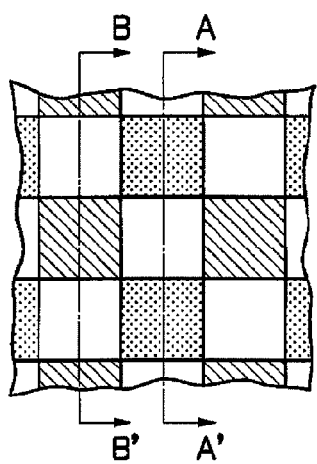
FIG. 6A is a plan view of the first exemplary embodiment of the invention.
Figure 6B:
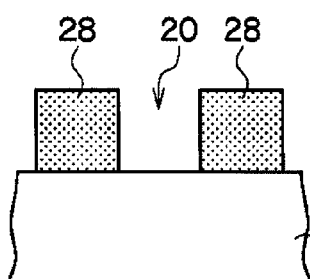
FIG. 6B is a sectional view taken along the line A-A' of FIG. 6A.
Figure 6C:
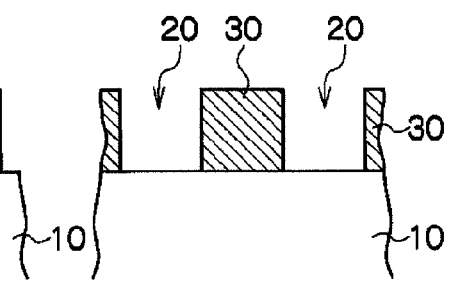
FIG. 6C is a sectional view taken along the line B-B' of FIG. 6A.

As for the region where a third color pattern is to be formed, there is no particular limitation thereto, and it is preferably a region where a third color pixel is to be formed, for example, a checkered pattern region such as a region 20 forming a green color pixel in FIGS. 6A to 6C illustrated below.

Figure 21A:
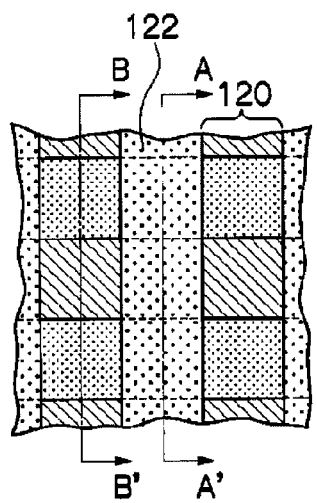
FIG. 21A is a plan view of a third exemplary embodiment of the invention.
Figure 21B:
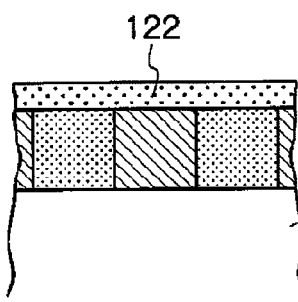
FIG. 21B is a sectional view taken along the line A-A' of FIG. 21A.
Figure 21C:
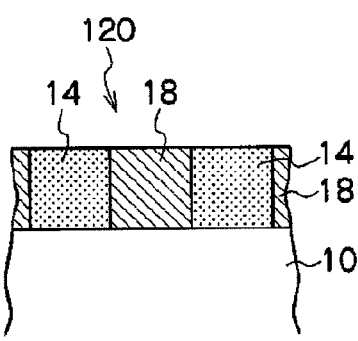
FIG. 21C is a sectional view taken along the line B-B' of FIG. 21A.

Further, the region where a third color pattern is to be formed is preferably a stripe pattern region, such as a region 120 forming a green color pixel in FIGS. 21A to 21C, that extends in a direction intersecting with the first color pattern and the second color pattern. When the region where a third color pattern is to be formed is a stripe pattern region, all of the first to third color patterns may be formed without forming pattern corners, and a substantially rectangular color filter array can be formed.

A specific method of removing the region forming the third color pattern by dry-etching is preferably a method which includes forming in advance a resist pattern on the first color pattern and/or the second color pattern by the known photolithography technique using a photoresist (i.e. a resist pattern such that a region forming a third color pattern is exposed), and performing the dry-etching treatment using the resist pattern as an etching mask.

A length of one side of the region forming the third color pattern is preferably 0.5 µm to 2.0 µm, more preferably 1.0 µm to 1.7 µm, and particularly preferably 1.2 µm to 1.5 µm. In the cases of the third exemplary embodiment and the fourth exemplary embodiment of the invention as described below, the length of one side of the region forming the third color pattern is preferably 0.5 µm to 2.0 µm, and more preferably 0.7 µm to 1.4 µm.

A specific exemplary embodiment of the dry-etching in the removal of the color pattern is not particularly limited, and the exemplary embodiment of the known dry-etching may be suitably optimized and used. A preferable exemplary embodiment of the dry-etching will be described later.

Formation of Stopper Layer

The manufacturing method of a color filter of the invention may include the formation of a stopper layer (formation of a first stopper layer and/or a second stopper layer).

Formation of First Stopper Layer

In the case where the second color pattern is formed by dry-etching (both of the formation by the "dry-etching method" and the formation by the "etch-back treatment" are included; hereinafter the same holds true.) and/or the CMP treatment in the invention, the formation of the first color pattern includes preferably the formation of the first color layer on a support and the formation of the first stopper layer on the formed first color layer (formation process of the first stopper layer). In this case, it is more preferable that the formation of the first color pattern includes forming a resist pattern on the first stopper layer using a photoresist, and dry-etching the first stopper layer and the first color layer with use of the formed resist pattern as an etching mask.

Due to this first color pattern, the upper surface of the formed first color pattern (the surface of the color pattern at the side far from the support among two surfaces parallel to the support; hereinafter the same holds true.) is covered by the first stopper layer. Therefore, the first color pattern may be more effectively prevented from a phenomenon such as the film reduction and damages from the dry-etching and/or the CMP treatment for the formation of the second color pattern. As a result, the spectral transmission characteristics of the color pixels in the color filter are easily controlled.

Formation of Second Stopper Layer

In the case where the third color pattern is formed by dry-etching (including formation both by the "dry-etching method" and by the "etch-back treatment" are included; hereinafter the same holds true) and/or the CMP treatment in the invention, it is preferable to form the second stopper layer on the first color pattern and the second color pattern, after the formation of the second color pattern and before the removal of the color patterns.

Due to the above configuration, the second stopper layer is present on the first and second color patterns (an opposite direction to the support when seen from the color pattern; hereinafter the same holds true). Therefore, the first and second color patterns may be more effectively prevented from phenomena such as film reduction and damage from dry-etching and/or the CMP treatment when forming the third color pattern. As a result, the spectral transmission characteristics of the color pixels in the color filter are easily controlled.

The first stopper layer and the second stopper layer are each preferably a layer having a lower etching rate than that of the color layer or the color pattern, and the stopper layers is preferably formed using a curable composition transparent to visible light, whereby a color filter may be produced without complete removal of the stopper layer. Herein, "transparent to visible light" means that the transmittance of the visible light is about 95% or more.

Heating Process

The method of the invention preferably further includes heating a color layer after removing the resist pattern (including a color pattern, and a color pixel) at from about 100° C. to about 220° C. By the heating, moisture absorbed by the color layer (including a color pattern and a color pixel) may be evaporated, and the occurrence of defects in coating which might be performed afterwards may be effectively suppressed.

Adhesiveness-improving Process

The method of manufacturing a color filter of the invention preferably includes: improving adhesiveness of the surface of a support which has been subjected to dry-etching; forming a color layer on the support which has been subjected to the adhesiveness-improving; exposing the formed color layer to light; and developing the exposed color layer to form the color pattern.

Due to this method of manufacturing a color filter of the invention, the adhesiveness between the color layer (color pattern) and the support may be improved, and peeling of the color layer (color pattern) at the time of development may be effectively suppressed. For example, even in the case where the support surface becomes hydrophilic (for example, when a contact angle between the support surface and water is less than 40°) by the dry-etching treatment, accurate pattern size and adhesiveness improvement may be more effectively attained together, without overexposure (to raise an exposure amount) for improving the adhesiveness. Accordingly, this is especially effective when the color pattern is small.

In the method of manufacturing of a filter color of the invention, specific exemplary embodiments for applying the adhesiveness-improving treatment includes preferably the following two exemplary embodiments. These two embodiments may be used in combination.

The first exemplary embodiment includes applying an adhesiveness-improving treatment to the support surface after the dry-etching treatment for the removal of the color pattern, forming a third color layer on the support applied with the adhesiveness-improving treatment, exposing the formed third color layer, and developing the exposed layer to form a third color pattern.

According to this exemplary embodiment, peeling of the third color pattern may be effectively suppressed.

The second exemplary embodiment includes forming a first color pattern by the dry-etching method, applying an adhesiveness-improving treatment to the support surface after the dry-etching treatment, forming a second color layer on the support to which has been applied the adhesiveness-improving treatment, exposing the formed second color layer to light, and developing the exposed layer to form a second color pattern.

According to this exemplary embodiment, peeling of the second color pattern may be effectively suppressed.

The adhesiveness-improving treatment is preferably a hydrophobic treatment in view of the effect of improvement in the adhesiveness, and more preferably a hydrophobic treatment by which a contact angle between the support surface and water is 40° or more.

Also, as the adhesiveness-improving treatment, at least one of a treatment of adding an adhesion auxiliary agent and a fluorination treatment using plasma is preferable.

Applying Adhesion Auxiliary Agent

Applying an adhesion auxiliary agent can be performed by the methods employed in the general positive resist process, such as vapor processing, coating, inkjet application, printing, or deposition.

In the case of coating, various known coating methods may be applied, such as slit coating, spin coating, cast coating, roll coating, spray coating, or the like.

In the case of inkjet application, ejection by an inkjet method using an inkjet head may be applicable. Examples of the inkjet head includes those used in an electrical charge controlling method of ejecting ink droplets by making use of electrostatic induction force, a drop-on-demand method (i.e., a pressure pulse method) of ejecting ink droplets by making use of vibration pressure of piezo-elements, an acoustic inkjet method of ejecting ink droplets by making use of the radiation pressure obtained by converting an electric signal to an acoustic beam and applying the acoustic beam to ink, and a thermal inkjet method (i.e., bubble jet (registered trademark)) of ejecting ink droplets by heating ink to thereby generate bubbles, and making use of generated pressure.

In the case of printing, a screen printing method may be applied.

Examples of the deposition include atomizing by a spray, deposition by evaporation, and dipping. Among them, deposition by evaporation is preferable, and in this case, the treatment is preferably performed under a reduced pressure for about 30 to about 600 seconds.

In the case of coating or inkjet application, a solution including an adhesion auxiliary agent is used. The solution may be prepared by mixing a solvent such as cyclohexanone with a desirable adhesion auxiliary agent and dissolving the adhesion auxiliary agent.

After the adhesion auxiliary agent is applied, it is preferable to dry the adhesion auxiliary agent at from 50° C. to 300° C. for about 30 to about 600 seconds using a hot plate, an oven, or the like.

As the adhesion auxiliary agent, silicon nitride, silicon oxide, and the like may be used from the viewpoints of the adhesiveness between a curable portion (i.e. image) and a color layer (specifically, an organic silane compound) as mentioned below, and the developing property of an uncured portion. In particular, from the viewpoints that a color pattern excellent in adhesiveness to the surface of a support is formed without increasing the development residue in the non-cured portion (non-exposed portion), a compound represented by the following Formula (A) is preferable. However, the invention is not limited thereto.

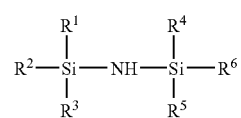

Formula (A)

In Formula (A), $R^1$ to $R^6$ each independently represent a hydrocarbon group having 1 to 4 carbon atoms, and may include a ring structure and/or an unsaturated bond in the structure thereof. Examples of the hydrocarbon group having 1 to 4 carbon atoms include a methyl group, an ethyl group, a propyl group, and a butyl group. Particularly, each of $R^1$ to $R^6$ preferably represents a methyl group.

Specific examples of the compound represented by Formula (A) are recited hereinafter. However, the invention is not limited to these examples.

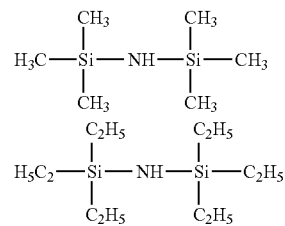

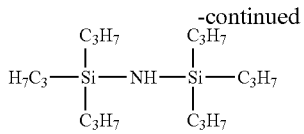

The amount of the adhesion auxiliary agent existing on the support is preferably such that water provided on a support treated with the auxiliary agent has a contact angle of 50° or more, and more preferably such that it has a contact angle of 60° or more with respect to the surface of the support. When the amount of the auxiliary agent is within such a range, the adhesiveness of the color pattern constituting a color filter may be effectively improved, while reducing development residues from the removed unexposed region of the curable layer as described hereinafter.

Fluorination Treatment Using Plasma

A fluorination treatment using a plasma is preferably performed by plasma generation from a fluorine-containing gas (e.g. fluorocarbons such as $CF_4$, etc.), followed by the plasma ion irradiation. From the viewpoint of hydrophobicity, it is more preferable to generate plasma from a fluorocarbon gas not containing oxygen gas and treating the surface of a support with the plasma.

Specifically, the fluorination treatment using plasma may be performed in the same manner as other dry etching treatment described in the invention.

Any known gas may be used as the fluorine-containing gas in the invention, and a gas represented by the following Formula (B) is preferable.

$$C_nH_mF_l \qquad \text{Formula (B)}$$

In Formula (B), n represents 1 to 6, m represents 0 to 13, and l represents 1 to 14.

The fluorine-containing gas represented by Formula (B) is optionally selected preferably from the group consisting of $CF_4$, $C_2F_6$, $C_3F_8$, $C_2F_4$, $C_4F_8$, $C_4F_6$, $C_5F_8$, and $CHF_3$, and mixtures thereof. Among them, such a fluorine-containing gas is optionally selected more preferably from the group consisting of $CF_4$, $C_2F_6$, $C_4F_8$, and $CHF_3$, and further preferably from the group consisting of $CF_4$ and $C_2F_6$. $CF_4$ is especially preferable in view of its wide usability.

Also, the fluorine-containing gas in the invention may be one selected from the group, and a gas mixture of two or more of the gases selected from the group may be used.

The plasma treatment is preferably performed using a radiofrequency (RF) power of 300 W or more for 5 seconds or less.

As mentioned above, each of the processes constituting the manufacturing method of a color filter of the invention is described, and the processes may be used in any combination thereof. For example, in the formation of the first to third color patterns, the photolithography method, dry-etching method, and planarization method may be each independently applied, and the combination of a plurality of the methods may be used for manufacturing a color filter.

Further, any processes other than the above processes may be included as long as they do not affect the effect of the invention.

Hereinafter, specific exemplary embodiments (i.e., the first exemplary embodiment to the fourth exemplary embodiment) of the method of manufacturing a color filter in accordance with the invention will be described. However, the invention is not limited to these exemplary embodiments.

First Exemplary Embodiment

In the first exemplary embodiment, the third color pattern is arranged in a checkered pattern (i.e., the Bayer arrangement), and all of the first to third color patterns are formed by the photolithography method. Hereinafter, the first exemplary embodiment will be described with reference to FIGS. 1A to 8C.

In FIGS. 1A to 8C, FIGS. 1A, 2A, 3A, 4A, 5A, 6A, 7A, and 8A each show a plan view, and FIGS. 1B, 2B, 3B, 4B, 5B, 6B, 7B, and 8B each show a sectional view taken along the line A-A' of FIGS. 1A, 2A, 3A, 4A, 5A, 6A, 7A, and 8A, respectively. In addition, in FIGS. 5A to 8C, FIGS. 5C, 6C, 7C, and 8C each show a sectional view taken along the line B-B' of FIGS. 1A, 2A, 3A, 4A, 5A, 6A, 7A, and 8A, respectively.

Formation of First Color Pattern

Figure 1B:
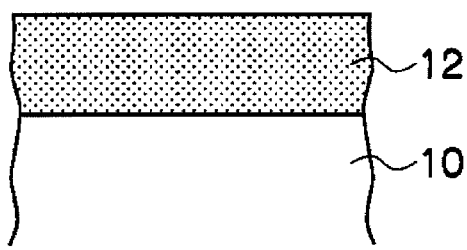
FIG. 1B is a sectional view taken along the line A-A' of FIG. 1A.
Figure 2A:
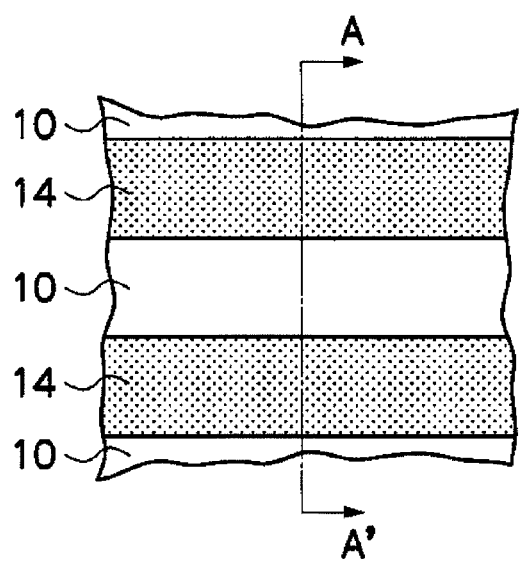
FIG. 2A is a plan view of the first exemplary embodiment and a third exemplary embodiment of the invention.
Figure 2B:
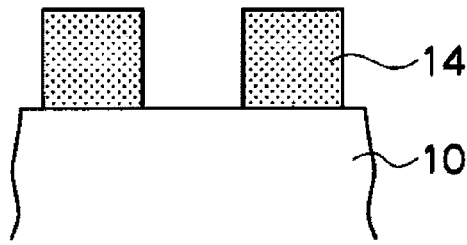
FIG. 2B is a sectional view taken along the line A-A' of FIG. 2A.

Herein, a red color pattern, a blue color pattern and a green color pattern are formed as examples of a first color pattern, a second color pattern and a third color pattern respectively. First, as shown in FIGS. 1A and 1B, a red pattern material is applied on a support 10 to form a red color layer 12, which is a first color layer, in a predetermined film thickness. After that, pattern exposure, development, and post-baking treatment are performed to form a red color pattern 14 as a first color pattern in a stripe pattern as shown in FIGS. 2A and 2B.

Formation of Second Color Pattern

Figure 3A:
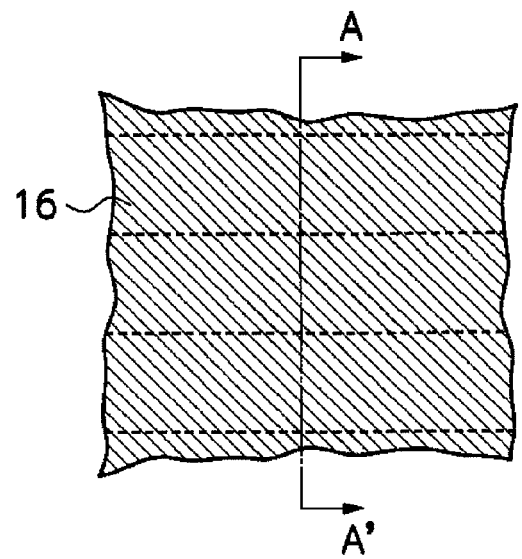
FIG. 3A is a plan view of the first exemplary embodiment and a third exemplary embodiment of the invention.
Figure 3B:
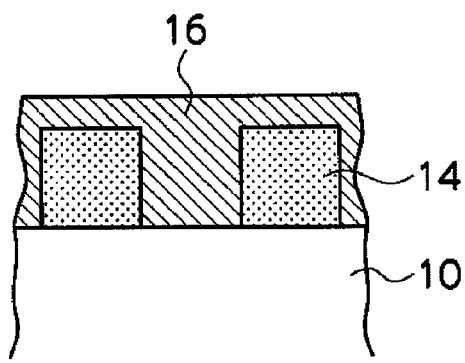
FIG. 3B is a sectional view taken along the line A-A' of FIG. 3A.
Figure 4A:
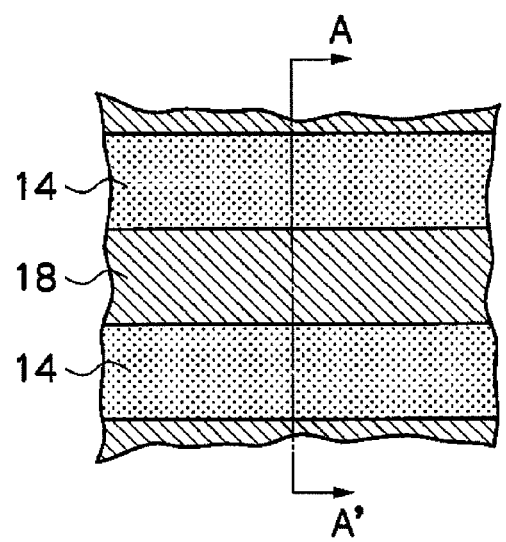
FIG. 4A is a plan view of the first exemplary embodiment and a third exemplary embodiment of the invention.
Figure 4B:
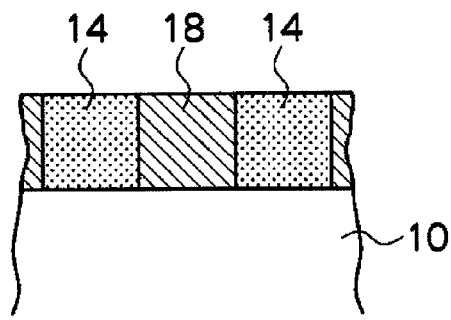
FIG. 4B is a sectional view taken along the line A-A' of FIG. 4A.

Next, as shown in FIGS. 3A and 3B, a blue filter material is applied on the surface of the side of the support on which the red color pattern 14 is formed so that a blue color layer 16 which is the second color layer is formed in a predetermined film thickness. After that, a region sandwiched between the red color patterns 14 is subjected to pattern exposure, development and post-baking treatment to form a blue color pattern 18 as the second color pattern in a stripe pattern as shown in FIGS. 4A and 4B.

Accordingly, a stripe pattern formed by the red color pattern 14 and the blue color pattern 18, which are adjacent to each other, is formed. At that time, when a color filter array is designed to be an assembly of squares, the ratio of the widths of the red color pattern 14 and the blue color pattern 18 (width of the red color pattern 14:width of the blue color pattern 18) may preferably be 1:1. However, the ratio may vary depending on the device design.

Removal of Color Pattern

Figure 5A:
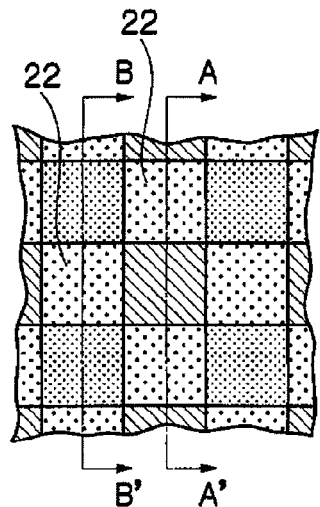
FIG. 5A is a plan view of the first exemplary embodiment of the invention.
Figure 5B:
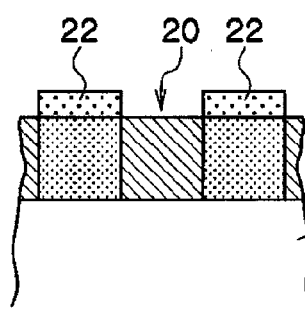
FIG. 5B is a sectional view taken along the line A-A' of FIG. 5A.
Figure 5C:
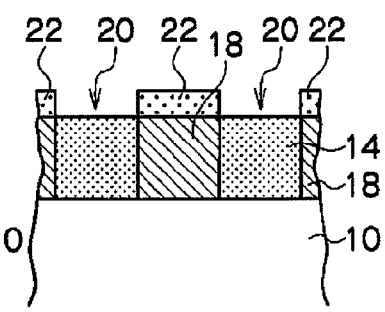
FIG. 5C is a sectional view taken along the line B-B' of FIG. 5A.

Next, as shown in FIGS. 5A to 5C, a photoresist is applied on the surface of the side on the support on which the red color pattern 14 and the blue color pattern 18 are formed, and a portion of the photoresist in a region where the third color pattern is to be formed (for example, a region 20 for forming a green color pixel) and which is on the first color pattern and/or the second color pattern is removed by exposure to light and development, followed by post-baking treatment, thereby forming a resist pattern 22.

Next, as shown in FIGS. 6A to 6C, a region 20 for forming a green color pixel on the red color pattern 14 and the blue color pattern 18 is removed by the dry-etching method to form a red color pixel 28 and a blue color pixel 30, and then resist patterns 22 on the red color pixel 28 and the blue color pixel 30 are removed.

Formation of Third Color Pattern

Figure 7A:
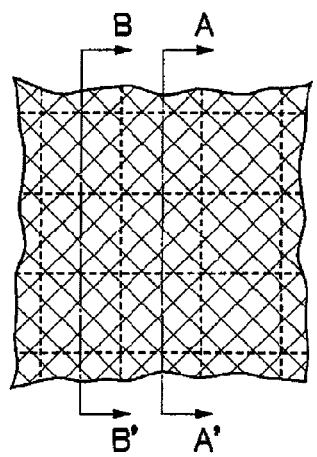
FIG. 7A is a plan view of the first exemplary embodiment of the invention.
Figure 7B:
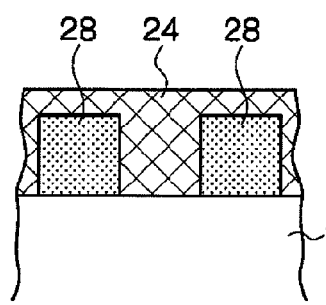
FIG. 7B is a sectional view taken along the line A-A' of FIG. 7A.
Figure 7C:
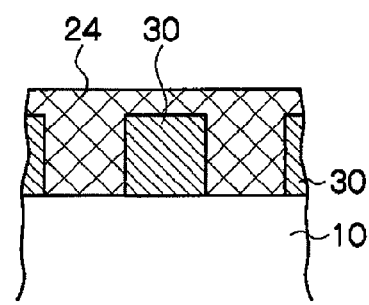
FIG. 7C is a sectional view taken along the line B-B' of FIG. 7A.

Next, as shown in FIGS. 7A to 7C, a green filter material is applied on the surface of the side of the support on which the red color pixel 28 and the blue color pixel 30 are formed to form a green color layer 24 which is the third color layer.

In view of the adhesiveness, the heating and the adhesiveness-improving treatment are performed preferably prior to the application of the green filter material. Also, in view of the same reason, it is preferable that the green filter material includes an organic silane compound described hereinafter.

A region for forming a green color pixel on the green color layers 24 is exposed to light, developed, and post-baked to form a green color pattern 26 (i.e. a green color pixel 32) which is the third color pattern.

Figure 8A:
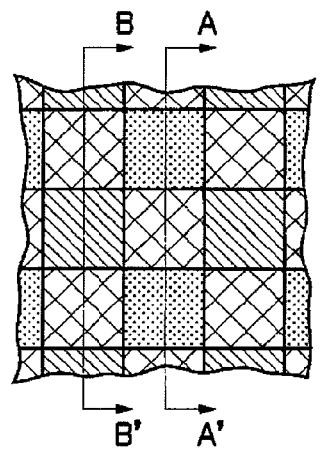
FIG. 8A is a plan view of the first exemplary embodiment of the invention.
Figure 8B:
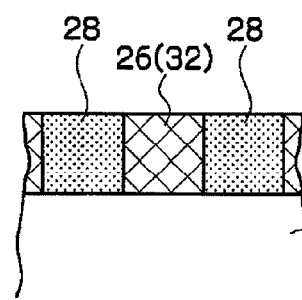
FIG. 8B is a sectional view taken along the line A-A' of FIG. 8A.
Figure 8C:
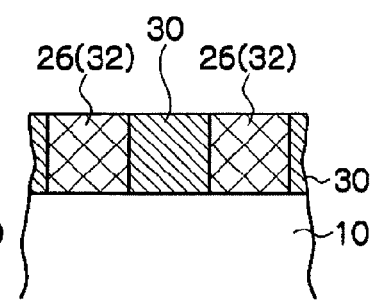
FIG. 8C is a sectional view taken along the line B-B' of FIG. 8A.

Accordingly, a color filter array including a red color pixel 28, a blue color pixel 30, and a green color pixel 32 is formed as shown in FIGS. 8A to 8C.

Second Exemplary Embodiment

The first to third color patterns are formed by the photolithography method as well as the dry-etching method (including both cases of formation by the "dry-etching method" and formation by the "etch-back method"; hereafter the same holds true).

Hereinafter, the second exemplary embodiment, in which the third color pattern is arranged in a checkered pattern (i.e., the Bayer arrangement), including forming all of the first to third color patterns by dry-etching (and, if necessary, the CMP treatment) will be described with reference to FIGS. 9A to 20C.

In FIGS. 9A to 20C, FIGS. 9A, 10A, 11A, 12A, 13A, 14A, 15A, 16A, 17A, 18A, 19A, and 20A each show a plan view, and FIGS. 9B, 10B, 11B, 12B, 13B, 14B, 15B, 16B, 17B, 18B, 19B, and 20B each show a sectional view taken along the line A-A' of FIGS. 9A, 10A, 11A, 12A, 13A, and 14A, and FIGS. 15C, 16C, 17C, 18C, 19C, and 20C each show a sectional view taken along the line B-B' of FIGS. 15A, 16A, 17A, 18A, 19A, and 20A.

Formation of First Color Pattern

Figure 9A:
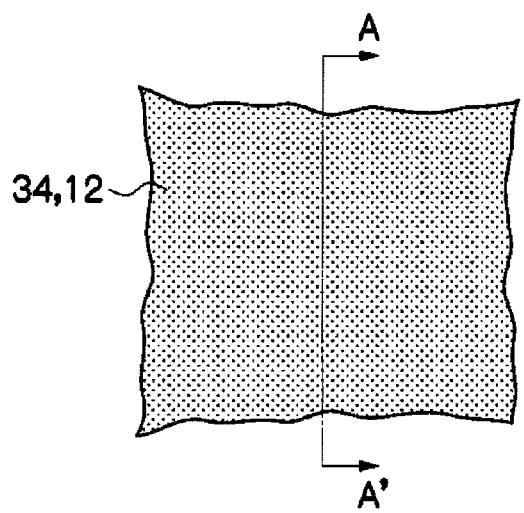
FIG. 9A is a plan view of a second exemplary embodiment and a fourth exemplary embodiment of the invention.
Figure 9B:
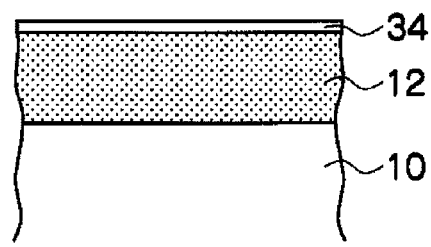
FIG. 9B is a sectional view taken along the line A-A' of FIG. 9A.

As shown in FIGS. 9A and 9B, for example, a red filter material is applied on a support 10 to form a red color layer 12 which is the first color layer, and a first stopper layer 34 is further formed on the formed red color layer 12, followed by baking treatment.

Since FIG. 9A is a plan view in the case where the first stopper layer 34 is a transparent film, the dot pattern in FIG. 9A shows the red color layer 12 which lies below the first stopper layer 34, and the white ground showing the first stopper layer 34 as shown in FIG. 9B is not shown in the plan view (hereinafter, the same holds true in the following figures).

Figure 10A:
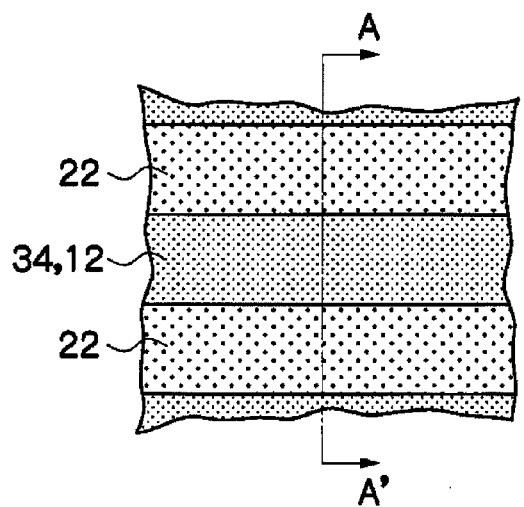
FIG. 10A is a plan view of the second exemplary embodiment and a fourth exemplary embodiment of the invention.
Figure 10B:
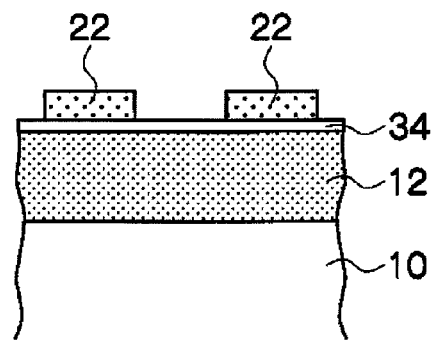
FIG. 10B is a sectional view taken along the line A-A' of FIG. 10A.
Figure 11A:
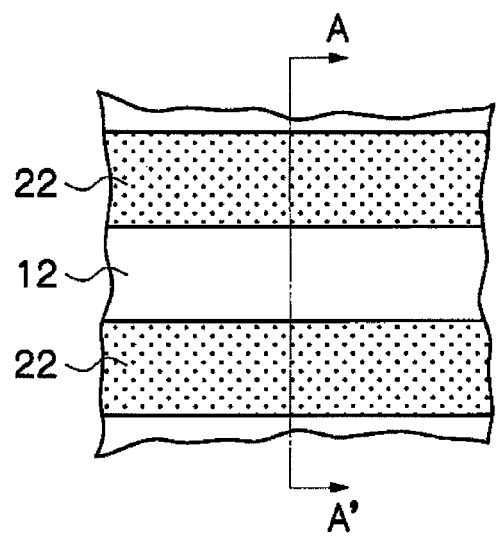
FIG. 11A is a plan view of the second exemplary embodiment and a fourth exemplary embodiment of the invention.
Figure 11B:
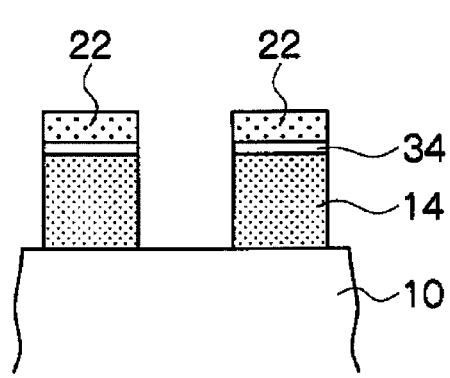
FIG. 11B is a sectional view taken along the line A-A' of FIG. 11A.

After that, as shown in FIGS. 10A and 10B, a photoresist is applied on the stopper layer 34 to form a coating film, and the film is pattern-exposed, developed, and post-baked to form a resist pattern 22 in a region where a red color pattern is to be formed. Then, the dry-etching of the first stopper layer 34 and the red color layer 12 is performed using the resist pattern 22 as an etching mask to form a red color pattern 14 as the first color pattern as shown in FIGS. 11A and 11B. After that, the resist pattern 22 is removed.

In the second exemplary embodiment, as shown in FIGS. 11A and 11B, the red color pattern 14 (i.e., the first color pattern) is formed into a stripe pattern and has the first stopper layer 34 thereon.

Formation of Second Color Pattern

Figure 12A:
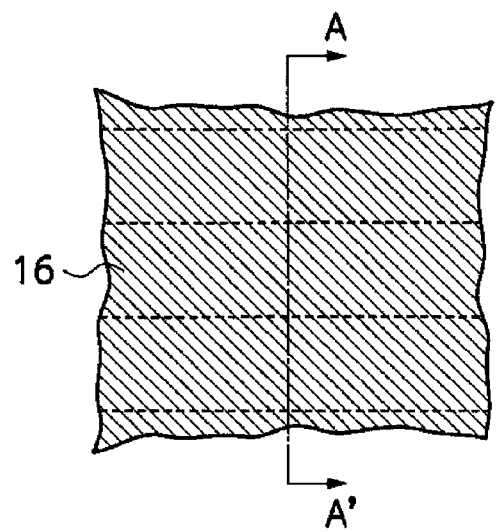
FIG. 12A is a plan view of the second exemplary embodiment and a fourth exemplary embodiment of the invention.
Figure 12B:
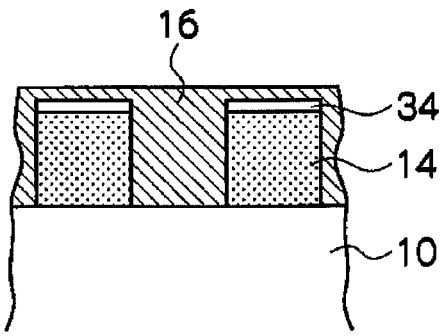
FIG. 12B is a sectional view taken along the line A-A' of FIG. 12A.

Next, as shown in FIGS. 12A and 12B, for example, a blue filter material is applied on the surface of the side of the support on which the first stopper layer 34 and the red color pattern 14 are formed to form a blue color layer 16, which is the second color layer, in a predetermined film thickness.

Figure 13A:
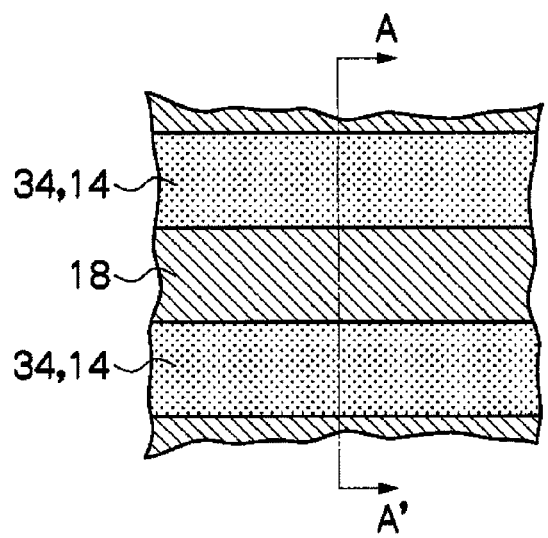
FIG. 13A is a plan view of the second exemplary embodiment and a fourth exemplary embodiment of the invention.
Figure 13B:
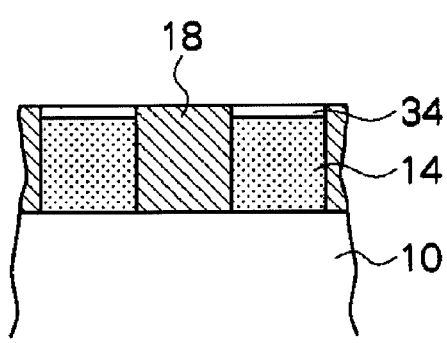
FIG. 13B is a sectional view taken along the line A-A' of FIG. 13A.

After that, the etch-back treatment and/or the CMP treatment is performed until the first stopper layer 34 is exposed to form a blue color pattern 18 as the second color pattern in a stripe pattern as shown in FIGS. 13A and 13B. By these treatments, a stripe pattern in which the red color pattern 14 and the blue color pattern 18 are adjacent to each other is formed.

Figure 14A:
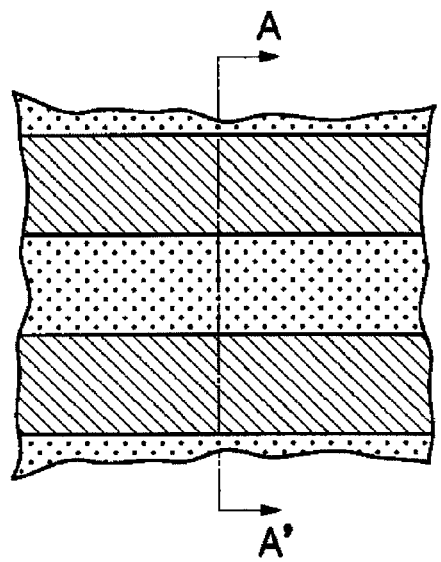
FIG. 14A is a plan view of the second exemplary embodiment and a fourth exemplary embodiment of the invention.
Figure 14B:
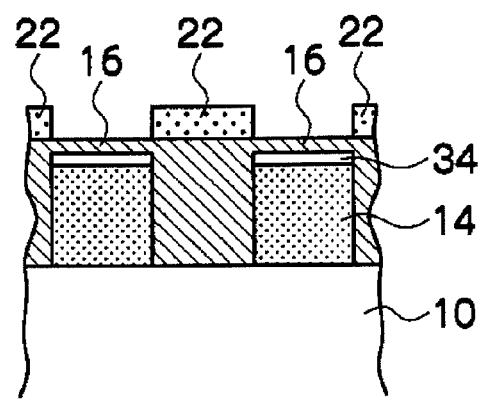
FIG. 14B is a sectional view taken along the line A-A' of FIG. 14A.

After the blue color layer 16 has been formed as in FIGS. 12A and 12B, in stead of the etch-back treatment and/or the CMP treatment, a photoresist may be applied to form the resist pattern 22 so as to cover a region where the blue color pattern is to be formed as shown in FIG. 14B, and the etching may be performed until the first stopper layer 34 is exposed, followed by removal of the resist pattern 22. The height of the blue color pattern differs from the height of the red color pattern 14 after the etching. The etch-back treatment and/or the CMP treatment may be again performed for planarization of the surface of the layers as shown in FIGS. 13A and 13B.

Formation of Second Stopper Layer and Removal of Color Pattern

Figure 15A:
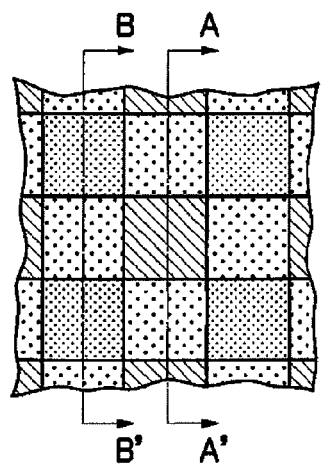
FIG. 15A is a plan view of the second exemplary embodiment of the invention.
Figure 15B:
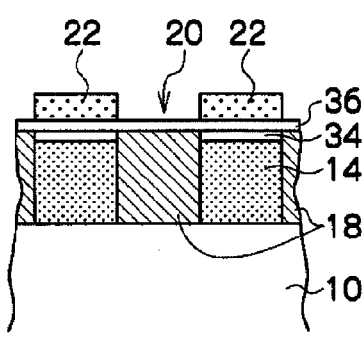
FIG. 15B is a sectional view taken along the line A-A' of FIG. 15A.
Figure 15C:
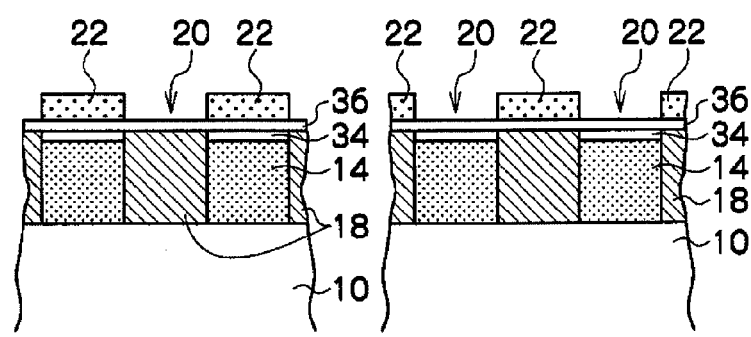
FIG. 15C is a sectional view taken along the line B-B' of FIG. 15A.

Next, as shown in FIGS. 15A to 15C, the second stopper layer 36 is formed on the surface of the side of the support on which the red color pattern 14, the first stopper layer 34, and the blue color pattern 18 are formed. A photoresist is applied on the second stopper layer 36, and the layers in a region where the third color layer is to be formed, for example, a region 20 for forming a green color pixel, are removed by the pattern exposure and development. After that, the post-baking treatment is performed to form a resist pattern 22.

Since FIG. 15 A is a plan view in the case where the first stopper layer 34 and the second stopper layer 36 are transparent films, the dot pattern in FIG. 15A shows the red color layer 14 of the lower layer and the slash pattern in FIG. 15A shows the blue color pattern 18 of the lower layer, and the white grounds showing the first stopper layer 34 and the second stopper layer 36 as shown in FIGS. 15B and 15C are not shown in the plan view (hereinafter, the same holds true in the following figures).

Figure 16A:
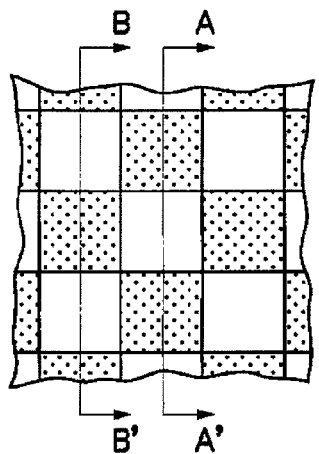
FIG. 16A is a plan view of the second exemplary embodiment of the invention.
Figure 16B:
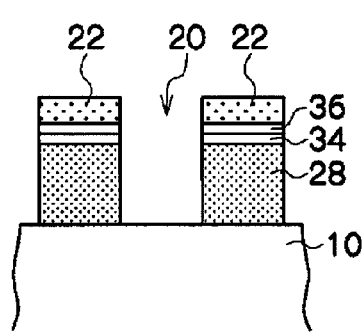
FIG. 16B is a sectional view taken along the line A-A' of FIG. 16A.
Figure 16C:
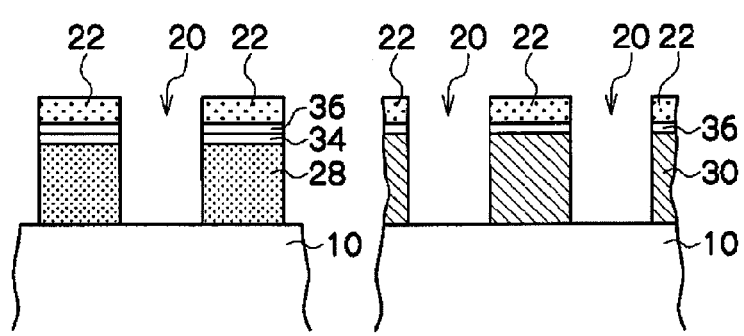
FIG. 16C is a sectional view taken along the line B-B' of FIG. 16A.

Next, as shown in FIGS. 16A to 16C, a portion of at least one of the first stopper layer 34, the second stopper layer 36, the red color pattern 14 and the blue color pattern 18 in the region 20 for forming a green color pixel is removed by the dry etching using the resist pattern 22 as an etching mask, thereby forming a red color pixel 28 and a blue color pixel 30. After that, as shown in FIGS. 17A to 17C, the resist pattern 22 is removed.

In the second exemplary embodiment, as shown in FIGS. 15A to 17C, the first stopper layer 34 and the second stopper layer 36 are laminated on the red color pixel 28, and the second stopper layer 36 is laminated on the blue color pixel 30.

Formation of Third Color Pattern

Next, as shown in FIGS. 18A to 18C, a green filter material is applied on the surface of the side of the support on which the red color pixel 28, the blue color pixel 30, the first stopper layer 34, and the second stopper layer 36 are formed to form a green color layer 24 which is the third color layer.

After that, the etch-back treatment and/or the CMP treatment is performed until the second stopper layer is exposed, thereby forming a green color pattern 26 (i.e. a green color pixel 32) which is the third color pattern. The state after the etch-back and/or the CMP treatment is shown in FIGS. 20A to 20C.

Figure 19A:
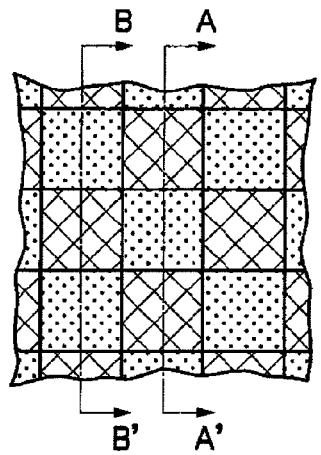
FIG. 19A is a plan view of the second exemplary embodiment of the invention.
Figure 19B:
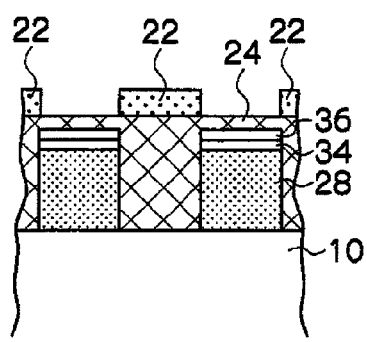
FIG. 19B is a sectional view taken along the line A-A' of FIG. 19A.
Figure 19C:
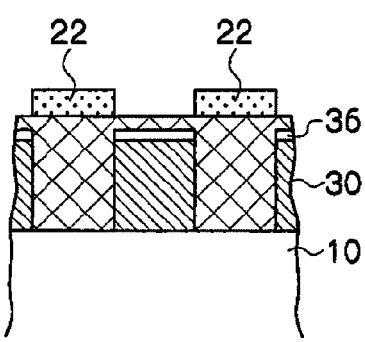
FIG. 19C is a sectional view taken along the line B-B' of FIG. 19A.

After the green color layer 24 is formed as shown in FIGS. 18A to 18C, in place of the exemplary embodiment of the etch-back treatment, the resist pattern 22 is formed to cover the region forming the green color pixel, and after that, the dry-etching may be performed until the second stopper layer 36 is exposed, followed by removal of the resist pattern 22, as shown in FIGS. 19A to 19C. A difference in height arises in the green color pixel 32 to the red color pixel 28 and the blue color pixel 30 after the etching. Therefore, the etch-back treatment may be again performed to make a planarization like the form as shown in FIGS. 20A to 20C.

Figure 20A:
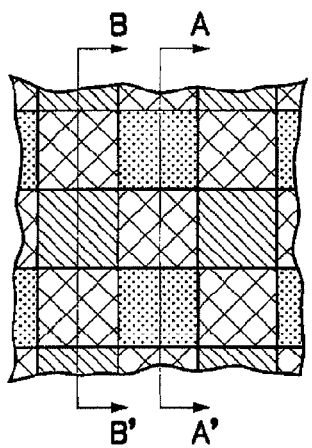
FIG. 20A is a plan view of the second exemplary embodiment of the invention.
Figure 20B:
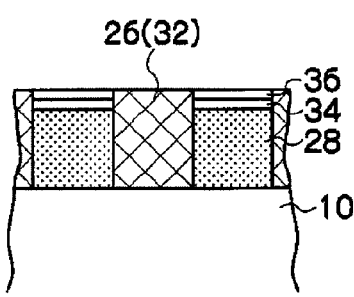
FIG. 20B is a sectional view taken along the line A-A' of FIG. 20A.
Figure 20C:
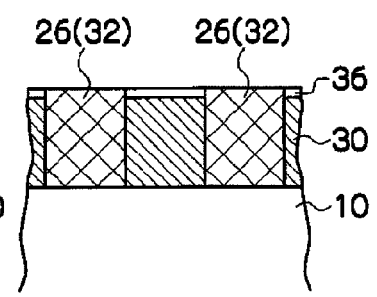
FIG. 20C is a sectional view taken along the line B-B' of FIG. 20A.

By the above processing, a color filter array having a red color pixel 28, a blue color pixel 30 and a green color pixel 32 is formed as shown in FIGS. 20A to 20C.

Third Exemplary Embodiment

In the third exemplary embodiment, the third color pattern is arranged in a stripe pattern extending in a direction intersecting with the first color pattern and the second color pattern, and all of the first to third color patterns are formed by the photolithography method. Hereinafter, the third exemplary embodiment will be described with reference to FIGS. 1A to 4B and FIGS. 21A to 24C.

In FIGS. 1A to 4B and FIGS. 21A to 24C, FIGS. 1A, 2A, 3A, 4A, 21A, 22A, 23A, and 24A each show a plan view, and FIGS. 1B, 2B, 3B, 4B, 21B, 22B, 23B, and 24B each show a sectional view taken along the line A-A' of FIGS. 1A, 2A, 3A, 4A, 21A, 22A, 23A, and 24A, respectively. In addition, in FIGS. 21A to 24C, FIGS. 21C, 22C, 23C and 24C each show a sectional view taken along the line B-B' of FIGS. 21A, 22A, 23A, and 24A, respectively.

Formation of First Color Pattern to Formation of Second Color Pattern

First, a first color pattern and a second color pattern are formed in the same manner as in Example 1 (FIGS. 1A to 4B).

Removal of Color Pattern

Next, as shown in FIGS. 21A to 21C, a photoresist is applied on the surface of the side on the support on which the red color pattern 14 and the blue color pattern 18 are formed, and a portion of the photoresist in a region where the third color pattern is to be formed (for example, a region 120 for forming a green color pixel) and which is on the first color pattern and/or the second color pattern is removed by exposure to light and development, followed by post-baking treatment, thereby forming a resist pattern 122.

In this case, the region where the third color pattern is to be formed (for example, a region 120 for forming a green color pixel) and the resist pattern 122 are respectively formed into a stripe pattern extending in a direction intersecting with (e.g., a direction perpendicular to) the stripe-shaped red color pattern 14 and the stripe-shaped blue color pattern 18.

Figure 22A:
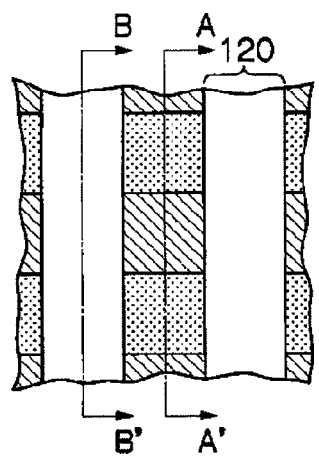
FIG. 22A is a plan view of the second exemplary embodiment of the invention.
Figure 22B:
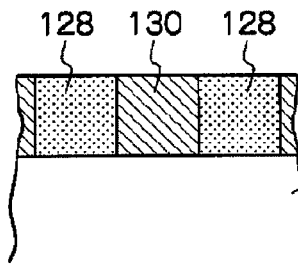
FIG. 22B is a sectional view taken along the line A-A' of FIG. 22A.
Figure 22C:
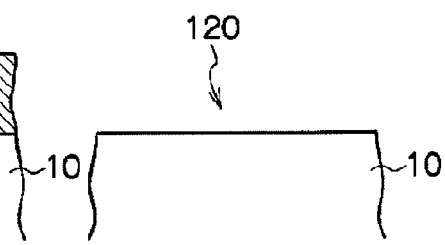
FIG. 22C is a sectional view taken along the line B-B' of FIG. 22A.

Next, as shown in FIGS. 22A to 22C, a region 120 for forming a green color pixel on the red color pattern 14 and the blue color pattern 18 is removed by the dry-etching method to form a red color pixel 128 and a blue color pixel 130, and then resist patterns 122 on the red color pixel 128 and the blue color pixel 130 are removed.

Formation of Third Color Pattern

Figure 23A:
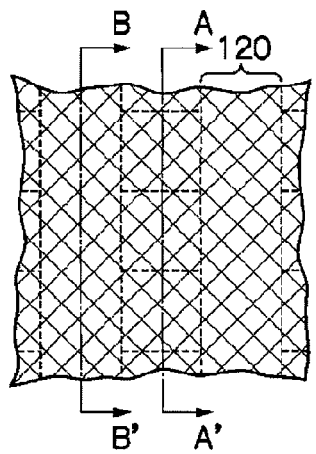
FIG. 23A is a plan view of the second exemplary embodiment of the invention.
Figure 23B:
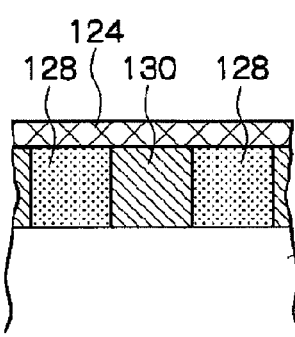
FIG. 23B is a sectional view taken along the line A-A' of FIG. 23A.
Figure 23C:
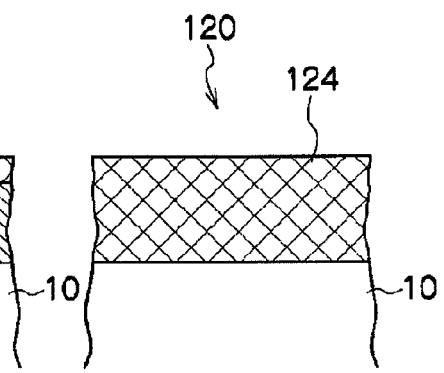
FIG. 23C is a sectional view taken along the line B-B' of FIG. 23A.

Next, as shown in FIGS. 23A to 23C, a green filter material is applied on the surface of the side of the support on which the red color pixel 128 and the blue color pixel 130 are formed to form a green color layer 124 which is the third color layer.

In view of the adhesiveness, the heating and the adhesiveness-improving treatment are performed preferably prior to the application of the green filter material. Also, in view of the same reason, it is preferable that the green filter material includes an organic silane compound described hereinafter.

A region 120 for forming a green color pixel on the green color layers 124 is exposed to light, developed, and post-baked to form a green color pattern 126 (i.e. a green color pixel 132) which is the third color pattern.

Figure 24A:
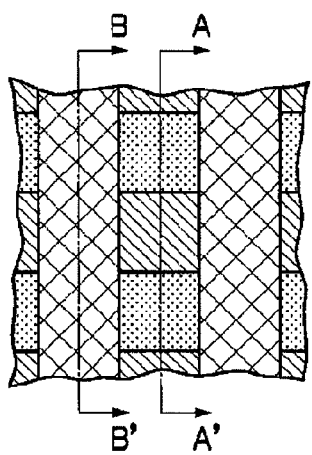
FIG. 24A is a plan view of the second exemplary embodiment of the invention.
Figure 24B:
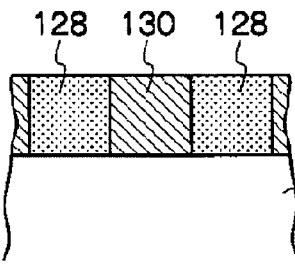
FIG. 24B is a sectional view taken along the line A-A' of FIG. 24A.
Figure 24C:
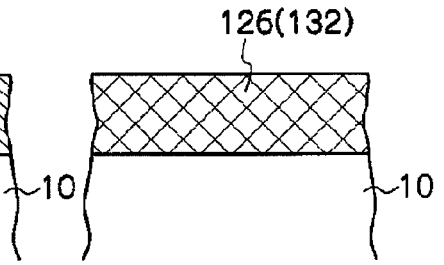
FIG. 24C is a sectional view taken along the line B-B' of FIG. 24A.

As shown in FIGS. 24A to 24C, the green color pattern 126 as a third color pattern (i.e. the green color pixel 132) is formed into a stripe pattern.

Accordingly, a color filter array including a red color pixel 128, a blue color pixel 130, and a green color pixel 132 is formed as shown in FIGS. 24A to 24C.

Fourth Exemplary Embodiment

In the fourth exemplary embodiment, the third color pattern is arranged in a stripe pattern extending in a direction intersecting with the first color pattern and the second color pattern, and all of the first to third color patterns are formed by the dry-etching (and, if necessary, the CMP treatment). Hereinafter, the fourth exemplary embodiment will be described with reference to FIGS. 9A to 14B and FIGS. 25A to 30C.

In FIGS. 9A to 14B and 25A to 30C, FIGS. 9A, 10A, 11A, 12A, 13A, 14A, 25A, 26A, 27A, 28A, 29A, and 30A each show a plan view, and FIGS. 9B, 10B, 11B, 12B, 13B, 14B, 25B, 26B, 27B, 28B, 29B, and 30B each show a sectional view taken along the line A-A' of FIGS. 9A, 10A, 11A, 12A, 13A, 14A, 25A, 26A, 27A, 28A, 29A, and 30A, respectively. In addition, in FIGS. 25A to 30C, FIGS. 25C, 26C, 27C, 28C, 29C, and 30C each show a sectional view taken along the line B-B' of FIGS. 25A, 26A, 27A, 28A, 29A, and 30A, respectively.

Formation of First Color Pattern to Formation of Second Color Pattern

First, a first color pattern and a second color pattern are formed in the same manner as in Example 2 (FIGS. 9A to 14B).

Formation of Second Stopper Layer and Removal of Color Pattern

Figure 25A:
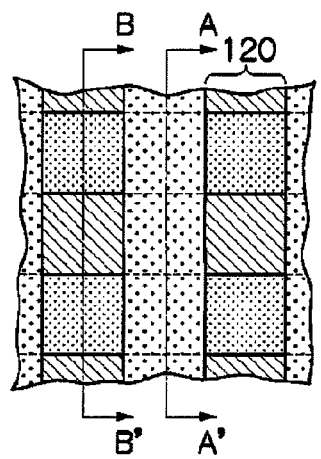
FIG. 25A is a plan view of a fourth exemplary embodiment of the invention.
Figure 25B:
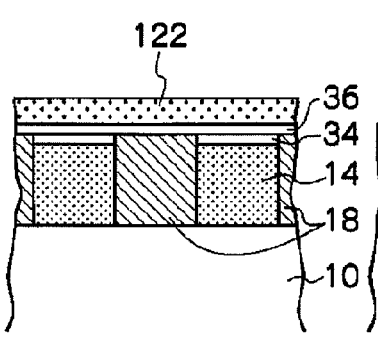
FIG. 25B is a sectional view taken along the line A-A' of FIG. 25A.
Figure 25C:
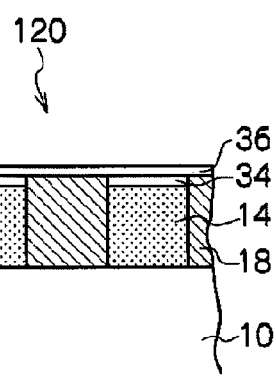
FIG. 25C is a sectional view taken along the line B-B' of FIG. 25A.

Next, as shown in FIGS. 25A to 25C, the second stopper layer 36 is formed on the surface of the side of the support on which the red color pattern 14, the first stopper layer 34, and the blue color pattern 18 are formed. A photoresist is applied on the second stopper layer 36, and the layers in a region where the third color layer is to be formed, for example, a region 120 for forming a green color pixel, are removed by the pattern exposure and development. After that, the post-baking treatment is performed to form a resist pattern 122.

In this case, the region where the third color pattern is to be formed (for example, a region 120 for forming a green color pixel) and the resist pattern 122 are respectively formed into a stripe pattern extending in a direction intersecting with (e.g., a direction perpendicular to) the stripe-shaped red color pattern 14 and the stripe-shaped blue color pattern 18.

Figure 26A:
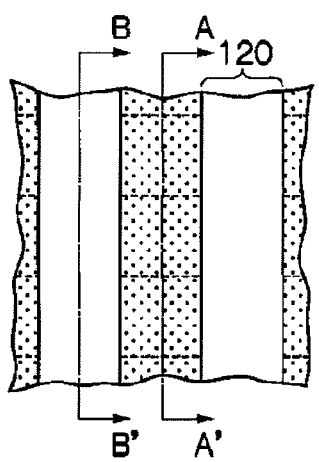
FIG. 26A is a plan view of the fourth exemplary embodiment of the invention.
Figure 26B:
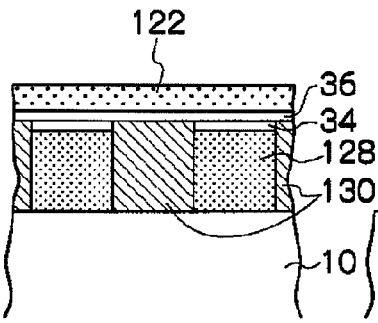
FIG. 26B is a sectional view taken along the line A-A' of FIG. 26A.
Figure 26C:
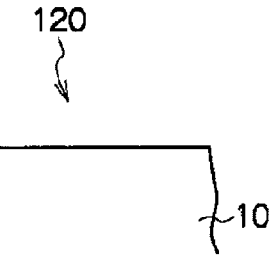
FIG. 26C is a sectional view taken along the line B-B' of FIG. 26A.
Figure 27A:
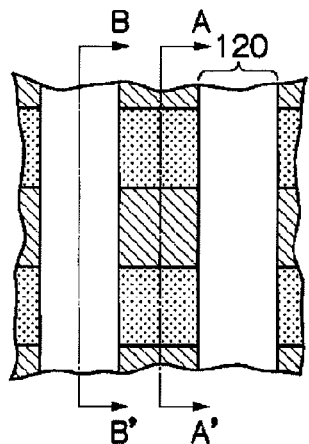
FIG. 27A is a plan view of the fourth exemplary embodiment of the invention.
Figure 27B:
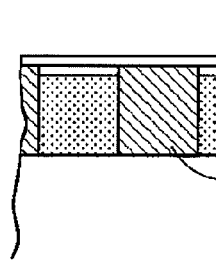
FIG. 27B is a sectional view taken along the line A-A' of FIG. 27A.
Figure 27C:
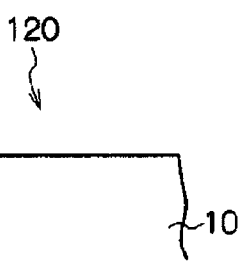
FIG. 27C is a sectional view taken along the line B-B' of FIG. 27A.

Next, as shown in FIGS. 26A to 26C, a portion of at least one of the first stopper layer 34, the second stopper layer 36, the red color pattern 14 and the blue color pattern 18 in the region 120 for forming a green color pixel is removed by the dry etching using the resist pattern 122 as an etching mask, thereby forming a red color pixel 128 and a blue color pixel 130. After that, as shown in FIGS. 27A to 27C, the resist pattern 122 is removed.

In the fourth exemplary embodiment, as shown in FIGS. 25A to 30C, the first stopper layer 34 and the second stopper layer 36 are laminated on the red color pixel 128, and the second stopper layer 36 is laminated on the blue color pixel 130.

Formation of Third Color Pattern

Figure 28A:
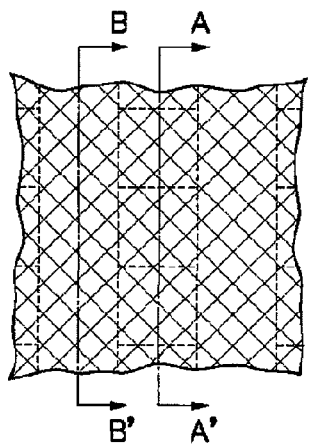
FIG. 28A is a plan view of the fourth exemplary embodiment of the invention.
Figure 28B:
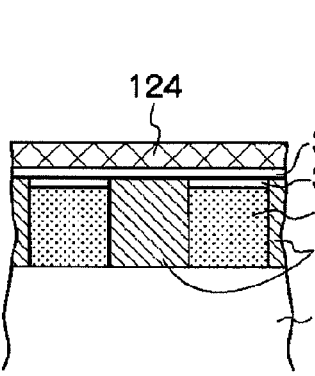
FIG. 28B is a sectional view taken along the line A-A' of FIG. 28A.
Figure 28C:
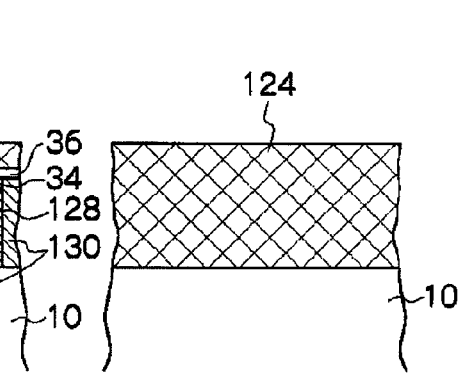
FIG. 28C is a sectional view taken along the line B-B' of FIG. 28A.

Next, as shown in FIGS. 28A to 28C, a green filter material is applied on the surface of the side of the support on which the red color pixel 128, the blue color pixel 130, the first stopper layer 34, and the second stopper layer 36 are formed to form a green color layer 124 which is the third color layer.

After that, the etch-back treatment and/or the CMP treatment is performed until the second stopper layer is exposed, thereby forming a green color pattern 126 (i.e. a green color pixel 132) which is the third color pattern. The state after the etch-back and/or the CMP treatment is shown in FIGS. 30A to 30C.

As shown in FIGS. 30A to 30C, the green color pattern 126 as a third color pattern (i.e. the green color pixel 132) is formed into a stripe pattern.

After the green color layer 124 is formed as shown in FIGS. 28A to 28C, in place of the exemplary embodiment of the etch-back treatment, the resist pattern 122 is formed to cover the region forming the green color pixel, and after that, the dry-etching may be performed until the second stopper layer 36 is exposed, followed by removal of the resist pattern 122, as shown in FIGS. 29A to 29C. A difference in height arises in the green color pixel 132 to the red color pixel 128 and the blue color pixel 130 after the etching. Therefore, the etch-back treatment may be again performed to make a planarization like the form as shown in FIGS. 30A to 30C.

By the above processing, a color filter array having a red color pixel 128, a blue color pixel 130 and a green color pixel 132 is formed as shown in FIGS. 30A to 30C.

Figure 31:
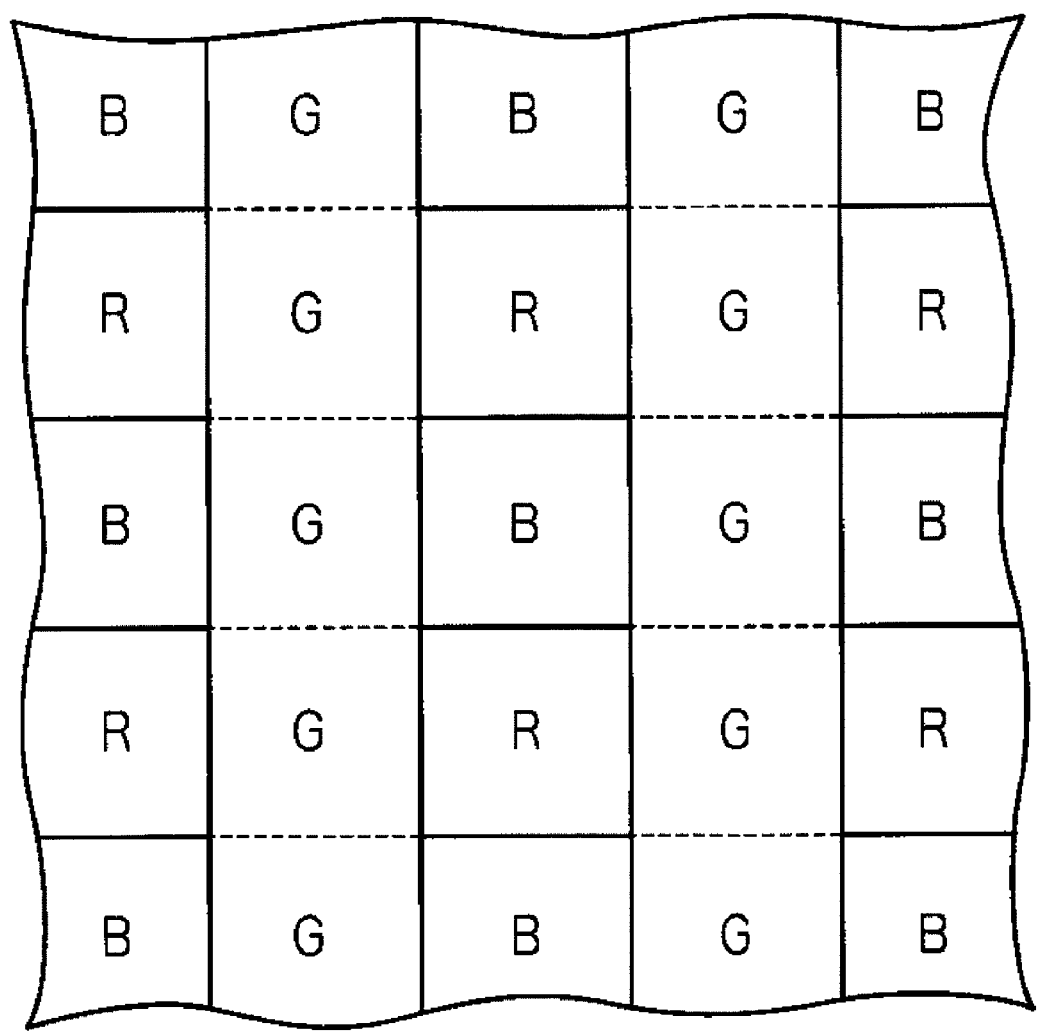
FIG. 31 shows the color filter according to the third and fourth exemplary embodiments in which the color filter is cut into a pixel unit of a solid-state image pickup element and provided with reference symbols of R (red), G (green), and B (blue).
Figure 34A:
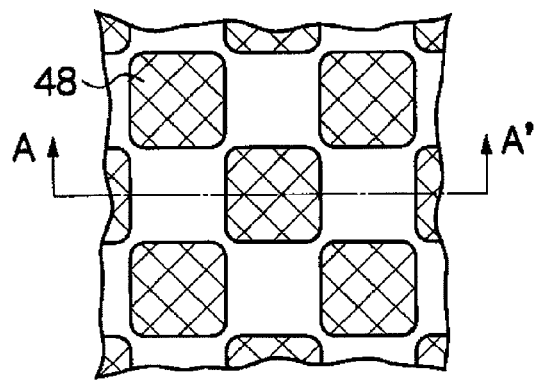
FIG. 34A is a plan view illustrating a conventional method of manufacturing a color filter.
Figure 34B:
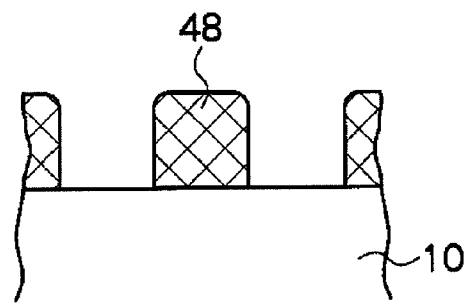
FIG. 34B is a sectional view taken along the line A-A' of FIG. 34A.
Figure 35A:
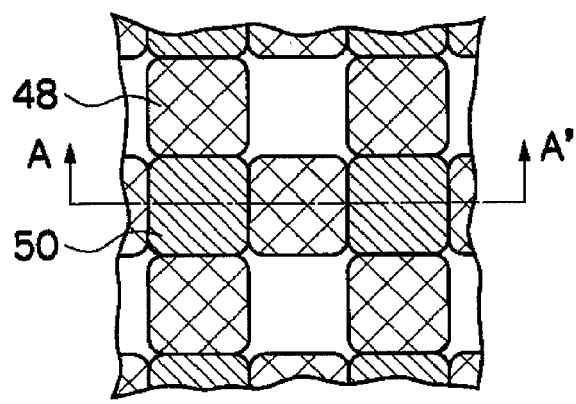
FIG. 35A is a plan view illustrating a conventional method of manufacturing a color filter.
Figure 35B:
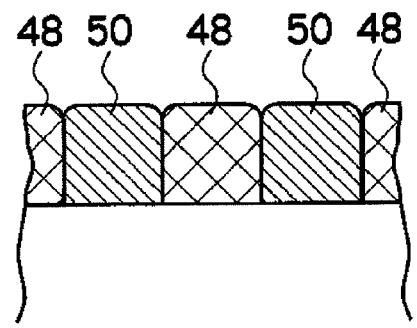
FIG. 35B is a sectional view taken along the line A-A' of FIG. 35A.
Figure 36A:
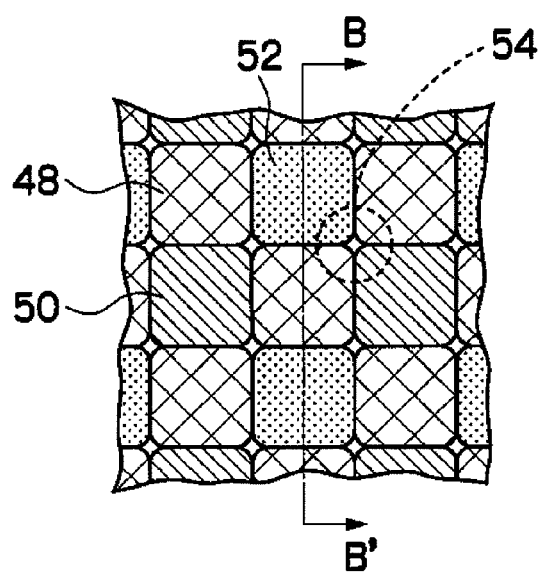
FIG. 36A is a plan view illustrating a conventional method of manufacturing a color filter.
Figure 36B:
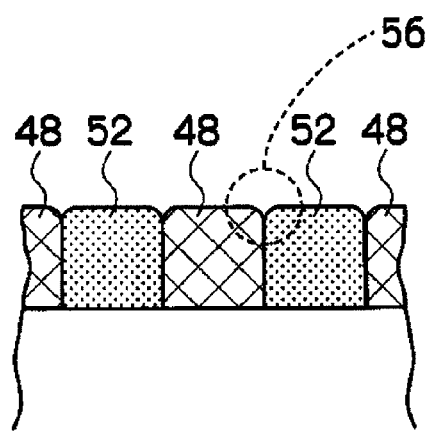
FIG. 36B is a sectional view taken along the line A-A' of FIG. 36A.

FIG. 31 shows the color filter arrays according to the third exemplary embodiment and the fourth exemplary embodiment as shown in FIGS. 24A to 24C and 30A to 30C, in which the color filter arrays are each cut into an pixel unit of a solid-state image pickup element and provided with reference symbols of R (red), G (green), and B (blue). The dotted line in FIG. 31 relates to a G pattern (i.e. green color pixel) and indicates an interface between the pixel units of the solid-state image pickup element. In actual, the G color pixels are connected with each other to form a stripe pattern as shown in FIGS. 24A to 24C and 30A to 30C.

In the third exemplary embodiment and the fourth exemplary embodiment, all of the first to third color patterns are formed into stripe patterns. In other words, all of the first to third color patterns may be formed without forming pattern corners, and effects of optical proximity may be suppressed.

Accordingly, the color patterns are each formed so as to have a more rectangular cross section. Moreover, when seen as a pixel unit of a solid-state image pickup element from the normal line direction of the support, all of the first to third color pixels may be formed so as to have a more rectangular shape. Thus, according to the third exemplary embodiment and the fourth exemplary embodiment, highly-fine patterns are formed.

The first and second exemplary embodiments relating to the method of manufacturing the color filter arrays of the Bayer arrangement, in which the third color pattern is arranged in a checkered pattern, and the third and fourth exemplary embodiments relating to the color filter arrays in which the third color pattern is a stripe pattern extending in a direction intersecting with the second color pattern and the third color pattern are described as above. However, the arrangement of the color pixels in the color filter and the manufacturing method thereof of the invention are not limited to those of the first to fourth exemplary embodiments of the invention.

Any arrangement may be applied in the invention, and for example, the third color pattern may be a stripe pattern extending in a direction parallel to the first color pattern and the second color pattern, or the third color pattern may be arranged at an angle to the first color pattern and the second color pattern.

In the method of manufacturing a color filter of the invention, the methods for forming the first to third color patterns are not limited to those used in the first to fourth exemplary embodiments of the invention, and any combination of the photolithography method, the dry etching method, and the planarization may be used. For example, in a case of manufacturing a color filter including three color pixels of R (red), G (green), and B (blue), the color pixels may respectively formed by any of the photolithography method, the dry etching method, and the planarization.

Dry Etching

In the method of manufacturing the color filter of the invention, the dry-etching is performed in the removal of the color pattern. Moreover, even in the processing of the color pattern by the "dry-etching method" or the "etch-back treatment", the dry-etching is performed.

The exemplary embodiments of the dry-etching are not particularly limited and may be performed according to the known embodiment.

Typical examples of the dry-etching method are known as described in JP-A Nos. 59-126506, 59-46628, 58-9108, 58-2809, 57-148706, and 61-41102.

Preferable Embodiment of Dry-Etching

It is preferable to perform the dry etching in the invention according to the following embodiment from the viewpoint of forming a more rectangular pattern section, as well as from the viewpoint of further reducing the damage to a support.

That is, a preferable exemplary embodiment includes a first etching step in which etching of a region (depth) to an extent that the support is not exposed is performed using a mixed gas of fluorine-containing gas and oxygen gas ($O_2$), and a second etching step in which etching of a region (depth) to an extent that the support is preferably nearly exposed using a mixed gas of nitrogen gas ($N_2$) and oxygen gas ($O_2$) is performed after the first etching step, and over-etching is performed after the support is exposed.

Hereinafter, in the preferable exemplary embodiment of the dry-etching, specific techniques of the etching, the first etching step, the second etching step, and the over-etching will be described.

Calculation of Etching Conditions

The dry etching in the preferable exemplary embodiment may be performed after the configuration of the etching conditions has been investigated in advance by the following technique.

1. An etching rate (nm/min) in the first etching step and an etching rate (nm/min) in the second etching step are calculated.

2. A time period for etching to a desired thickness in the first etching step and a time period for etching to a desired thickness in the second etching step are calculated.

3. The first etching step is performed according to the etching time period calculated in the above item 2.

4. The second etching step is performed according to the etching time period calculated in the above item 2. Alternatively, the etching time period is determined by detection of an end point, and the second etching step is performed according to the etching time period determined thereby.

5. A time period for over-etching is calculated from the sum of time periods of the above items 3 and 4, and then over-etching is performed according to the time period.

First Etching Step

The mixed gas used in the first etching step includes fluorine-containing gas and oxygen gas ($O_2$) in view of processing an organic material which is a film to be etched into a rectangular form. Thus, damage to the support may be avoided due to the exemplary embodiment of the first etching step in which etching takes place up to a region where the support is not exposed.

Second Etching Step and Over-Etching

After the first etching step by which the color layers are etched to the depth that the support is not exposed using a mixed gas of fluorine-containing gas and oxygen gas, etching treatment in the second etching step and etching treatment in the over-etching may be performed using a mix of nitrogen gas and oxygen gas from the viewpoint of avoiding damage to the support.

Preferable Ratio of Etching Amount

It is necessary to determine the ratio between the etching amount of the first step etching and the etching amount in the second step etching, without impairing the rectangular form made by the etching treatment in the first step etching.

The ratio of the etching amount in the second step etching to the total etching amount (the sum of the etching amount in the first step etching and the etching amount of the second step etching) is preferably more than 0% and 50% or less, and more preferably 10% to 20%. Herein, the etching amount means an etched depth of a film to be etched.

Polishing Treatment

In the method of manufacturing a color filter of the invention, a polishing treatment such as the CMP treatment is preferably used for the planarization.

An aqueous solution (pH: 9 to 11) containing 0.5 mass % to 20 mass % of $SiO_2$ abrasive grains having particle diameters of 10 nm to 100 nm is preferably used as a slurry to be used in the polishing treatment. A soft polishing pad such as expanded polyurethane is preferably used.

The polishing treatment is performed by using the slurry and the polishing pad under the conditions of slurry flow rate: 100 to 250 ml/min, wafer pressure: 0.2 to 5.0 psi, and retaining ring pressure: 1.0 to 2.5 psi.

After the polishing treatment, precision cleaning and dehydration baking (preferably at 100° C. to 200° C. for 1 to 5 minutes) are performed.

Support

The support in the invention is not particularly limited as long as it is usable for a color filter. Examples of the support includes soda glass, borosilicate glass, and silica glass, all of which are used in liquid crystal displays, and any one of these to which a transparent electrically conductive film is provided, and a photoelectric transducer substrate used in solid-state image pickup elements, such as a silicon substrate, an oxide film or a silicon nitride. Moreover, an intermediate layer may be interposed between the support and the color patterns as long as it does not impair the effect of the invention.

Color Pattern

The first to third color patterns (the first to third color layers) in the invention are each preferably formed using a colored curable composition including a colorant. Examples of the colored curable composition include a colored photocurable composition and a non-photosensitive colored thermosetting composition.

The first to third color patterns may constitute at least one of the color pixels for a color filter of the invention.

Moreover, when the first to third color patterns are each formed by the photolithography method, a colored photocurable composition is used. When the first to third color patterns are each formed by the dry-etching process, a non-photosensitive colored thermosetting composition not including a photocurable component may be used. For this reason, in the case of forming any one of the color patterns by the dry-etching process, the concentration of the colorant in the composition may be increased and thus the spectroscopic characteristics of a color filter may be acquired by a thinner film.

Colored Photocurable Composition

The colored photocurable composition includes at least a colorant and a photocurable component. The "photocurable component" is a photocurable composition generally used in the photolithography method, and a composition including at least a binder resin (alkali-soluble resins or the like), a photosensitive polymerizable component (photopolymerizable monomers or the like) and a photopolymerization initiator may be used.

As for the colored photocurable composition, the descriptions described in the paragraphs [0017] to [0064] of JP-A No. 2005-326453 may be applied as they are.

From the viewpoint of adhesiveness to the support, the colored photocurable composition preferably includes an organic silane compound.

It is more preferable that the colored photocurable composition includes an organic silane compound in a case where the surface of the support is subjected to dry-etched treatment before the colored photocurable composition is applied on the support. Due to this configuration, the adhesiveness between the color layer (color pattern) and the support may be improved, and peeling of the color layer (color pattern) at the time of development may be suppressed effectively. In this way, even when the surface of the support becomes hydrophilic due to the dry-etching process (for example, when the contact angle between the surface of the support and water becomes less than 40°), overexposure (increasing the light exposure amount) for improving the adhesiveness is unnecessary, and accurate pattern size and adhesiveness-improvement may become more effectively attainable together. For this reason, the configuration is particularly effective when the color pattern size is small.

The preferable amount of the organic silane compound with respect to the total solid content in the colored photocurable composition depends on whether or not the adhesiveness improving treatment is applied to the support prior to coating of the colored photocurable composition on the support.

In the case where the treatment for improving the adhesiveness is applied to the support and then the colored photocurable composition is applied on the support, the amount of the organic silane compound is preferably 0.05 to 1.2% by mass, more preferably 0.1 to 1.2% by mass, and particularly preferably 0.2 to 1.1% by mass with respect to the total solid content in the colored photocurable composition.

On the other hand, in the case where the colored photocurable composition is applied on the support without the treatment for improving the adhesiveness of the support, the amount of the organic silane compound is preferably 0.3 to 1.2% by mass, more preferably 0.4 to 1.2% by mass, and particularly preferably 0.5 to 1.1% by mass with respect to the total solid content in the colored photocurable composition.

When the amount of the specific organic silane compound is within the range as mentioned above, the adhesiveness between the surface of the support and the color pattern may be further improved without deteriorating the storage stability of the colored photocurable composition and increasing the development residue in the region to be removed by development.

Moreover, in the method of manufacturing a color filter of the invention, specific exemplary embodiments in the case where the colored photocurable composition includes an organic silane compound are more preferably the following two embodiments.

The first exemplary embodiment is an exemplary embodiment including forming a third color layer on a support, after dry-etching process in the removal treatment of the color pattern, with use of a colored curable composition including an organic silane compound, exposing the formed third color layer to light and developing the exposed third color layer to form a third color pattern. The adhesiveness-improving treatment may be applied to the surface of the support just before the formation of the third color layer.

According to this exemplary embodiment, peeling of the third color pattern may be suppressed more effectively.

The second exemplary embodiment is an exemplary embodiment including forming a first color layer by dry-etching method, forming a second color layer on a support, after the dry-etching process, with use of a colored curable composition including an organic silane compound, exposing the formed second color layer to light and developing the exposed second color layer to form a second color pattern. The adhesiveness-improving treatment may be applied to the surface of the support just before the formation of the second color layer.

According to this exemplary embodiment, peeling of the second color pattern may be suppressed more effectively.

Examples of the organic silane compound include compounds each including Si in the molecule.

Especially, an organic silane compound represented by the following Formula (I) (hereinafter, also referred to as "specific organic silane compound") is preferable.

Organic Silane Compound Represented by Formula (I)

The photocurable colored composition of the invention includes preferably at least one organic silane compound (specific organic silane compound) represented by the following Formula (I). The adhesiveness between the photocurable colored composition and the support is further improved by the incorporation of the specific organic silane compound. Moreover, when the photocurable colored composition is in the unexposed state, the development is preferably performed and the development residue may be suppressed.

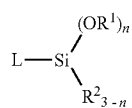
(I)

In Formula (I), L represents an organic monovalent group, $R^1$ and $R^2$ each independently represent a hydrocarbon group, and n represents an integer of 1 to 3.

Examples of the organic monovalent group represented by L include an alkyl group, an alkenyl group, an aryl group, an alkoxy group, an amino group, all of which may have one or more carbon atoms and may be substituted, and a combination thereof. Among them, an alkyl group having 1 to 20 carbon atoms and which may be substituted is preferable.

Examples of the hydrocarbon group represented by $R^1$ and $R^2$ include linear, branched, or cyclic alkyl groups (e.g. a methyl group, an ethyl group, a propyl group, an isopropyl group, a butyl group, an isobutyl group, a pentyl group, a hexyl group, a cyclohexyl group, and a phenyl group). Among them, $R^1$ and $R^2$ each preferably represent a linear, branched, or cyclic alkyl group having 1 to 12 carbon atoms, more preferably represent an alkyl group having 1 to 6 carbon atoms, and particularly preferably represent a methyl group or an ethyl group.

In addition, n represents an integer of 1 to 3, and preferably 2 to 3 in view of stability and adhesiveness.

The organic silane compound of the invention is preferably a compound having at least one hydrophilic moiety in a molecule thereof, and is more preferably a compound having a plurality of hydrophilic moieties in a molecule thereof. When the plurality of hydrophilic moieties are present in the molecule, they may be the same as or different from each other.

Among the organic silane compounds represented by Formula (I), an organic silane compound represented by the following Formula (II) is preferable in view of curability and removability in the case of removing, by development or the like, a portion other than a cured portion after curing. That is, the compound is an organic silane compound having an organic monovalent group including a hydrophilic moiety.

(II)

In Formula (II), L' represents an organic monovalent group including a hydrophilic moiety.

$R^1$ and $R^2$ each independently represent a hydrocarbon group, and have the same meaning as defined for $R^1$ and $R^2$ in Formula (I). The details and preferable examples of the hydrocarbon group represented by $R^1$ and $R^2$ are the same as in Formula (I).

In addition, n represents an integer of 1 to 3, and is preferably 2 to 3 in view of stability and adhesiveness.

Hereinafter, "organic monovalent group including a hydrophilic moiety" represented by L' will be described.

The "hydrophilic moiety" included in the organic monovalent group L' is a polar atomic group which has a high affinity to a highly polar substance such as water, and includes, for example, an oxygen atom, a nitrogen atom, a sulfur atom, or a phosphorus atom. Examples of the hydrophilic moiety include moieties each of which is capable of causing a dipole-dipole interaction, a dipole-ion interaction, an ionic bonding, a hydrogen bonding, or the like with a highly polar substance such as water.

Examples of the hydrophilic moiety include a polar group including an oxygen atom, a nitrogen atom, a sulfur atom, or the like, a dissociative group including an oxygen atom, a nitrogen atom, a sulfur atom, or the like, a hydrogen bond donor, a hydrogen bond acceptor, and a moiety having a plurality of lone electron pairs which provide a hydrophilic field as a result of gathering. Specific examples of the hydrophilic moiety include: a hydrophilic group such as a hydroxy group, an amino group, a carbonyl group, a thiocarbonyl group, a mercapto group, a carbamoyl group, a carbamoyloxy group, or a carbamoylamino group; a sulfonamide moiety; a urethane moiety; a thiourethane moiety; an amide moiety; an ester moiety; a thioether moiety; a urea moiety; a thiourea moiety; an oxycarbonyloxy moiety; an ammonium moiety; a secondary amine moiety; a tertiary amine moiety; a polyethyleneoxy moiety represented by $-(CH_2CH_2O)_a-$ (provided that, a represents an integer of 2 or more); an oxycarbonyloxy moiety; and partial structures (monovalent to trivalent hydrophilic moieties) represented by the following structural formulae.

Monovalent Hydrophilic Moieties

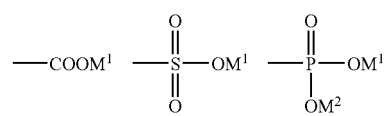

Bivalent Hydrophilic Moieties

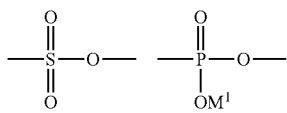

Trivalent Hydrophilic Moieties

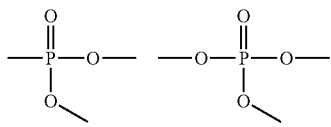

In the structural formulae, $M^1$ and $M^2$ each independently represent a hydrogen atom or a monovalent metal atom (e.g. lithium, sodium, potassium, etc.).

Among those hydrophilic moieties, in view of the stability with time of the photocurable colored composition, a structure that does not cause the Michael addition reaction with the ethylenically unsaturated double bond of a compound having an ethylenically unsaturated double bond (for example, the photopolymerizable monomer or the like as described above) is preferable. From this viewpoint, preferable examples of the hydrophilic moiety include a hydroxy group, a carbonyl group, a thiocarbonyl group, a carbamoyl group, a carbamoyloxy group, a carbamoylamino group, a urethane moiety, a thiourethane moiety, an amide moiety, an ester moiety, a thioether moiety, a urea moiety, a thiourea moiety, an oxycarbonyloxy moiety, an ammonium moiety, a tertiary amine moiety, a polyethyleneoxy moiety represented by —$(CH_2CH_2O)_a$— (provided that, a represents an integer of 2 or more), an oxycarbonyloxy moiety, and the partial structures (i.e., monovalent to trivalent hydrophilic moieties) represented by the above structural formulae.

When the partial structure —$Si(OR^1)_nR^2_{3-n}$ of Formula (II) undergoes a hydrolysis reaction, this may become a cause of increase in viscosity with time of the curable composition. From the viewpoint that the hydrolysis reaction merely occurs, the hydrophilic moiety is preferably a hydroxy group, a carbonyl group, a thiocarbonyl group, a urethane moiety, a thiourethane moiety, an amide moiety, an ester moiety, a thioether moiety, a carbamoyl group, a carbamoyloxy group, a carbamoylamino group, a urea moiety, a thiourea moiety, a tertiary amine moiety, or a polyoxyethylene moiety, more preferably a hydroxy group, a urethane moiety, a thiourethane moiety, an amide moiety, a sulfonamide moiety, an ester moiety, a urea moiety, a thiourea moiety, a tertiary amine moiety, or a polyoxyethylene moiety, and most preferably a hydroxy group, a urethane moiety, a thiourethane moiety, a urea moiety, a tertiary amine moiety, or a polyoxyethylene moiety represented by —$(CH_2OCH_2O)_a$— (provided that, a represents an integer of 2 or more).

Among the specific organic silane compounds, further preferred is a compound represented by the following Formula (III) or (IV).

Organic silane compound represented by Formula (III)

In Formula (III), $R^{11}$ and $R^{12}$ each independently represent a hydrocarbon group having 1 to 6 carbon atoms. Examples of the hydrocarbon group having 1 to 6 carbon atoms represented by $R^{11}$ or $R^{12}$ include linear, branched, or cyclic alkyl groups each having 1 to 6 carbon atoms (e.g. a methyl group, an ethyl group, a propyl group, an isopropyl group, a butyl group, an isobutyl group, a pentyl group, a hexyl group, a cyclohexyl group, and a phenyl group). Among them, $R^{11}$ and $R^{12}$ each preferably represent a methyl group or an ethyl group.

$R^3$ represents a divalent hydrocarbon group having 1 to 12 carbon atoms, and the hydrocarbon group may be unsubstituted or substituted. Further, the hydrocarbon structure in the hydrocarbon group may include a ring structure and/or an unsaturated bond. In addition, a monovalent hydrophilic moiety may be present in the hydrocarbon structure. The hydrophilic moiety herein referred to is the monovalent hydrophilic moiety as defined for L', and preferable examples thereof are the same as defined for L'.

Details of the divalent hydrocarbon group represented by $R^3$ will be hereinafter described.

X represents a monovalent hydrophilic group. The hydrophilic moiety herein referred to is the monovalent hydrophilic moiety as defined for L', and preferable examples thereof are the same as defined for L'.

n represents an integer of 1 to 3, and preferably 2 to 3 from the viewpoints of stability and adhesiveness.

Organic silane compound represented by Formula (IV)

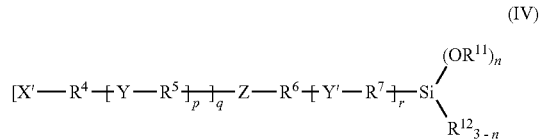

In Formula (IV), $R^{11}$ and $R^{12}$ each independently represent a hydrocarbon group having 1 to 6 carbon atoms. Examples of the hydrocarbon group having 1 to 6 carbon atoms represented by $R^{11}$ or $R^{12}$ include linear, branched, or cyclic alkyl groups each having 1 to 6 carbon atoms (e.g. a methyl group, an ethyl group, a propyl group, an isopropyl group, a butyl group, an isobutyl group, a pentyl group, a hexyl group, a cyclohexyl group, and a phenyl group). Among them, $R^{11}$ and $R^{12}$ each preferably represent a methyl group or an ethyl group.

$R^4$, $R^5$, $R^6$ and $R^7$ each independently represent a single bond or an unsubstituted or substituted hydrocarbon chain (a divalent hydrocarbon group) having 1 to 12 carbon atoms. When each of $R^4$, $R^5$, $R^6$ and $R^7$ represents a hydrocarbon chain (a divalent hydrocarbon group), the hydrocarbon structure of the hydrocarbon chain may include a ring structure and/or an unsaturated bond. In addition, the hydrocarbon chain (a divalent hydrocarbon group) may have a monovalent hydrophilic moiety as a substituent.

Details of the divalent hydrocarbon groups respectively represented by $R^4$ to $R^7$ will be hereinafter described.

X' represents a hydrogen atom or a monovalent substituent, and the monovalent substituent may have a hydrophilic moiety. The hydrophilic moiety herein referred to is the monovalent hydrophilic moiety as defined for L', and preferable examples thereof are the same as defined for L'.

Y and Y' each independently represent a divalent hydrophilic moiety, Z represents a divalent or trivalent hydrophilic moiety depending on the value of q, and q is 1 or 2. That is, in a case where q is 1, Z represents a divalent hydrophilic moiety, and in a case where q is 2, Z represents a trivalent hydrophilic moiety. Examples of the divalent or trivalent hydrophilic moiety may include the same moieties as defined as the divalent or trivalent hydrophilic moiety in Formula (I) or (II).

In addition, p represents an integer of 0 to 20, and r represents an integer of 0 to 3. n represents an integer of 1 to 3.

In the case where $R^3$ in Formula (III) or each of $R^4$, $R^5$, $R^6$ and $R^7$ in Formula (IV) is a divalent hydrocarbon group, the divalent hydrocarbon group may preferably be a linear, branched, or cyclic alkyl group or an aromatic cyclic group, and the divalent hydrocarbon group may have a substituent.

Examples of the substituent which can be introduced into the divalent hydrocarbon group include an aliphatic group, an aromatic group, a heterocyclic group, a halogen atom, a cyano group, a nitro group, an aliphatic oxy group, an aromatic oxy group, a heterocyclic oxy group, and a hydrophilic group. In particular, an aliphatic group having 1 to 12 carbon atoms, an aromatic group, a heterocyclic group, a chlorine atom, a cyano group, and a hydrophilic group are preferred.

Preferable examples of the aliphatic group having 1 to 12 carbon atoms include a methyl group, an ethyl group, a propyl group, an isopropyl group, a butyl group, an isobutyl group, a pentyl group, a hexyl group, a cyclohexyl group, and an octyl group, and a methyl group, an ethyl group, and a propyl group are more preferable.

Examples of the aromatic group include a phenyl group, a naphthyl group, and an anthracenyl group, and a phenyl group is preferable.

Examples of the heterocyclic group include a morpholino group, a tetrahydrofurfuryl group, a pyrrolyl group, a furyl group, a thiophenyl group, a benzopyrrolyl group, a benzofuryl group, a benzothiophenyl group, a pyrazolyl group, an isoxazolyl group, an isothiazolyl group, an indazolyl group, a benzisoxazolyl group, a benzisothiazolyl group, an imidazolyl group, an oxazolyl group, a thiazolyl group, a benzimidazolyl group, a benzoxazolyl group, a benzothiazolyl group, a pyridyl group, a quinolinyl group, an isoquinolinyl group, a pyridazinyl group, a pyrimidinyl group, a pyrazinyl group, a cinnolinyl group, a phthalazinyl group, a quinazolinyl group, a quinoxalinyl group, an acridinyl group, a phenanthridinyl group, a phthalazinyl group, a carbazolyl group, a carbolinyl group, a purinyl group, a triazolyl group, an oxadiazolyl group, and a thiadiazolyl group, among which a morpholino group, a tetrahydrofurfuryl group, and a pyridyl group are preferable.

Examples of the hydrophilic group include a hydroxy group, an amino group, a carbonyl group, a thiocarbonyl group, a mercapto group, a carbamoyl group, a carbamoyloxy group, and a carbamoylamino group, among which a hydroxyl group, a carbonyl group, and an amino group are preferable.

When $R^3$ in Formula (III) or each of $R^4$, $R^5$, $R^6$ and $R^7$ in Formula (IV) is the divalent hydrocarbon group, the divalent hydrocarbon group may include a "monovalent hydrophilic moiety" such as a hydroxy group, an amino group, a mercapto group, an ammonium group, a carbamoyl group, a carbamoyloxy group, a carbamoylamino group, or a partial structure moiety represented by one of the following formulae (each of $M^1$ and $M^2$ is the same as defined above).

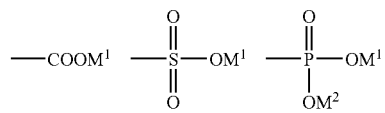

Among the above, the "divalent hydrocarbon group" represented by $R^3$ in Formula (III) is preferably a methylene chain having 1 to 5 carbon atoms or a methylene chain (more preferably a methylene chain having 3 carbon atoms) which may have a substituent and may include an oxygen atom in the chain.

The "divalent hydrocarbon group" represented by each of $R^4$ to $R^7$ in Formula (IV) is preferably a methylene chain having 1 to 5 carbon atoms or a methylene chain (more preferably a methylene chain having 3 carbon atom) which may have a substituent and may include an oxygen atom in the chain.

Preferable examples of the monovalent hydrophilic moiety in X of Formula (III) or X' of Formula (IV) include a hydroxy group, an amino group, a mercapto group, an ammonium group, a carbamoyl group, a carbamoyloxy group, a carbamoylamino group, and a partial structure moiety represented by one of the following structural formulae (each of $M^1$ and $M^2$ is the same as defined above).

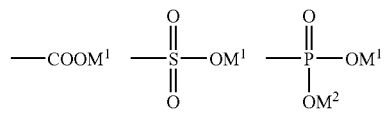

In the case where each of $Y^1$, $Y^2$ and Z in Formula (IV) is a divalent hydrophilic moiety, preferable examples thereof include a carbonyl group, a thiocarbonyl group, a urethane moiety, a thiourethane moiety, an amide moiety, an ester moiety, a thioether moiety, a sulfonamide moiety, a urea moiety, a thiourea moiety, a secondary amine moiety, a polyethyleneoxy moiety represented by $-(CH_2CH_2O)_a-$ (provided that, a represents an integer of 2 or more), an oxycarbonyloxy moiety, and a partial structure moiety represented by one of the following structural formulae ($M^1$ is the same as defined above).

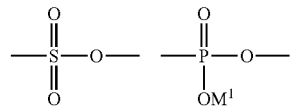

In the case where Z in Formula (IV) is a trivalent hydrophilic moiety, preferable examples thereof include a tertiary amine moiety, a urea moiety, a thiourea moiety, and a partial structure represented by one of the following structural formulae.

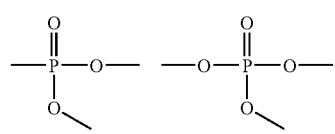

Among the compounds represented by Formula (III), a compound $R^{11}$ and $R^{12}$ each preferably represent a methyl group or an ethyl group, $R^3$ represents a methylene chain having 1 to 5 carbon atoms or a methylene chain (preferably a methylene chain having 3 carbon atoms) which may have a substituent and may include an oxygen atom in the chain, X represents an amino group, and n is 2 to 3 (preferably 2) is more preferable.

In addition, among the compounds represented by Formula (IV), a compound in which $R^{11}$ and $R^{12}$ each preferably represent a methyl group or an ethyl group, $R^4$ and $R^5$ each represent a methylene chain having 1 to 5 carbon atoms (preferably a methylene chain having 2 carbon atoms), $R^6$ and $R^7$ each represent a methylene chain having 1 to 5 carbon atoms (preferably a methylene chain having 3 carbon atoms), X' represents an amino group, each of Y, Y' and Z represents an amino group, p is 0, q is 1, r is 0, and n is 2 to 3 (preferably 2) is more preferable.

Examples of the specific organic silane compounds represented by Formulae (I) to (IV) are shown below. However, the invention is not limited to these examples.

Examples of the organic silane compound represented by Formula (I) include β-(3,4-epoxycyclohexyl)ethyltrimethoxysilane, γ-glycidoxypropyltrimethoxysilane, γ-glycidoxypropyltriethoxysilane, methyltrimethoxysilane, methyltriethoxysilane, vinyltriacetoxysilane, γ-chloropropyltrimethoxysilane, vinyltrimethoxysilane, vinyltriethoxysilane, γ-chloropropylmethyldimethoxysilane, trimethylchlorosilane, 2-(3,4-epoxycyclohexyl)ethyltrimethoxysilane, bisallyltrimethoxysilane, tetraethoxysilane, bis(trimethoxysilyl)hexane, and phenyltrimethoxysilane.

More preferable specific examples (exemplified compounds (1) to (149)) of the organic silane compound represented by Formula (II), (III) or (IV) are shown below.

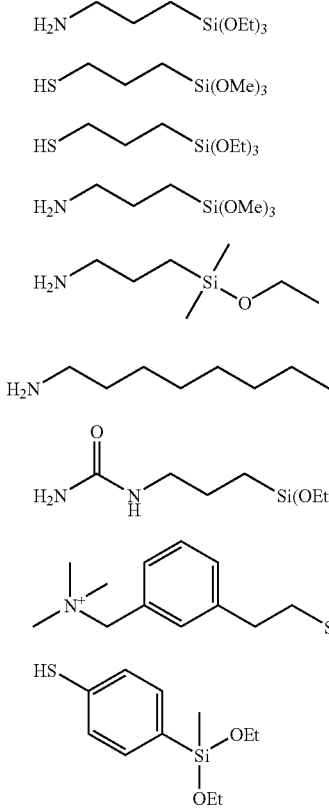

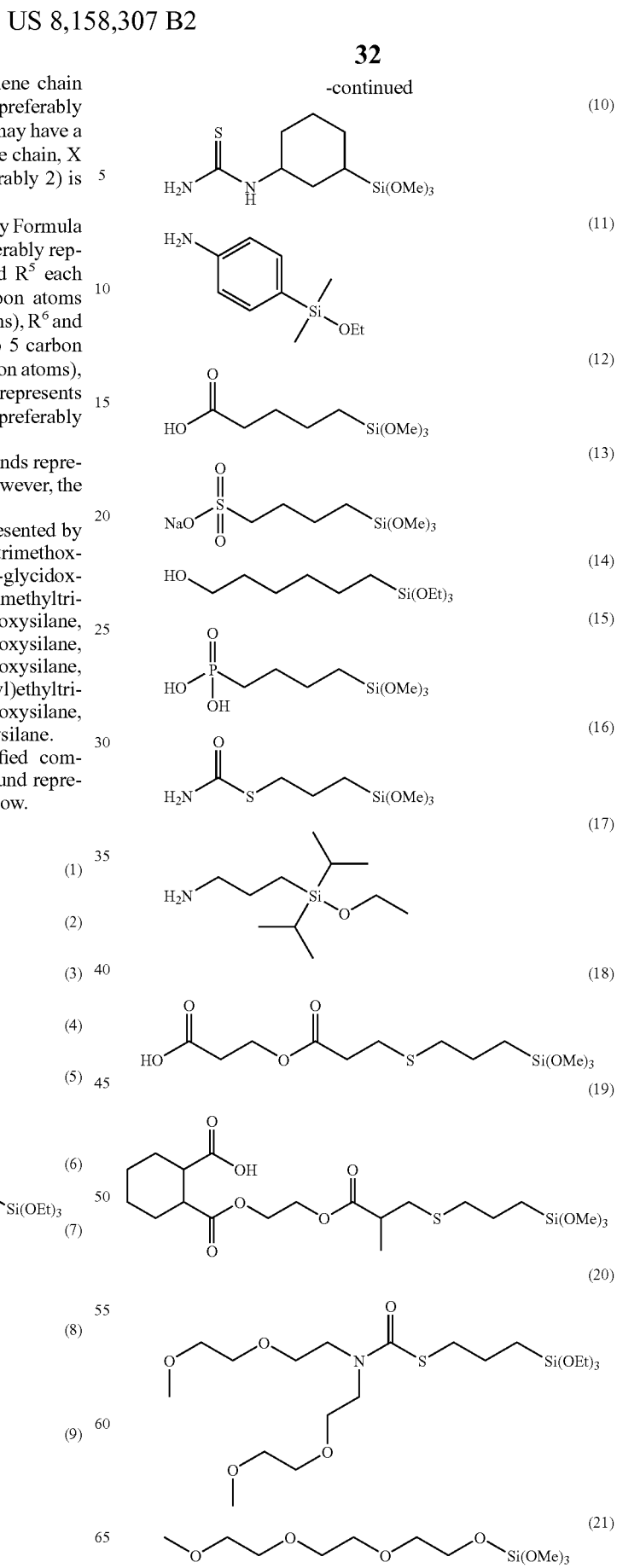

(22)
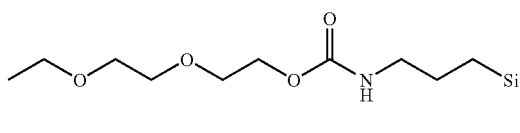
(23)
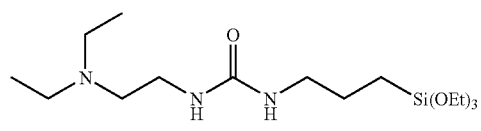
(24)
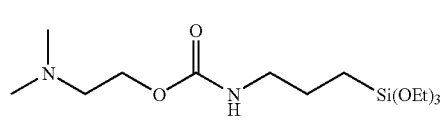
(25)
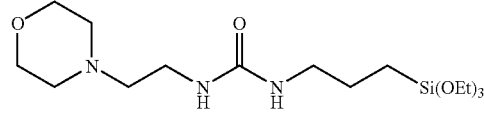
(26)
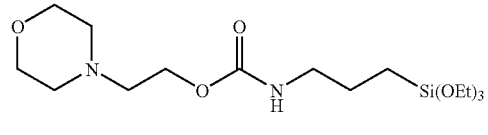
(27)
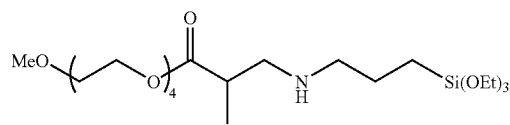
(28)
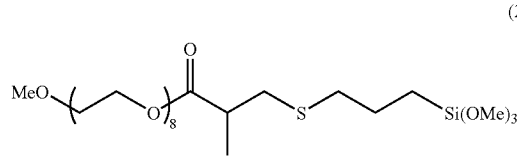
(29)
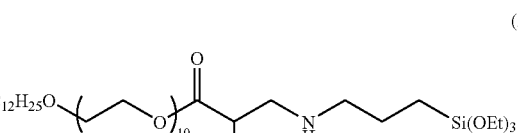
(30)
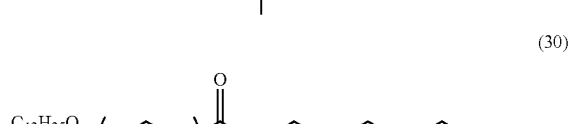
(31)
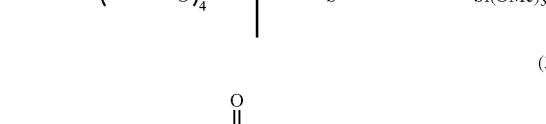
(32)
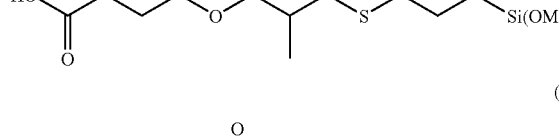
(33)
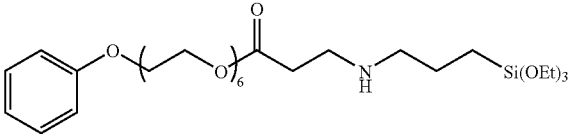
(34)
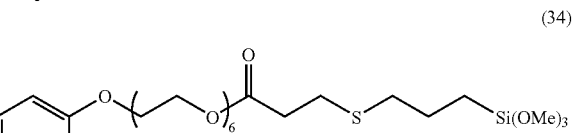
(35)
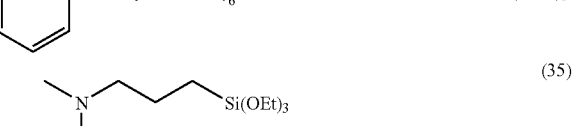
(36)
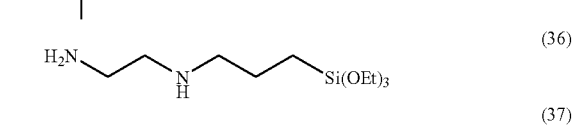
(37)
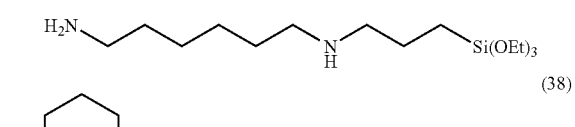
(38)
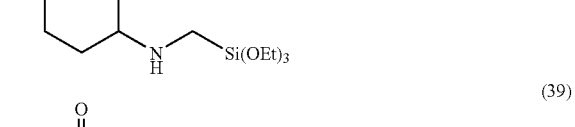
(39)
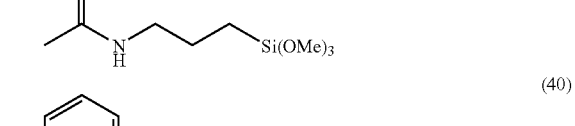
(40)
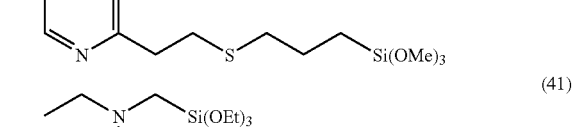
(41)
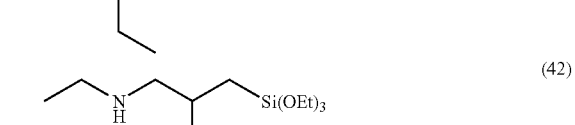
(42)
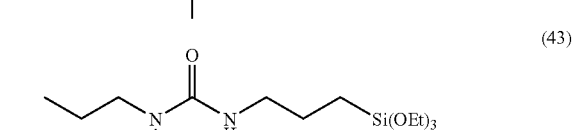
(43)
(44)
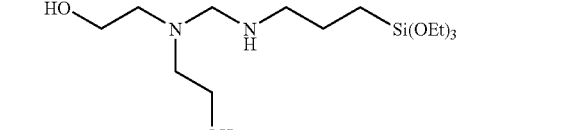
(45)
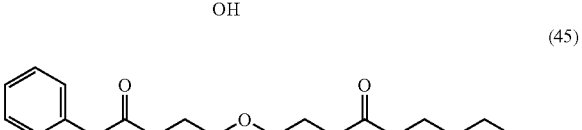

(46) 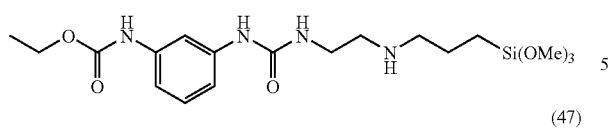
(47) 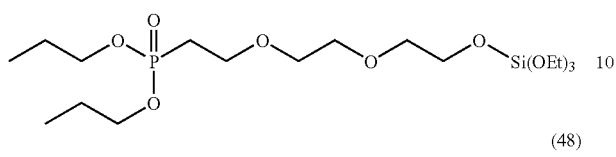
(48) 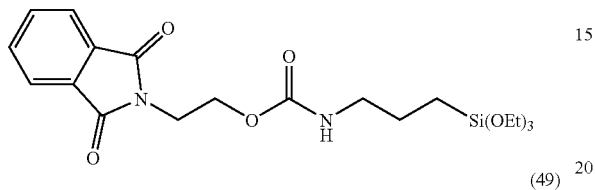
(49) 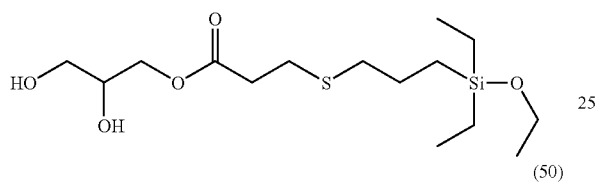
(50) 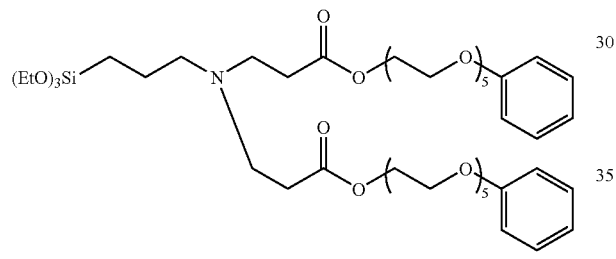
(51) 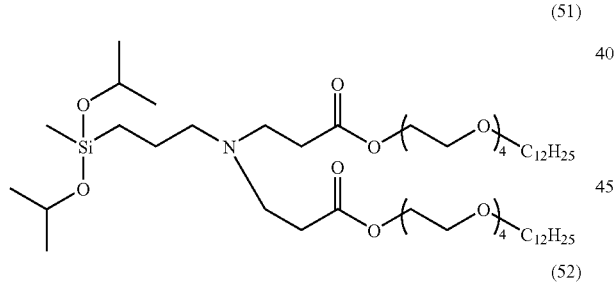
(52) 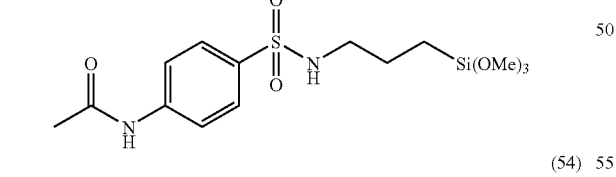
(54) 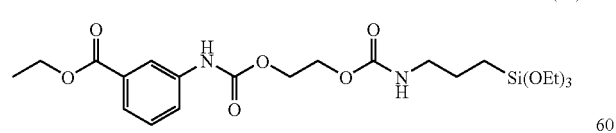
(55) 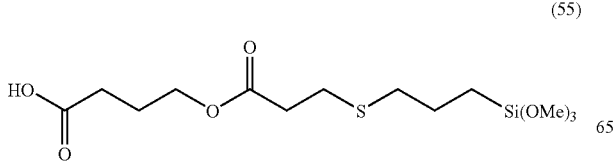
(56) 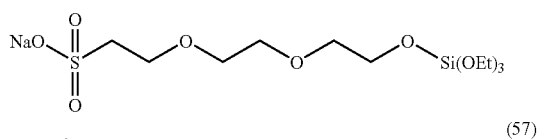
(57) 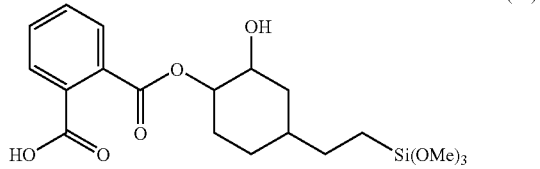
(58) 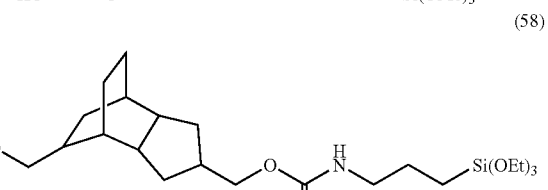
(59) 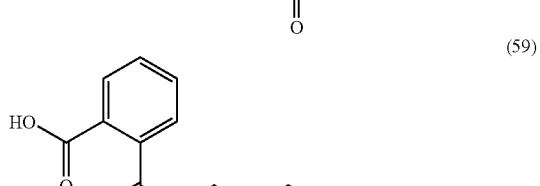
(60) 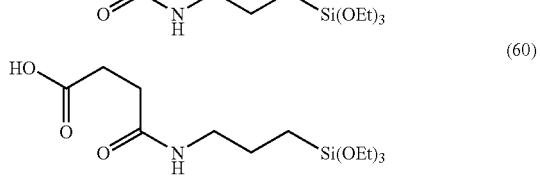
(61) 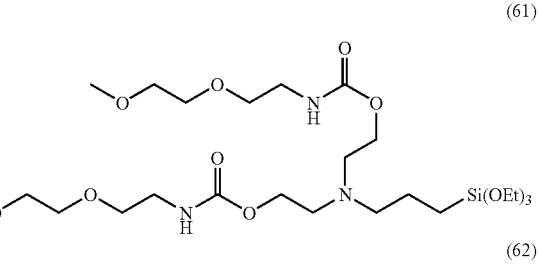
(62) 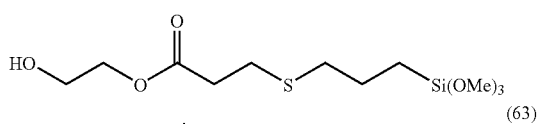
(63) 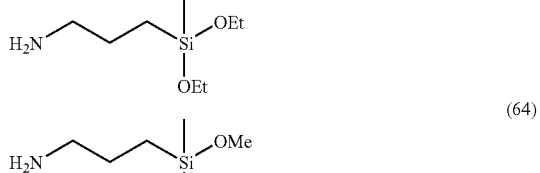
(64) 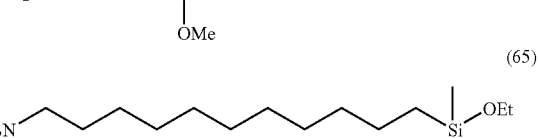
(65) 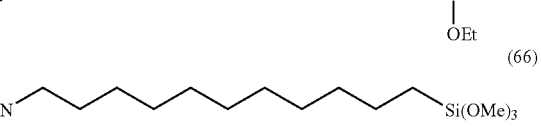
(66) 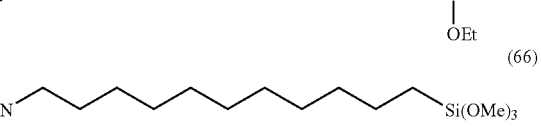

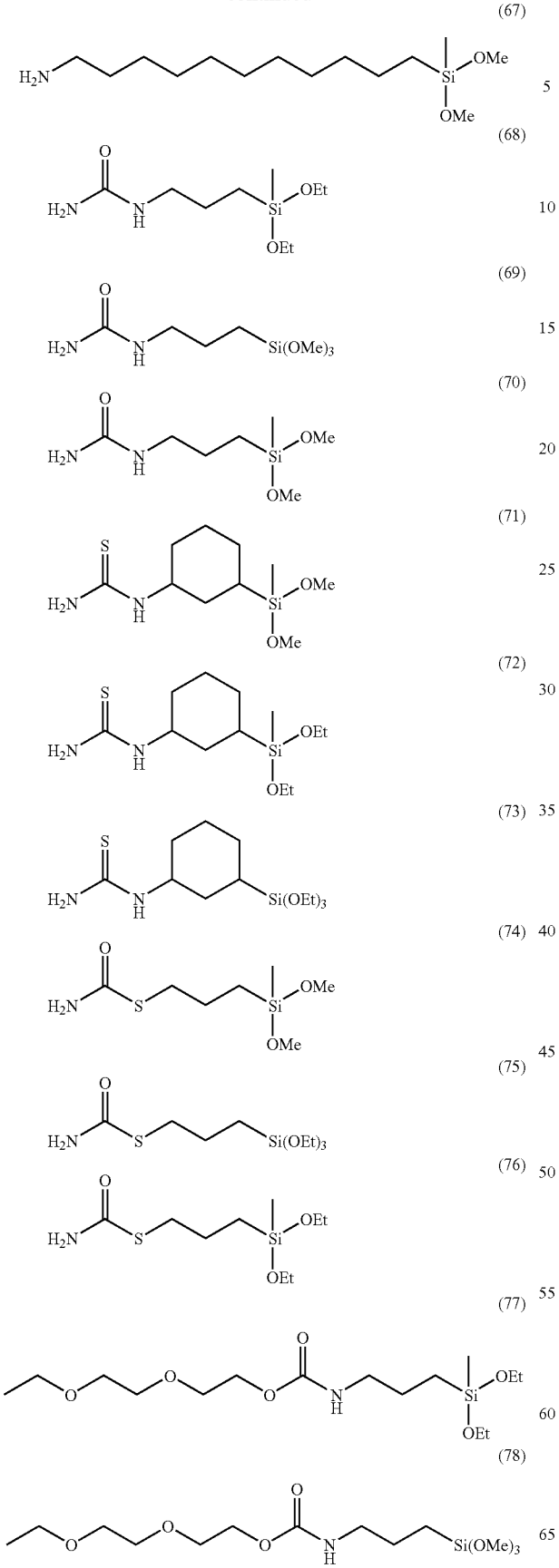
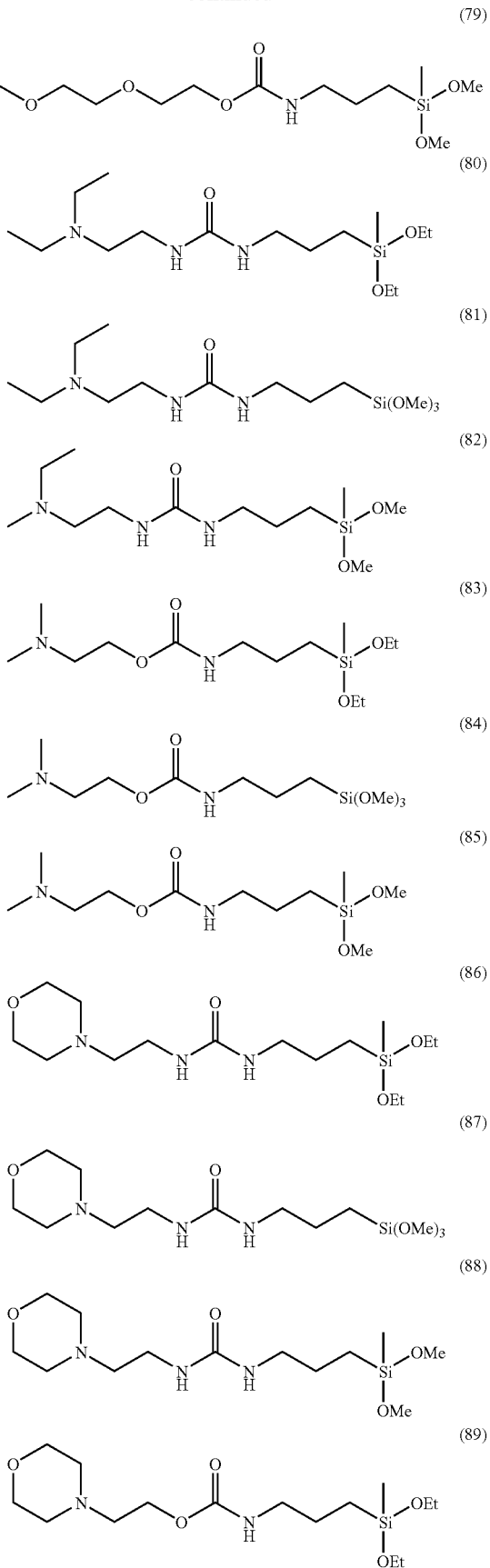

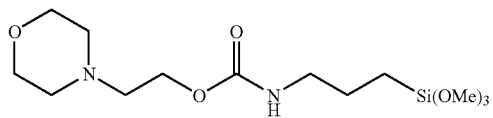
(90)
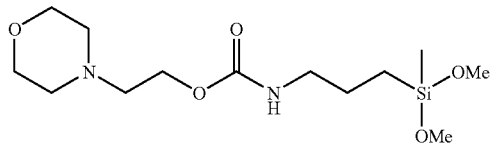
(91)
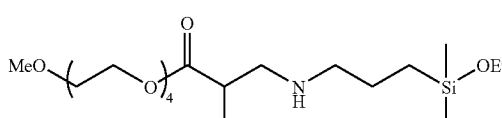
(92)
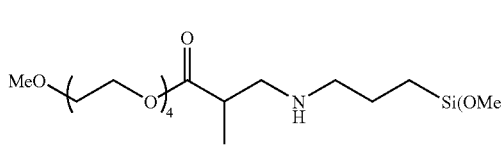
(93)
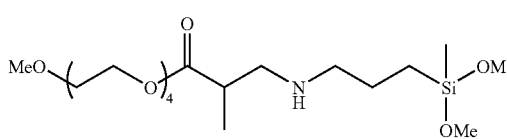
(94)
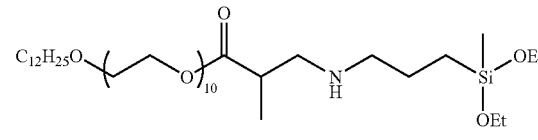
(95)
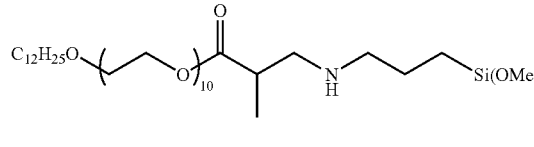
(96)
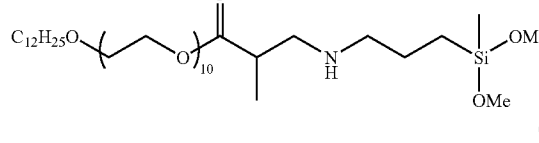
(97)
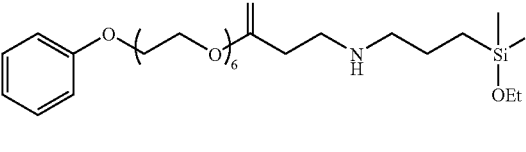
(98)
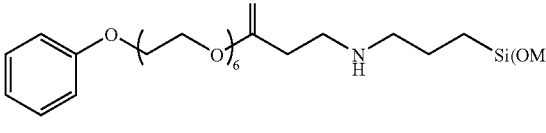
(99)
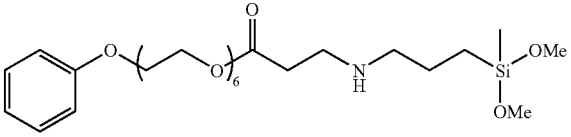
(100)
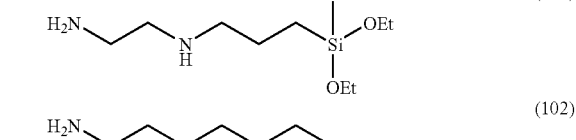
(101)
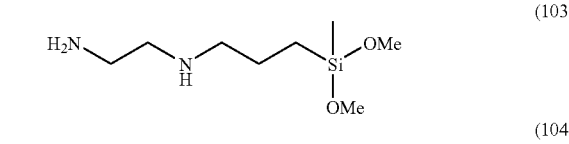
(102)
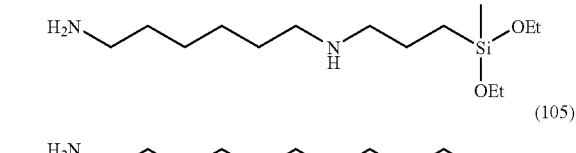
(103)
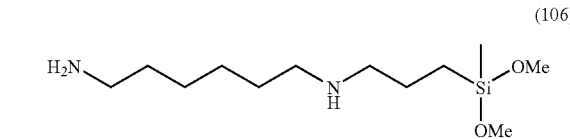
(104)
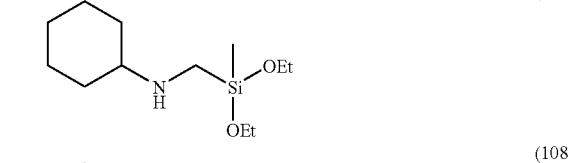
(105)
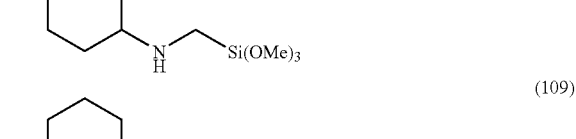
(106)
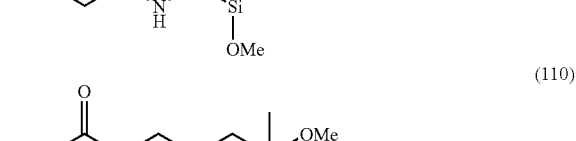
(107)
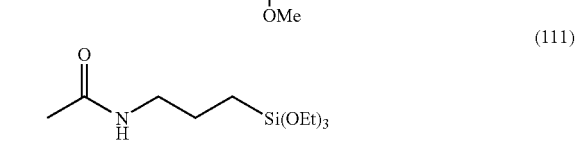
(108)
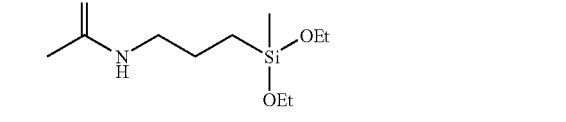
(109)
(110)
(111)
(112)

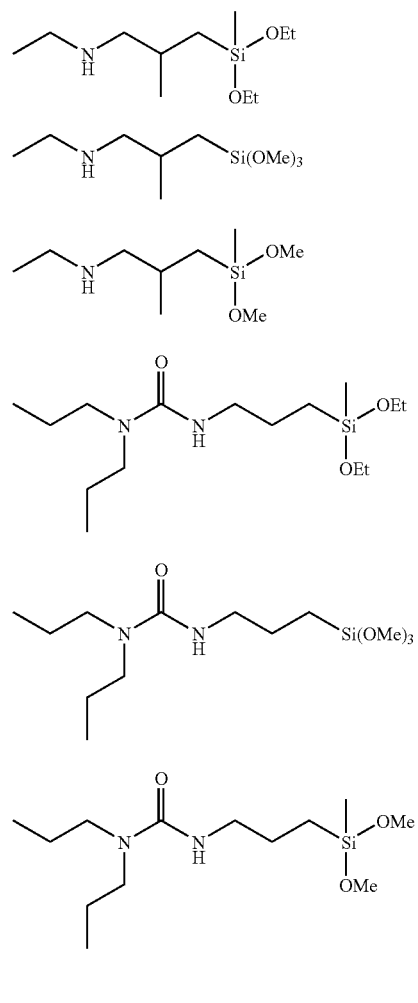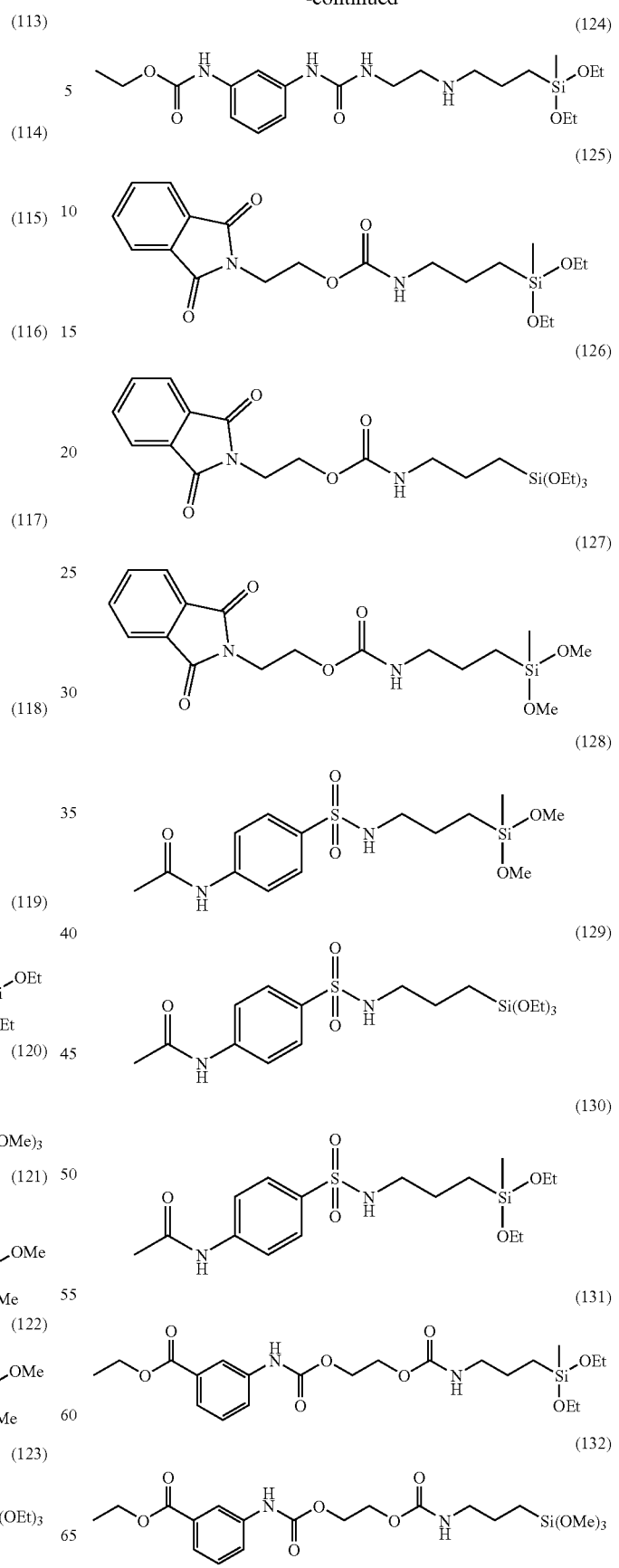

(133) 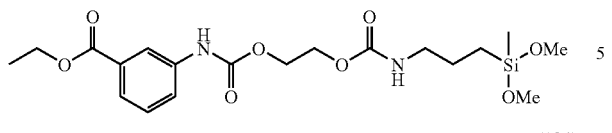

(134) 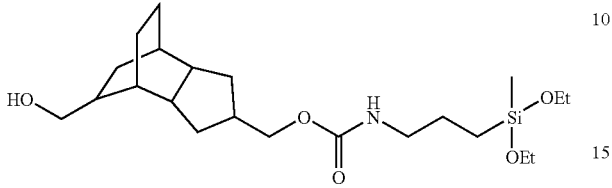

(135) 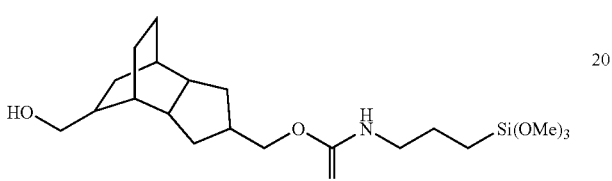

(136) 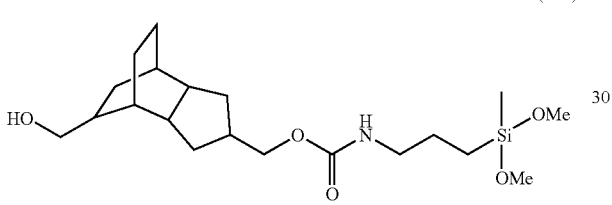

(137) 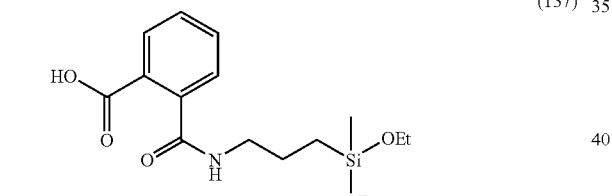

(138) 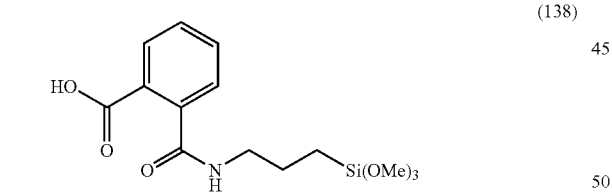

(139) 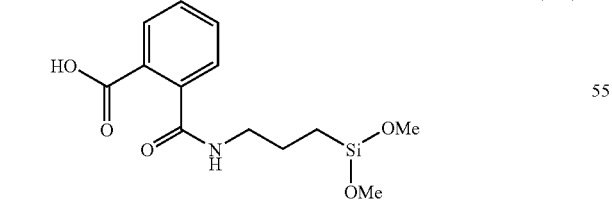

(140) 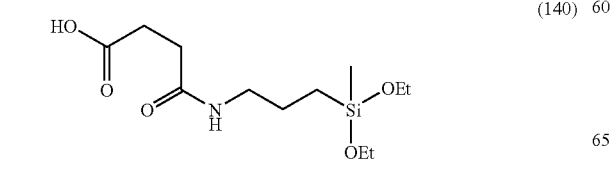

(141) 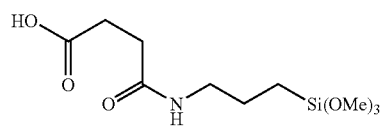

(142) 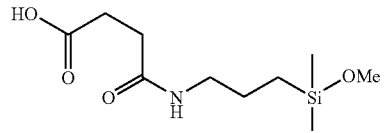

(143) 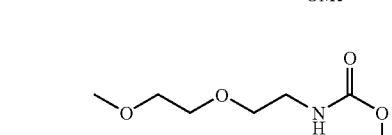

(144) 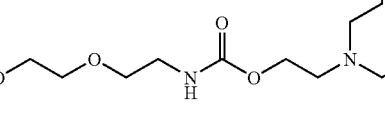

(145) 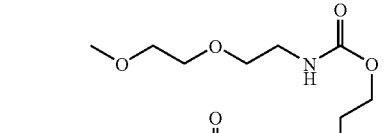

(146) 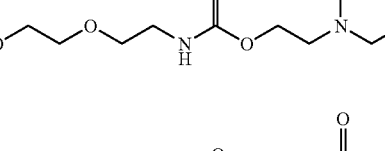

(147) 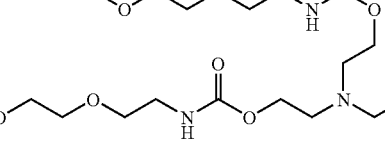

(148) 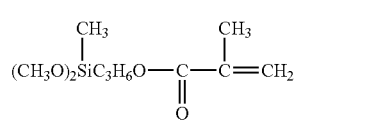

(149)

$$(C_2H_5O)_3SiC_3H_6O-\underset{\underset{O}{\|}}{C}-\underset{\underset{CH_3}{|}}{C}=CH_2$$

Non-Photosensitive Colored Thermosetting Composition

The non-photosensitive colored thermosetting composition includes a colorant and a thermosetting compound, and the colorant concentration in the total solid content is preferably 50% by mass or more and less than 100% by mass. By increasing the colorant concentration, a thinner color filter may be formed.

Colorant

The colorant usable in the invention is not particularly limited, and one of the conventionally known dyes or pigments may be used, or a mixture of two or more of them may be used.

Examples of the pigment usable in the invention include various conventionally known inorganic or organic pigments. Taking into consideration the high transmittance regardless of inorganic pigments or organic pigments, use of a pigment having a mean particle diameter as small as possible is desirable, and taking also into consideration the handling property, the mean particle diameter of the pigment is preferably 0.01 µm to 0.1 µm, and more preferably 0.01 µm to 0.05 µm.

The pigment which may be preferably used in the invention is shown below. However, the invention is not limited to these pigments.

Examples of the pigment include: C.I. Pigment Yellow 11, 24, 108, 109, 110, 138, 139, 150, 151, 154, 167, 180, and 185; C.I. Pigment Orange 36 and 71; C.I. Pigment Red 122, 150, 171, 175, 177, 209, 224, 242, 254, 255, and 264; C.I. Pigment Violet 19, 23, and 32; C.I. Pigment Blue 15:1, 15:3, 15:6, 16, 22, 60 and 66; and C.I. Pigment Black 1.

In the case where the colorant in the invention is a dye, the dye may be uniformly dissolved in a composition to obtain a non-photosensitive colored thermosetting resin composition.

The dye which may be used as a colorant included in the composition of the invention is not particularly limited, and the conventional known dyes for use in color filters may be used.

The dye having a chemical structure of pyrazoleazo, anilinoazo, triphenylmethane, anthraquinone, anthrapyridone, benzylidene, oxonol, pyrazolotriazoleazo, pyridoneazo, cyanine, phenothiazine, pyrrolopyrazole azomethine, xanthene, phthalocyanine, benzopyrane, indigo, or the like may be used.

Although the colorant content in the total solid content of the colored thermosetting composition in the invention is not particularly limited, it is preferably 30% by mass to 60% by mass. By making the colorant content into 30% by mass or more, an appropriate chromaticity as a color filter may be obtained. Moreover, by making the colorant content into 60% by mass or less, photocuring may fully be advanced and reduction in the strength of a film formed of the composition may be suppressed.

Thermosetting Compound

The thermosetting compound usable in the invention is not particularly limited as long as a film formed of the composition may be cured by heating. For example, a compound having a thermosetting functional group may be used. The thermosetting compound is preferably a compound having at least one group selected from an epoxy group, a methylol group, an alkoxymethyl group, and an acyloxymethyl group.

Further preferable examples of the thermosetting compound include (a) epoxy compounds, (b) melamine compounds, guanamine compounds, glycoluryl compounds, or urea compounds, all of which are substituted by at least one substituent selected from a methylol group, an alkoxymethyl group, and an acyloxymethyl group, and (c) phenol compounds, naphthol compounds, or hydroxyanthracene compounds, all of which are substituted by at least one substituent selected from a methylol group, an alkoxymethyl group, and an acyloxymethyl group. In particular, a polyfunctional epoxy compound is particularly preferable as the thermosetting compound.

The total content of the thermosetting compound in the colored thermosetting composition is preferably 0.1 to 50% by mass, more preferably 0.2 to 40% by mass, and particularly preferably 1 to 35% by mass with respect to the total solid content (by mass) of the thermosetting composition, though it depends on the materials.

Various Additives

Various additives such as binders, curing agents, curing catalysts, solvents, fillers, polymers other than those mentioned above, surfactants, adhesion-improvers, antioxidants, ultraviolet absorbing agents, antiflocculants, dispersing agents, or the like may be incorporated, if needed, into the colored thermosetting composition of the invention to the extent that the additives do not affect the effect of the invention.

Binder

The binder is frequently added at the time of preparing the pigment dispersion, and the binder may not have alkali solubility and should be soluble in an organic solvent.

The binder is preferably a linear high molecular organic polymer which is soluble in an organic solvent. Examples of the linear high molecular organic polymer include polymers each having a carboxylic acid in its side chain, such as a methacrylic acid copolymer, an acrylic acid copolymer, an itaconic acid copolymer, a crotonic acid copolymer, a maleic acid copolymer, a partially esterified maleic acid copolymer, and the like as described in, for example, JP-A No. 59-44615, Japanese Patent Application Publication (JP-B) No. 54-34327, JP-B No. 58-12577, JP-B 54-25957, JP-A 59-53836, and JP-A 59-71048. Similarly, acidic cellulose compounds each having a carboxylic acid in the side chain thereof are useful.

Among these various binders, a polyhydroxystyrene resin, a polysiloxane resin, an acrylic resin, an acrylamide resin, and an acrylic/acrylamide copolymer resin are preferred from the viewpoint of heat resistance, and an acrylic resin, an acrylamide resin and an acrylic/acrylamide copolymer resin are preferred from the viewpoint of controllability of developing property.

Preferable examples of the acrylic resin include copolymers formed by monomers selected from the group consisting of benzyl(meth)acrylate, (meth)acrylic acid, hydroxyethyl(meth)acrylate, (meta)acrylamide, and the like, including copolymers such as benzyl methacrylate/methacrylic acid, and benzyl methacrylate/benzyl methacrylamide, KS resist-106 (trade name, manufactured by Osaka Organic Chemical Industry Ltd.), Cyclomer P series products (Daicel Chemical Industries, Ltd.).

It is possible to improve the adhesiveness, for example to the lower layer, and the properties of the coated surface during spin coating or slit coating, by dispersing the colorant in the binder at higher concentrations.

Hardener

In the invention, it is preferable to add a hardener when an epoxy resin is used as the thermosetting resin. There are an extremely large number of hardeners for the epoxy resin, that are different in properties such as stability as a mixture of a resin and a hardener, viscosity, hardening temperature, hardening period, and heat generation, and thus, it is necessary to select a suitable hardener according to application, use condition, and work condition of the hardener. Such hardeners are described in detail in Hiroshi Kakiuchi Ed., "Epoxy Resins (Shokodo)", Chapter five.

Examples of the hardeners include the followings: catalytic hardeners such as tertiary amines and boron trifluoride-amine complexes; hardeners chemically reacting quantitatively with the functional groups in epoxy resin such as polyamines and acid anhydrides; normal temperature-hardening hardeners such as diethylenetriamine and polyamide resins; medium-temperature hardening hardeners such as diethylaminopropylamine and tris(dimethylaminomethyl)

phenol; and high temperature-hardening hardeners such as phthalic anhydride and meta-phenylenediamine; and the like. The hardeners, when seen from the chemical structure, include amines including aliphatic polyamines such as diethylenetriamine, aromatic polyamines such as meta-phenylenediamine, and tertiary amines such as tris(dimethylaminomethyl)phenol; acid anhydrides including phthalic anhydride, polyamide resins, polysulfide resins, boron trifluoride-monoethylamine complexes, initial-stage condensates, for example, of phenol resins, dicyandiamides, and the like.

These hardeners react, polymerize, and harden with epoxy groups by heating, accompanied with increase in crosslinking density. The amount of the binder or the hardener is preferably as small as possible for reduction in film thickness, and in particular, the amount of the hardener is preferably 35% by mass or less, more preferably 30% by mass or less, and still more preferably 25% by mass or less, with respect to the thermosetting resin.

Curing Catalyst

In order to attain the high concentration of the colorant in the invention, the curing through the reaction with the curing agent as well as the curing through the reaction between the epoxy groups is effective. For this reason, the curing catalyst may be used instead of the curing agent. The amount of the curing catalyst to be added is preferably small at approximately $\frac{1}{10}$ to $\frac{1}{1,000}$ times, more preferably approximately $\frac{1}{20}$ to $\frac{1}{500}$ times, and still more preferably approximately $\frac{1}{30}$ to $\frac{1}{250}$ times by weight, with respect to the epoxy resin having an epoxy equivalence of approximately 150 to 200.

Solvent

The colored thermosetting composition in the invention may be used in a form of a solution in which the colored thermosetting composition is dissolved in any one of various solvents. Basically, the solvents used for the colored thermosetting composition in the invention are not particularly limited as long as the solubility of each component and the coating property of the colored thermosetting composition are satisfied.

Dispersant

In addition, the dispersant may be added to improve dispersion efficiency of the pigment. Any one of known dispersants may be used as the dispersant as it is properly selected, and examples thereof include cationic surfactants, fluorochemical surfactants, polymer dispersants, and the like.

A wide variety of compounds are used as the dispersant. Examples of the dispersant include: a phthalocyanine compound (trade name: EFKA-745, manufactured by EFKA); SOLSPERSE 5000 (trade name, manufactured by Lubrizol Japan Ltd.); cationic surfactants such as organosiloxane polymer KP341 (registered name, manufactured by Shin-Etsu Chemical Co., Ltd.), (meth)acrylic (co)polymers POLYFLOW No. 75, No. 90 and No. 95 (all trade names, manufactured by Kyoeisha Chemical Co., Ltd.), or W001 (trade name, manufactured by Yusho Co., Ltd.); nonionic surfactants such as polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, or sorbitan fatty acid esters; anionic surfactants such as W004, W005 and W017 (all trade names, manufactured by Yusho Co., Ltd.); polymeric dispersants such as EFKA-46, EFKA-47, EFKA-47EA, EFKAPOLYMER 100, EFKAPOLYMER 400, EFKAPOLYMER 401 and EFKAPOLYMER 450 (all trade names, manufactured by Morishita & Co., Ltd.), or DISPERSE AID 6, DISPERSE AID 8, DISPERSE AID 15 and DISPERSE AID 9100 (all trade names, manufactured by San Nopco Ltd.); various SOLSPERSE dispersants such as SOLSPERSE 3000, 5000, 9000, 12000, 13240, 13940, 17000, 24000, 26000 or 28000 (all trade names, manufactured by Lubrizol Japan Ltd.); ADEKAPLURONIC L31, F38, L42, L44, L61, L64, F68, L72, P95, F77, P84, F87, P94, L101, P103, F108, L121, P-123 (all trade names, manufactured by Asahi Denka K.K.); and ISONET S-20 (trade name, manufactured by Sanyo Chemical Industries Ltd.).

One of the dispersants may be used alone, or a mixture of two or more of them may be used. The dispersant in the invention is usually added preferably to the colored thermosetting composition in an amount of about 0.1 to 50 parts by mass per 100 parts by mass of the pigment.

Other Additives

If needed, various additives may be further added to the non-photosensitive colored curable composition of the invention. Specific examples of the various additives include the organic silane compounds as described above in relation to the colored photocurable composition. A preferable range of the organic silane compounds is the same as in the colored photocurable composition.

Photoresist

As mentioned above, when the first to third color patterns are formed by the "dry-etching method", a photoresist is used to form a resist pattern. Also, in the removal of the color pattern, the photoresist is preferably used to form a resist pattern.

A positive-type photoresist composition suitable for use in the positive-type photoresists sensitive to radiations such as ultraviolet rays (g-ray, h-ray, i-ray), far-ultraviolet ray including excimer laser, electron beam, ion-beam or X-ray may be used as the positive-type photosensitive resin composition. Among the radiations, g-ray, h-ray and i-ray are preferable in exposing the photosensitive resin layer for the purpose of the invention, and i-beam is especially preferable.

Specifically, the positive-type photosensitive resin composition is preferably a composition including a quinone diazide compound and an alkali-soluble resin. The positive-type photosensitive resin composition including a quinone diazide compound and an alkali-soluble resin is preferably used as the positive-type photoresist, because it changes from the alkali insoluble state into the alkali-soluble state by decomposition of the quinone diazide group into carboxyl group by irradiation of a light at a wavelength of 500 nm or less. The positive-type photoresists are significantly superior in resolution and thus, used in production of integrated circuits such as IC and LSI. An example of the quinone diazide compound is a naphthoquinone diazide compound.

Stopper Layer

The first and second stopper layers are preferably formed using the curable composition as mentioned above.

A composition including a heat-curable high molecular polymer may be preferably used for the curable composition. More preferable examples of the polymer include polysiloxane polymers and polystyrene polymers. Among them, materials known as spin-on-glass (SOG) materials or thermosetting compositions including a polystyrene compound or a polyhydroxystyrene compound as a main component are more preferable.

As an index showing an etching resistance of the curable composition forming the stopper layer, for example, Ohnishi parameter (reference literatures: JP-A Nos. 2004-294638 and 2005-146182) may be used. In the invention, when the parameter of the colored curable composition is 3.5 to 4.5 and the parameter of the curable composition forming the stopper layer is 2.5 or less, it may be determined that selectivity to the colored curable composition layer is able to be established. The Ohnishi parameter is calculated according to the following Equation (I).

$$(C+O+H)/(C-O) \quad \text{Equation (I)}$$

In the Equation (I), C, O, and H represent respectively the numbers of moles of carbon atoms, oxygen atoms, and hydrogen atoms, in the repeating unit of the polymer. A calculation example of the Ohnishi parameter is shown below. In the calculation, the calculations are carried out after truncating the numbers to two decimal places.

CALCULATION EXAMPLE 1

Fluorene Acrylate Compound $(C+O+H)/(C-O)=(33+6+25)/(33-6)=2.37$

CALCULATION EXAMPLE 2

Polyhydroxystyrene Compound $(C+O+H)/(C-O)=(8+1+8)/(8-1)=2.42$

The color filter manufactured by the method of manufacturing a color filter as described above may be used for liquid crystal displays or solid imaging elements such as a charge-coupled device (CCD), and is particularly suitable for solid imaging elements with high resolution exceeding one million pixels. The color filter of the invention may be used as a color filter arranged between, for example, a collection of each pixel constituting the CCD and a micro lens for collecting light.

In particular, the color filter is more suitable for use in solid imaging elements in which the pixel size thereof is 2.5 µm or less, and is particularly suitable for use in solid imaging elements in which the pixel size is 2.0 µm or less.

Solid-State Image Pickup Element

A solid-state image pickup element of the invention includes the color filter of the present invention.

Since the solid-state image pickup element of the invention includes the color filter of the invention which has substantially rectangular color pixels, the solid-state image pickup element is superior in color reproducibility.

Although the configuration of the solid-state image pickup element is not particularly limited as long as it includes the color filter of the invention and functions as a solid-state image pickup element, an example of the configuration thereof is described below.

For example, the solid-state image pickup element of the invention includes a support, plural photodiodes forming a light-receiving area of a solid-state image pickup element (e.g. a CCD image sensor, a CMOS image sensor, or the like), and a transfer electrode composed of polysilicon or the like, in which a light-shading film composed of tungsten or the like is provided on the photodiodes and the transfer electrode, the light-shading film having an aperture on the light-receiving area of the photodiodes, a device protective film composed of silicon nitride or the like is provided on the light-shading film so as to cover the entire surface of the light-shading film and the light-receiving area of the photodiodes, and the color filter of the present invention is provided on the device protective film.

Moreover, for example, the solid-image pickup element of the invention may further include a light-collecting unit (for example, a microlens or the like. The same holds true hereinafter.) which is provided on the device protective layer and under the color filter (a side of the color filter which is near to the support), or may further include a light-collecting unit on the color filter.

EXAMPLES

Hereinafter, the present invention is described in detail with reference to Examples. However the invention is not limited thereto as long as the subject matter does not depart the spirit of the invention. Unless otherwise specifically indicated, the "part" indicates a mass part (or part by mass).

Moreover, in the following processes, a treatment using a commercially available treating solution is performed according to the method specified by the manufacturer, unless otherwise specifically stated.

Example 1

A color filter was produced according to an exemplary embodiment (the first exemplary embodiment) in which the third color pattern is arranged in a checkered pattern (i.e., the Bayer arrangement) and all of the color layers are formed by the photolithography method. Details of the manufacturing method are described below.

Formation of First Color Pattern

A red (R) photocurable composition "SR-5000L" (trade name, manufactured by Fujifilm Electronics Materials Co., Ltd.) was applied on a substrate by means of a spin coater to form a coating film having a thickness of 0.8 µm, and then prebaking treatment using a hot plate was performed at a temperature such that the temperature of the coating film or the ambient temperature is 100° C. for 2 minutes to obtain a R color layer which is a first color layer.

Subsequently, the R color layer was pattern-exposed to light in an exposure amount of 200 mJ/cm$^2$ using an i-ray stepper (manufactured by Canon Inc.), subjected to development with a developing agent "CD-2060" (trade name, manufactured by Fujifilm Electronic Materials Co., Ltd.) for 1 minute, rinsed with pure water, and dried by spin-drying. After that, post-baking was further performed at 220° C. for 5 minutes to form a R pattern, which is the first color pattern, in a pattern region in which the R pattern was intended to be formed.

Herein, the R pattern was formed into a stripe pattern. The sizes of LINE and SPACE in the R pattern were LINE: 1.5 µm and SPACE: 1.5 µm, and the thickness of the coating film after the post-baking was 0.7 µm.

In this Example, the "LINE" means a line width of a pattern and the "SPACE" means a width of the region sandwiched between two patterns, where the pattern is not formed (hereinafter, the same holds true).

Formation of Second Color Pattern

Next, a blue color (B) photocurable composition "SB-5000L" (trade name, manufactured by Fujifilm Electronic Materials Co., Ltd.) was applied on the surface of the side of the silicon substrate on which the R pattern was formed, to form a coating film having a thickness of 0.7 µm, and prebaking treatment using a hot plate was performed at a temperature such that the temperature of the coating film or the ambient temperature is 100° C. for 2 minutes to obtain a B color layer which is a second color layer.

Subsequently, the B color layer was pattern-exposed to light in an exposure amount of 250 mL/cm$^2$ using an i-ray stepper (manufactured by Canon Inc.), subjected to development with a developing agent "CD-2060" (trade name, manufactured by Fujifilm Electronic Materials Co., Ltd.) for 1 minute, rinsed with pure water, and dried by spin-drying. After that, post-baking was further performed at 220° C. for 5 minutes to form a B pattern, which is the second color pattern, in a pattern region in which the B pattern was intended to be formed.

Herein, the B pattern was formed in a region in which the R pattern was not formed, in a stripe pattern parallel to the R pattern. The sizes of LINE and SPACE in the B pattern were LINE: 1.5 µm and SPACE: 1.5 µm, and the thickness of the coating film after the post-baking was 0.7 µm.

Moreover, the R pattern and the B pattern were formed in such a manner that surfaces of the adjacent patterns are brought into contact with each other. The surface of each of the R pattern and the B pattern was plane. That is, the upper surfaces of the R pattern and the B pattern were the same height with respect to the silicon substrate.

Subsequently, a positive-type photoresist "FHi622BC" (trade name, manufactured by Fujifilm Electronic Materials Co., Ltd.) was applied on the surface of the side of the silicon substrate on which the R pattern and the B pattern were formed, and then prebaked to form a photoresist layer having a thickness of 0.8 µm.

Subsequently, the photoresist layer on a pattern region, in which a G pattern (G pixels) was to be formed, of the R and B patterns was pattern-exposed to light in an exposure amount of 250 mJ/cm$^2$ by using an i-ray stepper (manufactured by Canon Inc.), and heating was performed at a temperature such that the temperature of the photoresist layer or the ambient temperature is 90° C. for one minute. After that, development was performed by using a developing agent "FHD-5" (trade name, manufactured by Fujifilm Electronic Materials Co., Ltd.) for 1 minute, and post-baking treatment was performed at 110° C. for 1 minute so that the photoresist in a region where the G pattern (G pixels) was to be formed was removed to form a resist pattern. In the formed resist pattern, the region in which the G pattern (G pixels) was to be formed was an aperture pattern of the square of 1.5 µm×1.5 µm, and its array was in the checkered pattern.

Removal of Color Pattern

Then, dry-etching was performed under the following conditions to remove a region in which the G pattern (G pixels) of the R and B patterns was to be formed.

First, a first step dry-etching treatment was performed for 90 seconds using a dry-etching apparatus (trade name: U-621, manufactured by Hitachi Hi-Technologies Corp.) under the conditions of RF power: 800 W, antenna bias: 400 W, wafer bias: 200 W, chamber internal pressure: 4.0 Pa, substrate temperature: 50° C., and species and flow rates of mixed gases: $CF_4$: 80 mL/min., $O_2$: 40 mL/min., and Ar: 800 mL/min.

The scraped amount of the B pattern under the conditions of the first step dry-etching was 525 nm and that of the R pattern was 635 nm, and the etching amounts of the B pattern and the R pattern in the first etching step were 75% and 91%, respectively. As a result, the thicknesses of the remaining films on the support were 175 nm and 65 nm, respectively.

Subsequently, the second step dry-etching and overetching were performed in the same etching chamber under the conditions of RF power: 600 W, antenna bias: 100 W, wafer bias: 250 W, chamber internal pressure: 2.0 Pa, substrate temperature: 50° C., species and flow rates of mixed gases: $N_2$: 500 mL/min., $O_2$: 50 mL/min., and Ar: 500 mL/min ($N_2/O_2/Ar$=10/1/10), and overetching rate: 20% with respect to the total etching.

The etching rate of each of B pattern and R pattern in the second step dry-etching was 600 nm/min or more, and it took about 10 to 20 seconds to etch the remaining films of B and R patterns. The etching time was calculated as the sum of 90 seconds for the first etching time and 20 seconds for the second etching time. As a result, since the etching time was 90+20=110 seconds and the overetching time was 110×0.2=22 seconds, the total etching time was set to 110+22=132 seconds.

As mentioned above, R pixels and B pixels were obtained by removing the portions of the R and B patterns on a region in which a G pattern (G pixels) was to be formed, by dry-etching.

Next, releasing treatment was performed for 120 seconds using a photoresist releasing agent "MS-230C" (trade name, manufactured by Fujifilm Electronic Materials Co., Ltd.) to remove the photoresist. After that, heating was performed at 100° C. for 2 minutes.

Formation of Third Color Pattern

Next, a photocurable composition "SG-5000L" (trade name, manufactured by Fujifilm Electronic Materials Co., Ltd.), which forms a G pattern, was applied on the surface of the side of the silicon substrate, where the R and B pixels were formed, to form a coating film having a thickness of 0.6 µm, and prebaking treatment using a hot plate was performed at a temperature such that the temperature of the coating film is 100° C. for 2 minutes to obtain a G color layer which is a third color layer.

Subsequently, the G color layer was pattern-exposed to light in an exposure amount of 200 mJ/cm$^2$ by using an i-ray stepper (manufactured by Canon Inc.), subjected to development with a developing agent "CD-2060" (trade name, manufactured by Fujifilm Electronic Materials Co., Ltd.) for 1 minute, rinsed with pure water, and dried by spin-drying. After that, post-baking was further performed at 220° C. for 5 minutes to form a G pattern (G pixels) which is the third color pattern, in a pattern region in which the G pattern (G pixels) was intended to be formed.

The G pattern (G pixels) was formed in the checkered pattern in such a manner that each of the G pixels was embedded in a region formed by the etching, each of the G pixels being a square of 1.5 µm×1.5 µm. The array of the G pixels was a checkered pattern.

Moreover, the surface of the substrate was formed into a plane form. That is, the upper surfaces of the R pixels, the B pixels and the G pixels were the same height with respect to the silicon substrate.

In this way, a color filter array having the R pixels, the G pixels, and the B pixels was obtained.

In the color filter array thus obtained, occurrence of the region in which a color pixel is not formed in the region where the corners of each color pixel (R pixels, G pixels, and B pixels) gather was suppressed, and occurrence of the area where the film thickness of the color pixel in the vicinity of the boundary of each pixel was thin was also suppressed.

This result indicates that use of the method of manufacturing a color filter as described above enables the limits in pattern formation to be addressed, and allows a finer pattern to be formed.

Example 2

A color filter was produced according to an exemplary embodiment (the second exemplary embodiment) in which the third color pattern is arranged in a checkered pattern (i.e., the Bayer arrangement) and all of the color layers are formed by the dry-etching. Details of the manufacturing method are described below.

Formation of First Color Pattern

A red (R) photocurable composition "SR-5000L" (trade name, manufactured by Fujifilm Electronic Materials Co., Ltd.) was applied on a silicon substrate by means of a spin coater to form a coating film having a thickness of 0.8 µm, and then heated at 220° C. using a hot plate for 5 minutes so that the coating film was cured to form a R color layer which is a first color layer. The thickness of the R color layer after being formed using the SR-5000L was 0.65 µm.

Subsequently, a thermosetting composition "ITS-54S-300A" (trade name, manufactured by Lasa Industries, Ltd.) was applied on the surface of the side of the silicon substrate where the R color layer was formed, by means of a spin coater so that the film thickness is 30 nm, and then heating was performed for curing at 220° C. for 5 minutes to form a transparent thin film 1 which is a first stopper layer on the R color layer.

Subsequently, a positive-type photoresist "FHi622BC" (trade name, manufactured by Fujifilm Electronic Materials Co., Ltd.) was applied on the transparent thin film 1, and prebaking was performed to form a photoresist layer having a thickness of 0.8 µm.

Subsequently, the photoresist layer in a pattern region in which the B pattern was to be formed was pattern-exposed to light in an exposure amount of 250 mJ/cm$^2$ by using an i-ray stepper (manufactured by Canon Inc.), and heated at a temperature such that the temperature of the photoresist layer or the ambient temperature is 90° C. for one minute. After that, development using a developing agent "FHD-5" (trade name, manufactured by Fujifilm Electronic Materials Co., Ltd.) was performed for 1 minute, post-baking at 110° C. for 1 minute was further performed, and a resist pattern which serves as an etching mask was formed by removing the photoresist in the desired color pattern region in which the B pattern was to be formed.

Herein, the resist pattern was formed in a stripe pattern, and the sizes of LINE and SPACE in the resist pattern were LINE: 1.6 µm and SPACE: 1.4 µm in view of the etching conversion difference (reduction in the pattern width by etching).

Next, as described as follows, dry-etching of the transparent thin film 1 and the R color layer was performed using the formed resist pattern as an etching mask, thereby producing a R pattern which is the first color pattern.

First, the first etching treatment was performed for 90 seconds using a dry-etching apparatus (trade name: U-621, manufactured by Hitachi Hi-Technologies Corp.) under the conditions of RF power: 800 W, antenna bias: 400 W, wafer bias: 200 W, chamber internal pressure: 4.0 Pa, substrate temperature: 50° C., and species and flow rates of mixed gases: CF$_4$: 80 mL/min., O$_2$: 40 mL/min., and Ar: 800 mL/min.

The scraped amount of the R color layer under the above etching conditions was 635 nm, and the first etching was 91% of the etching amount. About 3 seconds were required for etching the transparent thin film 1, and the remaining film had a thickness of about 68 nm.

Subsequently, etching treatment was performed in the same etching chamber under the conditions of RF power: 600 W, antenna bias: 100W, wafer bias: 250 W, chamber internal pressure: 2.0 Pa, substrate temperature: 50° C., species and flow rates of mixed gases: N$_2$: 500 mL/min., O$_2$: 50 mL/min., and Ar: 500 mL/min (N$_2$/O$_2$/Ar=10/1/10), and overetching rate: 20% with respect to the total etching.

The etching rate of the R color layer under the conditions of the second etching was 600 nm/min or more, and it took about 10 seconds to etch the remaining film of the R color layer. The etching time was computed as the sum of 90 seconds for the first etching time and 10 seconds for the second etching time. As a result, since the etching time was 90+10=100 seconds and the overetching time was 100×0.2=20 seconds, the total etching time was set to 100+20=120 seconds.

After the dry-etching was performed under the above conditions, releasing treatment was performed for 120 seconds using a photoresist releasing agent "MS230C" (trade name, manufactured by Fujifilm Electronic Materials Co., Ltd.) to remove the photoresist, and the R pattern having the transparent thin film layer 1 in the upper layer thereof was obtained as the first color pattern.

Herein, the R pattern was formed into a stripe pattern. The sizes of LINE and SPACE were LINE: 1.5 µm and SPACE: 1.5 µm.

Formation of Second Color Pattern

Next, a blue photocurable composition "SB-5000L" (trade name, manufactured by Fujifilm Electronic Materials Co., Ltd.) was applied on the surface of the side of the silicon substrate, on which the transparent thin film 1 and the R pattern were formed, using a spin coater to form a coating film having a thickness of 0.7 µm, and heated using a hot plate at a temperature of 220° C. for 5 minutes so that the coating film was cured to form a B color layer which is the second color layer.

Subsequently, etching on the entire surface (etch-back treatment) was performed using a dry-etching apparatus (trade name: U-621, manufactured by Hitachi Hi-Technologies Corp.) under the conditions of RF power: 600 W, antenna bias: 100 W, wafer bias: 250 W, chamber internal pressure: 2.0 Pa, substrate temperature: 50° C., and species and flow rates of mixed gases: N$_2$: 500 mL/min and Ar: 500 mL/min (N$_2$/Ar=1/1).

Since the etching rate of the B color layer under the conditions of the second etching was 150 nm/min or more and the B color layer formed on the transparent thin film 1 on the R pattern was formed to have a film thickness of 500 nm, it was calculated that it took 200 seconds to remove the B color layer and to expose the transparent film 1 on the R pattern. The etching time was set to the time plus 10 seconds of overetching. As a result, since the etching time was 200 seconds and the overetching time was 10 seconds, the total etching time was set to 200+10=210 seconds.

Etching of the entire surface was performed under the above conditions to obtain a B pattern which is the second color pattern.

The obtained B pattern was formed in such a manner that it was embedded in the recessed portion sandwiched between the R patterns on the silicon substrate. Accordingly, the R and B patterns were formed in such a manner that surfaces of the adjacent patterns are brought into contact with each other.

Moreover, the upper surface of the transparent thin film 1 on the R pattern and the upper surface of the B pattern were the same height with respect to the silicon substrate.

Formation of Second Stopper Layer

Next, a thermosetting composition "1TS-54S-300A" (trade name, manufactured by Lasa Industries, Ltd.) was applied on the surface of the side of the silicon substrate, on which the R pattern, the transparent thin film 1, and the B pattern were formed, using a spin coater to form a coating film having a thickness of 30 nm, and heated using a hot plate at a temperature of 220° C. for 5 minutes so that the coating film was cured to form a second transparent thin film 2 which is the second stopper layer on the transparent thin film 1 and the B pattern.

Subsequently, a positive-type photoresist "FHi622BC" (trade name, manufactured by Fujifilm Electronic Materials Co., Ltd.) was applied on the formed transparent thin film 2, and then prebaked to form a photoresist layer having a thickness of 0.8 μm. After that, under the same conditions as in the formation of the resist pattern in the formation of the first color pattern, a resist pattern was formed by pattern-exposure, followed by development, so that the photoresist in the region where the G pattern (G pixels) was to be formed was removed. In the formed resist pattern, the region where the G pattern (G pixels) was to be formed was an aperture pattern with the square of 1.5 μm×1.5 μm, and its array was in the checkered pattern.

Removal of Color Pattern

Next, the region where the G pattern (G pixels) was to be formed was removed from the transparent thin film 1, the transparent thin film 2, the R pattern and the B pattern by dry-etching under the same conditions as in Example 1 except that the total etching time was changed to 138 seconds by changing the first step etching time to 95 seconds, the second step etching time to 20 seconds, and the overetching time to 23 seconds.

In this way, the region where the G pattern (G pixels) was to be formed was removed from the R and B patterns by dry-etching, thereby obtaining R pixels and B pixels.

Next, the resist pattern was removed by releasing treatment for 120 seconds by using a photoresist stripper "MS-230C" (trade name, manufactured by Fujifilm Electronic Materials Co., Ltd.).

Formation of Third Color Pattern

Next, a photocurable composition "SG-5000L" (trade name, manufactured by Fujifilm Electronic Materials Co., Ltd.), which forms a G pattern, was applied on the surface of the side of the silicon substrate, in which the R pixels, the B pixels, the transparent thin film 1, and the transparent thin film 2 were formed, to form a coating film having a thickness of 0.6 μm, and heated using a hot plate at a temperature of 220° C. for 5 minutes, thereby obtaining a G color layer which is the third color layer. At that time, the film thickness of the G color layer on the transparent thin film 2 was 500 nm.

Subsequently, etching of the entire surface (etch-back treatment) was performed until the transparent thin films 1 and 2 were exposed, by using a dry-etching apparatus (trade name: U-621, manufactured by Hitachi Hi-Technologies Corp.) under the conditions of RF power: 600 W, antenna bias: 100 W, wafer bias: 250 W, chamber internal pressure: 2.0 Pa, substrate temperature: 50° C., and species and flow rates of mixed gases: $N_2$: 500 mL/min. and Ar: 500 mL/min ($N_2$/Ar=1/1).

The etching rate of the G color layer at this time was 150 nm/min or more, and it was calculated that it took 200 seconds to expose the transparent thin films 1 and 2. The etching time was set by adding this time to 10 seconds of the overetching time. As a result, since the etching time was 200 seconds and the overetching time was 10 seconds, the total etching time was set to 200+10=210 seconds.

In this way, the G pattern (G pixels) which is the third color pattern was formed in the desired color pattern region where the G pattern (G pixels) was to be formed.

The G pattern (G pixels) was formed in the checkered pattern in such a manner that each of the G pixels was embedded in a region formed by the etching, each of the G pixels being a square of 1.5 μm×1.5 μm. The array of the G pixels was a checkered pattern.

Moreover, the surface of the substrate was formed into a plane form. That is, the surfaces of the transparent thin film 2 on the R pixels, the transparent thin film 2 on the B pixels, and the G pixels were the same height with respect to the silicon substrate.

In this way, a color filter array having the R pixels, the G pixels, and B the pixels was obtained.

In the color filter array thus obtained, occurrence of the region in which a color pixel is not formed in the region where the corners of each color pixel (R pixels, G pixels, and B pixels) gather was suppressed, and occurrence of the area where the film thickness of the color pixel in the vicinity of the boundary of each pixel was thin was also suppressed.

This result indicates that use of the method of manufacturing a color filter as described above enables limits in pattern formation to be addressed, and allows a finer pattern to be formed.

In the color filters formed by the conventional photolithography method, the G, R, and B patterns are basically formed into isolated patterns (isolated pattern) (G was in the checkered pattern), and pattern formability of the conventional patterns are inferior to that of the LINE and SPACE pattern, due to the proximity effect at the time of exposure. It is known that the color compositions applied especially to color filter materials are inferior in the rectangular nature of the pattern to general photoresists. In order to compensate the rectangular nature, the first and second color layers are formed in a stripe-shaped LINE and SPACE pattern, and the island patterning to form a color filter array is assisted by a photoresist with a high resolution and dry-etching, whereby a color filter with a superior rectangular nature to that of the conventional filters may be formed.

As a result, the limit in pattern formation is improved, especially in the formation of color patterns by the photolithography method, and formation of the color filter having finer pixels becomes possible.

Example 3

Preparation of Colored Photocurable Composition

First, a colored photocurable composition P1 which forms a G pattern was prepared in the following manner.

Preparation of Pigment Dispersion

A mixture (15 parts) of C.I. Pigment Green 36, C.I. Pigment Green 7 and C.I. Pigment Yellow 139 as a pigment in a ratio (C.I. Pigment Green 36/C.I. Pigment Green 7/C.I. Pigment Yellow 139) of 80/20/35 (by mass), BYK 2001 as a dispersant (Disperbyk: manufactured by BYK-Chemie, solid content concentration of 45.0%) (10 parts) (about 4.5 parts calculated as solid), a benzyl methacrylate/methacrylic acid (molar ratio: 70/30) copolymer (5.5 parts), and cyclohexane (69.5 parts) as a solvent were mixed and dispersed by means of a bead mill for 15 hours to prepare a pigment dispersion (P1).

The average particle size of the pigments in the pigment dispersion (P1) was measured by dynamic light scattering using a MICROTRAC NANOTRAC UPA-EX150 (trade name, manufactured by Nikkiso Co., Ltd.) and was found to be 200 nm.

Preparation of Colored Photocurable Composition

Using the above pigment dispersion P1, components in the following composition were mixed together and stirred to obtain a solution of the colored photocurable composition PI. The amount of the specific organic silane compound in the total solid content in the colored photocurable composition PI was 0.6% by mass.

| Composition | |
| --- | --- |
| Pigment dispersion P1 | 65 parts |
| Exemplified compound (103) [Specific organic silane compound] | 0.15 part |
| Octanedion-O-benzoyloxime [Photopolymerization initiator] | 1.5 parts |
| Dipentaerythritol hexaacrylate [Photopolymerizable monomer] | 6 parts |
| Alkali-soluble resin (Binder polymer) [Benzylmethacrylate/methacrylic acid (molar ratio: 70/30) copolymer, Mw: 30,000] | 2 parts |
| PGMEA (solvent) | 25.35 parts |

Manufacture of Color Filter

A silicon substrate provided with R pixels and B pixels was obtained in a manner similar to Example 1 except that the processes prior to the formation of the third color pattern were the same as in Example 1.

That is, this substrate had the region where a G pattern (G pixels) was to be formed was removed from the R and B patterns in the stripe patterns by dry-etching, and had been subjected to removal of the photoresist and heating.

Adhesiveness-Improving Treatment

HMDS (trade name, manufactured by Fujifilm Electronic Materials Co., Ltd.; hexamethyldisilazane) was vapor-deposited on the surface of the side of the silicon substrate on which the R and B pixels were formed after the heating, by using a reduced pressure adhesion apparatus LPAH (which was built in a spin coating apparatus SK-60BW) (trade name, manufactured by Dainippon Screening Mfg. Co., Ltd.) under the following conditions.

After that, the colored curable composition P1, which forms a G pattern, was applied by spin coating on the HMDS-deposited side of the Si substrate, using a spin coating apparatus SK-60BW under the following conditions, and prebaked at 100° C. for 120 seconds to form a G color layer which is the third color layer.

Vapor Deposition Conditions
Substrate temperature: 110° C.
Vapor deposition time: 45 seconds
Spin Coating Conditions
Amount of liquid droplet: 2 g
Coating speed: 1,000 r.p.m.
Coating thickness (dry thickness): 1.0 μm
Coating temperature: 23° C.
Pattern Exposure, Development, and the Like The formed third G color layer was subjected to pattern exposure, development, rinsing treatment, drying treatment, and post-baking treatment in this order under the same conditions as in the formation of the third color layer in Example 1, except that the pattern exposure was performed using an optimum exposure amount which was determined by the method as described below, and a G pattern (G pixels) which is the third color layer was formed in the desired color pattern region where the G pattern (G pixels) was to be formed.

The G pattern (G pixels) was formed into a checkered pattern in such a manner that each of the G pixels was embedded in a region formed by the above etching (the region being a region where the G pattern (G pixels) is to be formed, removed from the R pattern and the B pattern by dry-etching), each of the G pixels being a square of 1.5 μm×1.5 μm. The array of the G pixels was in a checkered pattern.

Moreover, the surface of the substrate was formed in a plane form. That is, the upper surfaces of the R pixels, the B pixels and the G pixels were the same height with respect to the silicon substrate.

In this way, a color filter array having the R pixels, the G pixels, and the B pixels was obtained.

In the color filter array obtained, occurrence of a region not forming a color pixel in the region where the corners of each color pixel (R pixels, G pixels, and B pixels) gather was suppressed, and occurrence of the area where the film thickness of the color pixel in the vicinity of the boundary of each pixel is thin was also suppressed.

This result indicates that use of the method of manufacturing a color filter enables limits in pattern formation to be addressed, and allows a finer pattern to be formed.

Evaluation

Storage Stability of Colored Photocurable Composition

Viscosities of the solution before and after the storage at room temperature for one month were measured by using an E type viscometer (manufactured by Toki Sangyo Co., Ltd.), and the storage stability of the solution of the colored photocurable composition P1 prepared above was evaluated according to the following criteria. The evaluation results are shown in Tables 1 to 3 below.

Criteria

A: No increase in viscosity was observed.
B: Increase in viscosity by 5% or more and less than 10% was observed (within an acceptable range in practical use).
C: In crease in viscosity by 10% or more and less than 20% was observed (within an acceptable range in practical use).
D: Viscosity increased by 20% or more, which was over the acceptable range for practical use.

Measurement of Contact Angle after Adhesiveness-Improving Treatment

A silicon substrate was provided as a substrate for measuring a contact angle, and subjected to adhesiveness-improving treatment. The contact angle between the substrate and water was measured using a DROP MASTER 500 (trade name, manufactured by Kyowa Interface Science Co., Ltd.). The measurement results are shown in Tables 1 to 3 below.

Measurement of Optimum Exposure Amount $E_{opt}$

In the pattern exposure of the G color layer, the exposure was performed by changing the light exposure amount by units of 10 mJ/cm$^2$, and the pattern width at each light exposure amount was measured by a critical dimension scanning electron microscope (SEM). The light exposure amount at which the pattern width was a predetermined value of 1.5 μm was designated as an optimum exposure amount $E_{opt}$. The measurement results are shown in Tables 1 to 3.

Measurement of Adhesion Exposure Amount

In the pattern exposure of the G color layer, the exposure was performed by changing the light exposure amount by units of 10 mJ/cm$^2$, and the peeling of the pattern at each light exposure amount was observed by an optical microscope. The minimum light exposure at which the pattern was not peeled was designated as an adhesion exposure amount. The measurement results are shown in Tables 1 to 3.

Evaluation of Adhesiveness

Adhesiveness was evaluated by estimating an underexposure margin as a value which is obtained by subtracting the adhesion exposure amount from the optimum exposure amount $E_{opt}$. It is shown that the wider the underexposure margin, the more excellent the adhesiveness. The evaluation results are shown in Tables 1 to 3.

A: The underexposure margin is sufficiently broad, and the adhesiveness is extremely good.
B: The underexposure margin is broad, and the adhesiveness is good.
C: The underexposure margin is narrow, but is within the acceptable range for practical use.

D: The adhesion exposure amount exceeds the optimum exposure amount $E_{opt}$, but is within the acceptable range for practical use with an aid of a mask bias or the like.

E: The adhesiveness is extremely bad, and the adhesion exposure amount exceeds the acceptable range for practical use even with an aid of a mask bias or the like.

Examples 4 to 10

Color filters were produced in the same manner as in Example 3, except that the kind and amount of the specific organic silane compound in Example 3 were changed to those as shown in Tables 1 to 3, respectively, and were evaluated in the same manner as in Example 3. The evaluation results are shown in Tables 1 to 3.

Example 11

A color filter was produced in the same manner as in Example 7, except that fluorination treatment with plasma was performed under the following conditions in place of the HMDS vapor deposition for improving the adhesiveness in Example 7, and was evaluated in the same manner as in Example 7. The evaluation results are shown in Tables 1 to 3.

Conditions for Fluorination Treatment with Plasma

Plasma treatment was performed for 5 seconds using a dry-etching apparatus (trade name: U-621, manufactured by Hitachi Hi-Technologies Corp.) under the conditions of RF power: 800 W, antenna bias: 400 W, wafer bias: 200 W, chamber internal pressure: 2.0 Pa, substrate temperature: 50° C., and species and flow rates of mixed gases: Ar: 800 mL/min and $CF_4$: 200 mL/min.

Example 12

A color filter was produced in the same manner as in Example 3, except that fluorination treatment with plasma was performed under the same conditions as in Example 11 in place of the HMDS vapor deposition for improving the adhesiveness in Example 3, and was evaluated in the same manner as in Example 3. The evaluation results are shown in Tables 1 to 3.

Example 13

A color filter was produced in the same manner as in Example 10, except that fluorination treatment with plasma was performed under the same conditions as in Example 11 in place of the HMDS vapor deposition for improving the adhesiveness in Example 10, and was evaluated in the same manner as in Example 10. The evaluation results are shown in Tables 1 to 3.

Example 14

A color filter was produced in the same manner as in Example 11, except that the exemplified compound (103) was not added to the colored photocurable composition, and was evaluated in the same manner as in Example 11. The evaluation results are shown in Tables 1 and 3.

Example 15

A color filter was produced in the same manner as in Example 3, except that the amount of the exemplified compound (103) was changed to the amount as shown in Tables 1 to 3 and adhesiveness-improving treatment was not performed, and was evaluated in the same manner as in Example 3. The evaluation results are shown in Tables 1 to 3.

Examples 16 and 17

Color filters were produced in the same manner as in Example 15, except that the amount of the exemplified compound (103) was changed to the amounts as shown in Tables 1 to 3, respectively, and were evaluated in the same manner as in Example 15. The evaluation results are shown in Tables 1 to 3.

Example 18

A color filter was produced in the same manner as in Example 15, except that the exemplified compound (103) was not added to the colored photocurable composition, and was evaluated in the same manner as in Example 15. The evaluation results are shown in Tables 1 to 3.

TABLE 1

| | Organic silane compound | | Storage stability of composition | Adhesiveness-improving treatment: Contact angle after treatment | Evaluation of adhesiveness after dry-etching | | |
|---|---|---|---|---|---|---|---|
| | | | | | Adhesion | | |
| | Kind | Amount (% to solid content) | | | $E_{opt}$ (mJ/cm$^2$) | exposure amount (mJ/cm$^2$) | Evaluation of adhesiveness |
| Example 3 | Exemplified compound (103) | 0.6 | A | HMDS: 40° | 150 | 50 | A |
| Example 4 | Exemplified compound (102) | 0.6 | A | HMDS: 40° | 150 | 50 | A |
| Example 5 | Exemplified compound (101) | 0.6 | A | HMDS: 40° | 150 | 50 | A |
| Example 6 | Exemplified compound (36) | 0.6 | A | HMDS: 40° | 150 | 50 | A |
| Example 7 | Exemplified compound (103) | 1.2 | B | HMDS: 40° | 150 | 40 | A |

TABLE 2

| | Organic silane compound | | | Evaluation of adhesiveness after dry-etching | | | |
|---|---|---|---|---|---|---|---|
| | | | | Adhesiveness-improving treatment: | | Adhesion | |
| | Kind | Amount (% to solid content) | Storage stability of composition | Contact angle after treatment | $E_{opt}$ (mJ/cm$^2$) | exposure amount (mJ/cm$^2$) | Evaluation of adhesiveness |
| Example 7 | Exemplified compound (103) | 1.2 | B | HMDS: 40° | 150 | 40 | A |
| Example 8 | Exemplified compound (103) | 1.0 | A | HMDS: 40° | 150 | 40 | A |
| Example 9 | Exemplified compound (103) | 0.1 | A | HMDS: 40° | 150 | 125 | B |
| Example 10 | Exemplified compound (103) | 0.05 | A | HMDS: 40° | 150 | 140 | C |
| Example 11 | Exemplified compound (103) | 1.2 | B | Fluorination treatment: 100° | 150 | 50 | A |
| Example 12 | Exemplified compound (103) | 0.6 | A | Fluorination treatment: 100° | 150 | 50 | A |

TABLE 3

| | Organic silane compound | | | Evaluation of adhesiveness after dry-etching | | | |
|---|---|---|---|---|---|---|---|
| | | | | Adhesiveness-improving treatment: | | Adhesion | |
| | Kind | Amount (% to solid content) | Storage stability of composition | Contact angle after treatment | $E_{opt}$ (mJ/cm$^2$) | exposure amount (mJ/cm$^2$) | Evaluation of adhesiveness |
| Example 13 | Exemplified compound (103) | 0.05 | A | Fluorination treatment: 100° | 150 | 125 | B |
| Example 14 | — | None | A | Fluorination treatment: 100° | 150 | 150 | C |
| Example 15 | Exemplified compound (103) | 0.3 | A | No treatment: 10° | 150 | 150 | C |
| Example 16 | Exemplified compound (103) | 0.2 | A | No treatment: 10° | 150 | 175 | D |
| Example 17 | Exemplified compound (103) | 1.3 | C | No treatment: 10° | 150 | 100 | B |
| Example 18 | — | None | A | No treatment: 10° | 150 | 200 | D |

As shown in Tables 1 to 3, the adhesiveness after dry-etching is particularly excellent in Examples 3 to 15 and 17. Among them, the adhesiveness in Examples 3 to 8, 11 and 12 are extremely excellent.

As mentioned above, Examples 3 to 18 in which the processes of the formation of the third color pattern in Example 1 were changed were described. The same results will be, of course, obtained even when the formation of the third color pattern in Example 2 is similarly changed.

Example 19

A color filter was produced according to an exemplary embodiment (the third exemplary embodiment) in which the third color pattern is formed into a stripe pattern extending in a direction intersecting with the first color pattern and the second color pattern and all of the color layers are formed by the photolithography method. Details of the manufacturing method are described below.

Formation of First Color Pattern and Formation of Second Color Pattern

First, a stripe-shaped R pattern and a stripe-shaped B pattern were formed in the same manner as in Example 1 except that the photomask was changed so that the R pattern has a LINE and SPACE pattern of LINE: 1.0 μm and SPACE: 1.0 μm, and the B pattern has a LINE and SPACE pattern of LINE: 1.0 μm and SPACE: 1.0 μm.

Subsequently, a resist pattern was formed in the same manner as in Example 1 except that the region subjected to pattern exposure (i.e. pattern of photomask) is changed.

The resist pattern was formed into a stripe pattern (a LINE and SPACE pattern with LINE: 1.0 μm and SPACE 1.0 μm) extending in a direction intersecting with the stripe patterns of the R pattern and the B pattern.

In other words, in the formed resist pattern, the region where the G pattern (G color pixel) is to be formed is formed as a stripe-shaped aperture region (aperture width: 1.0 μm) extending in a direction intersecting with the R pattern having a width of 1.0 μm and the B pattern having a width of 1.0 μm.

Removal of Color Pattern

Then, R and B pixels were obtained by dry-etching under the same conditions as in Example 1 to remove a region (the stripe-shaped aperture region) in which the G pattern (G pixels) of the R and B patterns was to be formed. After that, the photoresist was removed under the same conditions as in Example 1.

Formation of Third Color Pattern

A G color layer was formed under the same conditions as in Example 1.

Subsequently, a G pattern (G pixels) that was the third color pattern was formed into a stripe pattern in the stripe-shaped aperture region where the G pattern (G pixels) was to be formed by pattern exposure, development, drying, and post-baking under the same conditions as in Example 1 except that the region subjected to the pattern exposure (i.e. pattern of photomask) was changed.

The G pattern (G pixels) was formed into the stripe pattern so that the stripe-shaped aperture region, which had been formed by the etching, was filled with the G pattern. The G pattern (G pixels) had a width of 1.0 μm.

Moreover, the surface of the substrate was formed into a plane form. That is, the upper surfaces of the R pixels, the B pixels and the G pixels were the same height with respect to the silicon substrate.

In this way, a color filter array including the R pixels, the B pixels and the G pixels was obtained.

In the color filter array thus obtained, occurrence of the region in which a color pixel is not formed in the region where the corners of each color pixel (R pixels, G pixels, and B pixels) gather was suppressed, and occurrence of the area where the film thickness of the color pixel in the vicinity of the boundary of each pixel was thin was also suppressed.

This result indicates that use of the method of manufacturing a color filter as described above enables the limits in pattern formation to be addressed, and allows a finer pattern to be formed.

Example 20

A color filter was produced according to an exemplary embodiment (the fourth exemplary embodiment) in which the third color pattern is formed into a stripe pattern extending in a direction intersecting with the first color pattern and the second color pattern and all of the first to third color patterns are formed by the dry-etching and the CMP treatment. Details of the manufacturing method are described below.

Preparation of Colored Thermosetting Composition
Preparation of Pigment Dispersion Materials (component other than a solvent) for green (G) color, blue (B) color, and red (R) color, as shown in the following Tables 4 an 5, were uniformly kneaded by using a kneader, respectively. After that, kneaded products were respectively subjected to a dry dispersion treatment (kneading dispersion) by using two rolls.

The dispersions which had been subjected to the dry dispersion treatment were respectively added with propylene glycol monomethyl ethyl acetate in amounts shown in Tables 4 and 5 as a solvent component. Then, the resultant mixtures were respectively stirred by using a homogenizer at 2,000 rpm for 30 minutes, thereby obtaining green (G), blue (B), and red (R) dispersion compositions in which pigments were uniformly dispersed. The resultant dispersion compositions were each subjected to a microdispersion treatment by using a beads disperser (trade name: DISPERMAT, manufactured by GETZMANN) with 0.3-mm zirconia beads.

After that, the dispersion compositions were each subjected to filtration with a 2.5-μm filter, thereby obtaining pigment dispersions (1) to (3) of respective colors, in which pigments were uniformly dispersed. Table 5 shows viscosities of the kneaded products (dispersions) of the respective pigment dispersions upon the kneading dispersion treatment and the microdispersion treatment, and average particle diameters of the pigments in the respective pigment dispersions and ratios of the pigment particles having a particle diameter of 0.01±0.005 μm with respect to the all pigment particles.

The particle diameters of the pigments were measured by using as samples the solutions of the colored resin compositions diluted with propylene glycol monomethyl ethyl acetate and a MICROTRAC UPA 150 (trade name, manufactured by Nikkiso Co., Ltd.).

TABLE 4

|  | Pigment dispersion (1): green (G) | Pigment dispersion (2): blue (B) | Pigment dispersion: red (R) |
| --- | --- | --- | --- |
| Colorant | Pigment Green (PG) 36 90 mass parts Pigment Green (PG) 7 25 mass parts Pigment Yellow (PY) 139 40 mass parts | Pigment Blue (PB) 15:6 125 mass parts Pigment Violet (PV) 23 25 mass parts | Pigment Red (PR) 254 80 mass parts Pigment Yellow (PY) 139 20 mass parts |
| Dispersant | PLAAD ED151 (manufactured by Kusumoto Chemicals Ltd.) 20 mass parts | PLAAD ED211 (amideamine salt of high molecular polycarboxylic acid, manufactured by Kusumoto Chemicals Ltd.) 40 mass parts | EDAPLAN472 (manufactured by Kusumoto Chemicals Ltd.) 15 mass parts |
| Resin | Benzyl methacrylate/methacrylic acid copolymer (molar ratio = 80:30, weight average molecular weight of 30,000) 20 mass parts | Benzyl methacrylate/methacrylic acid copolymer (molar ratio = 80:30, weight average molecular weight of 30,000) 15 mass parts | Benzyl methacrylate/methacrylic acid copolymer (molar ratio = 80:30, weight average molecular weight of 30,000) 10 mass parts |
| Solvent | propyleneglycol monomethylethyl acetate: 625 mass parts | propyleneglycol monomethylethyl acetate: 785 mass parts | propyleneglycol monomethylethyl acetate: 750 mass parts |

TABLE 5

|  | Pigment dispersion (1): green (G) | Pigment dispersion (2): blue (B) | Pigment dispersion: red (R) |
| --- | --- | --- | --- |
| Viscosity upon kneading dispersion | 55,000 mPa/s | 55,000 mPa/s | 70,000 mPa/s |

TABLE 5-continued

|  | Pigment dispersion (1): green (G) | Pigment dispersion (2): blue (B) | Pigment dispersion: red (R) |
|---|---|---|---|
| Viscosity upon microdispersion | 13 mPa/s | 12.5 mPa/s | 15 mPa/s |
| Average particle diameter of pigment | 0.015 μm | 0.013 μm | 0.014 μm |
| ratio of pigment particles of 0.01 ± 0.005 μm | 98.0 mass % | 95.6 mass % | 94.0 mass % |

Preparation of Colored Thermosetting Composition

A polyfunctional epoxy resin "EHPE-3150" (trade name, manufactured by Daicel Chemical Industries, Ltd.) was added in an amount of 20 mass parts to the pigment dispersion (1), an amount of 6 mass parts to the pigment dispersion (2), and an amount of 8 mass parts to the pigment dispersion (3). Further, "1B2PZ" (trade name, manufactured by Shikoku Chemicals Corporation) as a curing catalyst was added to each of the pigment dispersions in an amount of 1/50 (mass) with respect to the polyfunctional epoxy resin. After the catalyst was dissolved, the mixtures were each diluted with propyleneglycol monomethylethyl acetate so that the solid content in each of the compositions was 15 mass %, without causing pigment shock. In this way, three colored thermosetting compositions R, G, and B having high pigment concentrations such that the pigment dispersion (1) having the content of the pigment of 72.0 mass %, the pigment dispersion (2) having the content of the pigment of 71.0 mass %, and the pigment dispersion (3) having the content of the pigment of 75.1 mass %.

Preparation of Color Filter

Formation of First Color Pattern

A R color layer was formed in the same manner as in Example 2 except that the colored thermosetting composition R was used instead of the red colored photocurable composition SR-5000L. The film thickness after thermosetting was 0.4 μm.

Then, a transparent thin film 1 and a resist pattern were formed in the same manner as in Example 2 except that the photomask was changed, followed by dry-etching to remove the photoresist, thereby obtaining a R pattern having the transparent thin film 1 as the first stopper layer in the upper layer.

In this case, the R pattern was formed into a stripe pattern, having a Line size of 1.0 μm and a SPACE size of 1.0 μm.

Formation of Second Color Pattern

A B color layer was formed in the same manner as in Example 2 except that the colored thermosetting composition B was used instead of the blue colored photocurable composition SB-5000L. The film thickness after thermosetting was 0.7 μm.

Then, polishing was performed by using a CMP polishing device (trade name: BC-15, manufactured by Kemet Japan), a diluted solution of SEMISPERSE 25 (registered trade name, manufactured by Cabot):pure water=1:10 as a slurry, and an expanded polyurethane (trade name: Whitex series, manufactured by Kemet Japan) as a polishing pad under the conditions of a slurry flow rate: 150 mL/min, a wafer pressure: 2.0 psi, and a retaining ring pressure: 1.0 psi, until the transparent thin film 1 on the R pattern was exposed.

A transparent thin film 2 as the second stopper layer was formed on the R pattern and the transparent thin film 1 in the same manner as in Example 2.

Then, a resist pattern was formed in the same manner as in Example 2 except that the resist pattern (i.e. a resist pattern that serves as an etching mask in dry-etching in the removal of the color pattern) was formed with a different region to be subjected to pattern exposure (that is, the photomask was changed).

The resist pattern was formed into a stripe pattern extending in a direction intersecting with the R pattern and the B pattern, with a LINE size of 1.0 μm and a SPACE size of 1.0 μm.

In other words, in the thus-formed resist pattern, the region where the G pattern (G pixels) was to be formed was formed as a stripe-shaped aperture region (aperture width: 1.0 μm) extending in a direction intersecting with the R pattern having a width of 1.0 μm and the B pattern having the width of 1.0 μm.

Removal of Color Pattern

Next, the region where a G pattern (G pixels) was to be formed was removed from the transparent thin film 1, the transparent thin film 2, the T pattern and the B pattern by dry-etching under the same conditions as in Example 2.

After that, the photoresist was removed under the same conditions as in Example 2.

Formation of Third Color Pattern

A G color layer was formed in the same manner as in Example 2 except that the colored thermosetting composition G was used instead of the green colored photocurable composition SG-5000L. The film thickness after thermosetting was 0.1 μm.

In this case, the G color layer on the transparent thin film 2 had a film thickness of 500 nm.

Then, polishing was performed by using a CMP polishing device (trade name: BC-15, manufactured by Kemet Japan), a diluted solution of SEMISPERSE 25 (registered trade name, manufactured by Cabot):pure water=1:10 as a slurry, and an expanded polyurethane (Whitex series, trade name, manufactured by Kemet Japan) as a polishing pad under the conditions of a slurry flow rate: 150 mL/min, a wafer pressure: 2.0 psi, and a retaining ring pressure: 1.0 psi, until the transparent thin film 2 on the R pattern and the B pattern was exposed.

In this way, a stripe-shaped G pattern (G pixels), that is the third color pattern, was formed in the stripe-shaped aperture region where the G pattern (G pixels) was to be formed.

The G pattern (G pixel) was formed into a stripe pattern that is embedded in the stripe-shaped aperture region formed by the dry-etching. The G pattern (G pixels) had a width of 1.0 μm.

Moreover, the surface of the substrate was formed into a plane form. That is, the upper surface of the transparent thin film 2 laminated on the R pixels, the upper surface of the transparent thin film 2 laminated on the B pixels and the upper surface of the G pixels were the same height with respect to the silicon substrate.

In this way, a color filter array having the R pixels, the G pixels, and the B pixels was obtained.

In the color filter array thus obtained, occurrence of the region in which a color pixel is not formed in the region where the corners of each color pixel (R pixels, G pixels, and B pixels) gather was suppressed, and occurrence of the area where the film thickness of the color pixel in the vicinity of the boundary of each pixel was thin was also suppressed.

This result indicates that use of the method of manufacturing a color filter as described above enables the limits in pattern formation to be addressed, and allows a finer pattern to be formed.

Example 21

Formation of Color Filter

A silicon substrate provided with R pixels and B pixels was obtained according to the processes in Example 19 before the formation of the third color pattern.

In other words, the substrate had a stripe region where a G pattern (G pixels) was to be formed, which had been removed from the stripe-shaped R and B patterns by dry-etching, and a photoresist had been removed from the substrate, and the substrate had been subjected to heating.

After the heating, the surfaces of the R pixels and the B pixels present on the silicon substrate provided with the R pixels and the B pixels were subjected to the adhesiveness-improving treatment under the same conditions as in Example 3, and the colored photocurable composition P1 was used under the same conditions as in Example 3, thereby forming a G color layer.

Pattern Exposure and Development

The thus-formed G color layer was subjected to pattern exposure, development, rinsing treatment, drying treatment, and post-baking treatment in this order under the same conditions as in the formation of the third color layer in Example 19, except that the pattern exposure was performed using an optimum exposure amount ($E_{opt}$) determined in Example 3, and a G pattern (G pixels) which is the third color layer was formed in a stripe pattern region where the G pattern (G pixels) was to be formed.

The G pattern (G pixels) was formed into a stripe pattern in such a manner that each of the G pixels was embedded in an aperture region formed by the above etching (the region being a region where the G pattern (G pixels) is to be formed, removed from the R pattern and the B pattern by dry-etching), each of the G pixels having a width of 1.0 µm.

Moreover, the surface of the substrate was formed in a plane form. That is, the upper surfaces of the R pixels, the B pixels and the G pixels were the same height with respect to the silicon substrate.

In this way, a color filter array having the R pixels, the G pixels, and the B pixels was obtained.

In the color filter array obtained, occurrence of a region not forming a color pixel in the region where the corners of each color pixel (R pixels, G pixels, and B pixels) gather was suppressed, and occurrence of the area where the film thickness of the color pixel in the vicinity of the boundary of each pixel is thin was also suppressed.

This result indicates that use of the method of manufacturing a color filter enables limits in pattern formation to be addressed, and allows a finer pattern to be formed.

Evaluation

The storage stability of the colored photocurable composition, the contact angle after the adhesiveness-improving treatment, the optimum exposure amount $E_{opt}$, the adhesion exposure amount, the adhesiveness were evaluated under the same conditions and criteria as in Example 3. The evaluation results are shown in Tables 6 and 7.

Examples 22 to 28

Color filters were produced in the same manner as in Example 21, except that the kind and amount of the specific organic silane compound in Example 21 were changed to those as shown in Tables 6 and 7, respectively, and were evaluated in the same manner as in Example 21. The evaluation results are shown in Tables 6 and 7.

Example 29

A color filter was produced in the same manner as in Example 25, except that fluorination treatment with plasma was performed under the following conditions in place of the HMDS vapor deposition for improving the adhesiveness in Example 25, and was evaluated in the same manner as in Example 25. The evaluation results are shown in Tables 6 and 7.

Conditions for Fluorination Treatment with Plasma

Plasma treatment was performed for 5 seconds using a dry-etching apparatus (trade name: U-621, manufactured by Hitachi Hi-Technologies Corp.) under the conditions of RF power: 800 W, antenna bias: 400 W, wafer bias: 200 W, chamber internal pressure: 2.0 Pa, substrate temperature: 50° C., and species and flow rates of mixed gases: Ar: 800 mL/min and $CF_4$: 200 mL/min.

Example 30

A color filter was produced in the same manner as in Example 21, except that fluorination treatment with plasma was performed under the same conditions as in Example 29 in place of the HMDS vapor deposition for improving the adhesiveness in Example 21, and was evaluated in the same manner as in Example 21. The evaluation results are shown in Tables 6 and 7.

Example 31

A color filter was produced in the same manner as in Example 28, except that fluorination treatment with plasma was performed under the same conditions as in Example 29 in place of the HMDS vapor deposition for improving the adhesiveness in Example 28, and was evaluated in the same manner as in Example 28. The evaluation results are shown in Tables 6 and 7.

Example 32

A color filter was produced in the same manner as in Example 29, except that the exemplified compound (103) was not added to the colored photocurable composition, and was evaluated in the same manner as in Example 29. The evaluation results are shown in Tables 6 and 7.

Example 33

A color filter was produced in the same manner as in Example 21, except that the amount of the exemplified compound (103) was changed to the amount as shown in Tables 6 and 7 and adhesiveness-improving treatment was not performed, and was evaluated in the same manner as in Example 21. The evaluation results are shown in Tables 6 and 7.

Examples 34 and 35

Color filters were produced in the same manner as in Example 33, except that the amount of the exemplified compound (103) was changed to the amounts as shown in Tables 6 and 7, respectively, and were evaluated in the same manner as in Example 33. The evaluation results are shown in Tables 6 and 7.

Example 36

A color filter was produced in the same manner as in Example 33, except that the exemplified compound (103) was not added to the colored photocurable composition, and was evaluated in the same manner as in Example 33. The evaluation results are shown in Tables 6 and 7.

TABLE 6

| | Organic silane compound | | | Adhesiveness-improving treatment: contact angle after treatment | Evaluation of adhesiveness after dry-etching | | |
| --- | --- | --- | --- | --- | --- | --- | --- |
| | Type | Content (to solid %) | Storage stability of compound | | Eopt (mJ/cm2) | Adhesion exposure amount (mJ/cm2) | Evaluation of adhesiveness |
| Example 21 | Exemplary compound (103) | 0.6 | A | HMDS: 40° | 150 | 50 | A |
| Example 22 | Exemplary compound (102) | 0.6 | A | HMDS: 40° | 150 | 50 | A |
| Example 23 | Exemplary compound (101) | 0.6 | A | HMDS: 40° | 150 | 50 | A |
| Example 24 | Exemplary compound (36) | 0.6 | A | HMDS: 40° | 150 | 50 | A |
| Example 25 | Exemplary compound (103) | 1.2 | B | HMDS: 40° | 150 | 40 | A |
| Example 26 | Exemplary compound (103) | 1 | A | HMDS: 40° | 150 | 40 | A |
| Example 27 | Exemplary compound (103) | 0.1 | A | HMDS: 40° | 150 | 125 | B |
| Example 28 | Exemplary compound (103) | 0.05 | A | HMDS: 40° | 150 | 140 | C |

TABLE 7

| | Organic silane compound | | | Adhesiveness-improving treatment: contact angle after treatment | Evaluation of adhesiveness after dry-etching | | |
| --- | --- | --- | --- | --- | --- | --- | --- |
| | Type | Content (to solid %) | Storage stability of compound | | Eopt (mJ/cm2) | Adhesion exposure amount (mJ/cm2) | Evaluation of adhesiveness |
| Example 29 | Exemplary compound (103) | 1.2 | B | Fluorination: 100° | 150 | 50 | A |
| Example 30 | Exemplary compound (103) | 0.6 | A | Fluorination: 100° | 150 | 50 | A |
| Example 31 | Exemplary compound (103) | 0.05 | A | Fluorination: 100° | 150 | 125 | B |
| Example 32 | — | None | A | Fluorination: 100° | 150 | 150 | C |
| Example 33 | Exemplary compound (103) | 0.3 | A | No treatment: 10° | 150 | 150 | C |
| Example 34 | Exemplary compound (103) | 0.2 | A | No treatment: 10° | 150 | 175 | D |
| Example 35 | Exemplary compound (103) | 1.3 | C | No treatment: 10° | 150 | 100 | B |
| Example 36 | — | None | A | No treatment: 10° | 150 | 200 | D |

As shown in Tables 6 and 7, the adhesiveness after dry-etching is particularly excellent in Examples 21 to 33 and 35. Among them, the adhesiveness in Examples 21 to 26, 29 and 30 are extremely excellent.

As mentioned above, Examples 21 to 36 in which the processes of the formation of the third color pattern in Example 19 were changed were described. The same results will be, of course, obtained even when the formation of the third color pattern in Example 20 is similarly changed.

As described above, Examples 1 to 36 in each of which a color filter (including the R, G, and B color pixels) is formed on a silicon substrate are described. When a solid-state image pickup element is produced, a substrate for a solid-state image pickup element, on which photodiodes, a light-shading film, a device-protective film, and the like are provided may be used instead of the silicon substrate.

For example, a solid-state image pickup element having superior color reproducibility may be produced as follows. First, a light-shading film composed of tungsten or the like is formed on a support provided with photodiodes and a transfer electrode, the light-shading film having an aperture on the light-receiving area of the photodiodes. A device protective film composed of silicon nitride or the like is provided on the light-shading film so as to cover the entire surface of the light-shading film and the light-receiving area of the photodiodes (i.e. the aperture of the light-shading film), and the color filter (including the R, G, and B color pixels) is formed on the device protective film according to any one of the methods of Examples 1 to 36 of the invention. Then, a microlens serving as a light-collecting unit is provided on the color filter.

What is claimed is:

1. A method of manufacturing a color filter comprising:

(a) forming a first color pattern in a repeating pattern on a support;

(b) forming, on the support, a second color pattern in a repeating pattern in regions where the first color pattern is not formed;

(c) removing at least one portion of one of the first color pattern and the second color pattern by dry-etching, the portion being in a region where a third color pattern is to be formed; and (d) forming, on the support, the third color pattern in the region where the portion of one of the first color pattern and the second color pattern has been removed;

wherein the first color pattern and the second color pattern each have a stripe shape;

wherein the region where the third color pattern is to be formed comprises one of i) a checkered pattern region and ii) a stripe pattern that extends in a direction intersecting with the first color pattern and the second color pattern.

2. The method of manufacturing a color filter of claim 1, wherein the first color pattern is formed by any one of:

(1) a process comprising forming a first color layer on the support, exposing the first color layer to light, and developing a resultant obtained by the exposing; and (2) a process comprising forming the first color layer on the support, forming a resist pattern on the first color layer using a photoresist, and dry-etching the first color layer using the resist pattern as an etching mask.

3. The method of manufacturing a color filter of claim 1, wherein the second color pattern is formed by the following process (1) or a process comprising at least one of the following processes (2) and (3):

(1) a process comprising forming a second color layer on the support on which the first color pattern is formed, exposing the second color layer to light, followed by development;

(2) a process comprising forming the second color layer on the support on which the first color pattern is formed, forming a resist pattern on the second color pattern using a photoresist, and dry-etching the second color layer using the resist pattern as an etching mask; and (3) a process comprising forming the second color layer on the support on which the first color pattern is formed, and performing planarization of at least the second color layer.

4. The method of manufacturing a color filter of claim 3, wherein the planarization comprises at least one of an etch-back treatment that etches all of the exposed surfaces of the color layers and an polishing treatment that polishes all of the exposed surfaces of the color layers.

5. The method of manufacturing a color filter of claim 1, wherein the third color pattern is formed by the following process (1) or a process comprising at least one of the following processes (2) and (3):

(1) a process comprising forming a third color layer on the support on which the first color pattern and the second color pattern are formed, and exposing the third color layer to light, followed by development;

(2) a process comprising forming the third color layer on the support on which the first color pattern and the second color pattern are formed, forming a resist pattern on the third color pattern using a photoresist, and dry-etching the third color layer using the resist pattern as an etching mask; and (3) a process comprising forming the third color layer on the support on which the first color pattern and the second color pattern are formed, and performing planarization of at least the third color layer.

6. The method of manufacturing a color filter of claim 1, further comprising forming a second stopper layer on the first color pattern and the second color pattern after (b) the formation of the second color pattern and before (c) the removal of the portion of the color patterns, wherein:

the removal of the portion of the color patterns comprises removing at least one portion of at least one of the first color pattern and the second color pattern, in the region where the third color pattern is to be formed, and removing the second stopper layer in the region where the third color pattern is to be formed; and the formation of the third color pattern comprises forming the third color layer on the support on which the first color pattern, the second color pattern, and the second stopper layer are formed, and dry-etching the third color layer until the second stopper layer is exposed.

7. The method of manufacturing a color filter of claim 1, wherein:

the formation of the first color pattern comprises forming the first color layer on the support and forming a first stopper layer on the first color layer; and the formation of the second color pattern comprises forming the second color layer on the support on which the first color pattern is formed and dry-etching the second color layer until the first stopper layer is exposed.

8. The method of manufacturing a color filter of claim 1, wherein the first color pattern and the second color pattern are formed in such a manner that surfaces of the first color pattern and the second color pattern that face each other, are brought into contact.

9. The method of manufacturing a color filter of claim 1, wherein at least one of the formation of the first color pattern, the formation of the second color pattern, or the formation of the third color pattern comprises:

applying an adhesiveness-improving treatment to the support after dry-etching;

forming a color layer on the support to which the adhesiveness-improving treatment has been applied;

exposing the color layer to light; and developing a resultant of the exposing to form a color pattern.

10. The method of manufacturing a color filter of claim 9, wherein the adhesiveness-improving treatment comprises at least one of adding an adhesion auxiliary agent or a fluorination treatment using plasma.

11. The method of manufacturing a color filter of claim 9, wherein the color layer is formed by applying a colored curable composition comprising an organic silane compound in an amount of 0.05 to 1.2% by mass with respect to the total solid content of the colored curable composition.

12. The method of manufacturing a color filter of claim 1, wherein at least one of the formation of the first color pattern, the formation of the second color pattern, or the formation of the third color pattern comprises:

forming a color layer by applying to the support a colored curable composition comprising an organic silane compound in an amount of 0.3 to 1.2% by mass with respect to the total solid content of the colored curable composition, without applying an adhesiveness-improving treatment to the support after dry-etching;

exposing the color layer to light; and developing a resultant of the exposing to form a color pattern.

13. A color filter, which is produced by the method of manufacturing a color filter of claim 1.

14. A solid-state image pickup element, comprising the color filter of claim 13.

* * * * *